US009261765B2

(12) United States Patent
Kuwata et al.

(10) Patent No.: US 9,261,765 B2
(45) Date of Patent: Feb. 16, 2016

(54) LIGHT CONVERGING OPTICAL SYSTEM AND PROJECTION-TYPE IMAGE DISPLAY APPARATUS

(71) Applicant: Mitsubishi Electric Corporation, Tokyo (JP)

(72) Inventors: Muneharu Kuwata, Tokyo (JP); Masashige Suwa, Tokyo (JP); Kuniko Kojima, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 39 days.

(21) Appl. No.: 14/376,340

(22) PCT Filed: Sep. 20, 2012

(86) PCT No.: PCT/JP2012/074046
§ 371 (c)(1),
(2) Date: Aug. 1, 2014

(87) PCT Pub. No.: WO2013/114665
PCT Pub. Date: Aug. 8, 2013

(65) Prior Publication Data
US 2014/0375958 A1 Dec. 25, 2014

(30) Foreign Application Priority Data

Feb. 2, 2012  (JP) ................. 2012-021116
Mar. 27, 2012 (JP) ................. 2012-071770

(51) Int. Cl.
*G03B 21/26* (2006.01)
*G03B 21/20* (2006.01)
(Continued)

(52) U.S. Cl.
CPC .......... *G03B 21/208* (2013.01); *G02B 19/0014* (2013.01); *G02B 19/0061* (2013.01);
(Continued)

(58) Field of Classification Search
CPC ........ G02B 13/00; G02B 27/18; G02B 19/00;
G02B 27/09; G03B 21/20; G03B 21/14;
H04N 9/31
See application file for complete search history.

(56) References Cited

U.S. PATENT DOCUMENTS 6,997,565 B2  2/2006  Sekiguchi et al.
7,448,774 B2  11/2008  Konuma
(Continued)

FOREIGN PATENT DOCUMENTS

JP  10-10426 A    1/1998
JP  2002-214563 A  7/2002
(Continued)

*Primary Examiner* — Sultan Chowdhury
*Assistant Examiner* — Danell L Owens
(74) *Attorney, Agent, or Firm* — Birch, Stewart, Kolasch & Birch, LLP

(57) ABSTRACT

A light converging optical system (1) includes a surface-emission light source (11) that emits light from a light emitting surface (12), a collimator lens (13) as a collimator optical system that converts the light emitted from the light emitting surface (12) into approximately parallel light, a condenser lens (4) as a converging lens as a light converging element that converges the light converted into the approximately parallel light, and an integrator rod (7) as a light-intensity-distribution equalizing element that has an incident surface (8) on which the light converged by the condenser lens (4) is incident, equalizes light intensity distribution of incident light, and emits the light from an emission surface (9). Among the light converged on the incident surface (7) of the integrator rod (7), a converging angle of the light converged on a center portion of the incident surface (8) is smaller than a converging angle of the light converged on a corner portion of the incident surface (8).

20 Claims, 36 Drawing Sheets

(51) Int. Cl.
  *G02B 27/09* (2006.01)
  *G03B 21/00* (2006.01)
  *G02B 19/00* (2006.01)
  *G02B 3/06* (2006.01)

(52) U.S. Cl.
  CPC ........ *G02B27/0927* (2013.01); *G02B 27/0938* (2013.01); *G02B 27/0994* (2013.01); *G03B 21/005* (2013.01); *G02B 3/06* (2013.01)

(56) References Cited

U.S. PATENT DOCUMENTS

| | | | |
|---|---|---|---|
| 7,597,459 | B2 | 10/2009 | Maeda et al. |
| 2004/0070735 | A1 | 4/2004 | Sekiguchi et al. |
| 2006/0238720 | A1* | 10/2006 | Lee .................... G02B 27/0994 353/38 |

FOREIGN PATENT DOCUMENTS

| | | | |
|---|---|---|---|
| JP | 2002-298625 | A | 10/2002 |
| JP | 2004-61848 | A | 2/2004 |
| JP | 2006-189653 | A | 7/2006 |
| JP | 2006-243603 | A | 9/2006 |
| JP | 2007-65425 | A | 3/2007 |
| JP | 2007-171319 | A | 7/2007 |
| JP | 2007-299666 | A | 11/2007 |
| JP | 2007-322792 | A | 12/2007 |
| JP | 2009-300772 | A | 12/2009 |
| JP | 2010-170755 | A | 8/2010 |
| TW | I308966 | | 1/1998 |

* cited by examiner

FIG. 6(A)     FIG. 6(B)
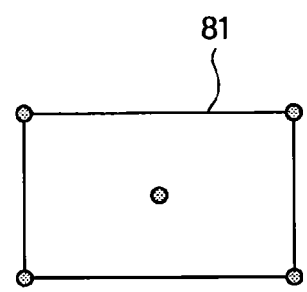
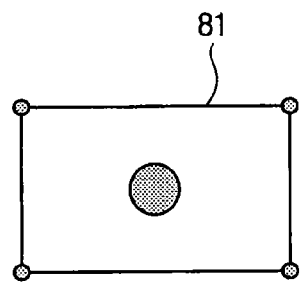
FIG. 7
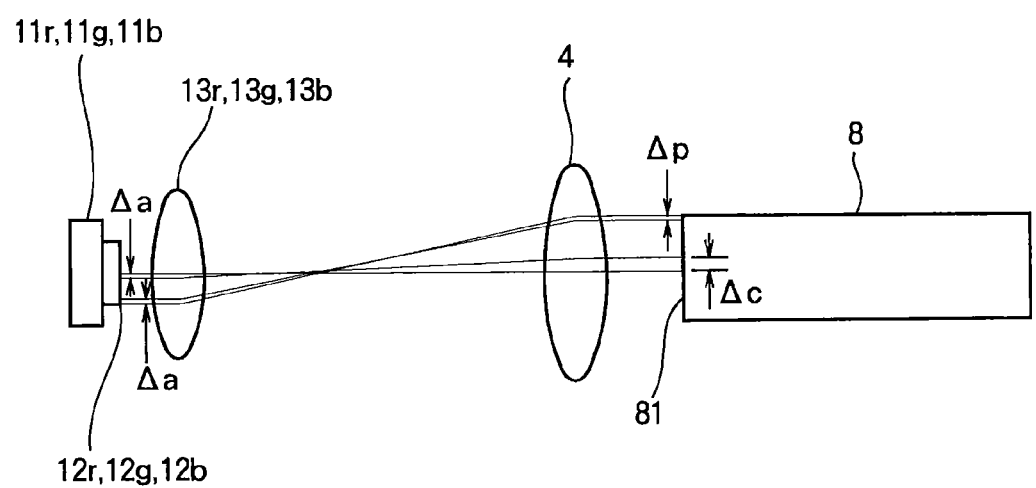

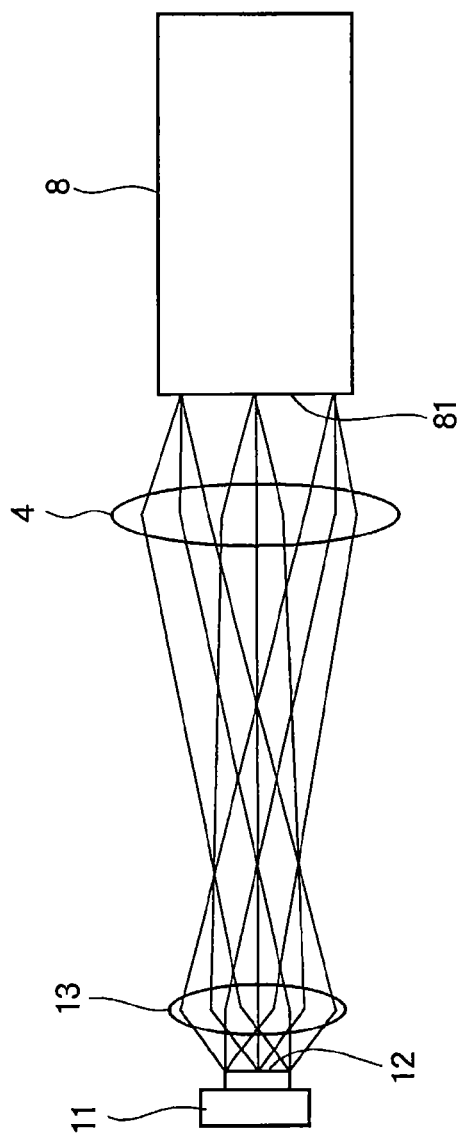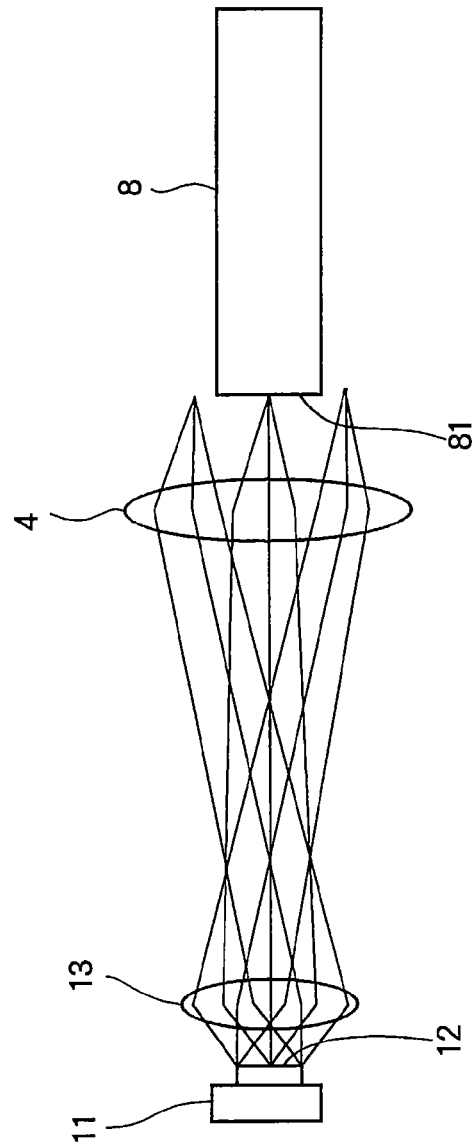
FIG. 22(A)
FIG. 22(B)

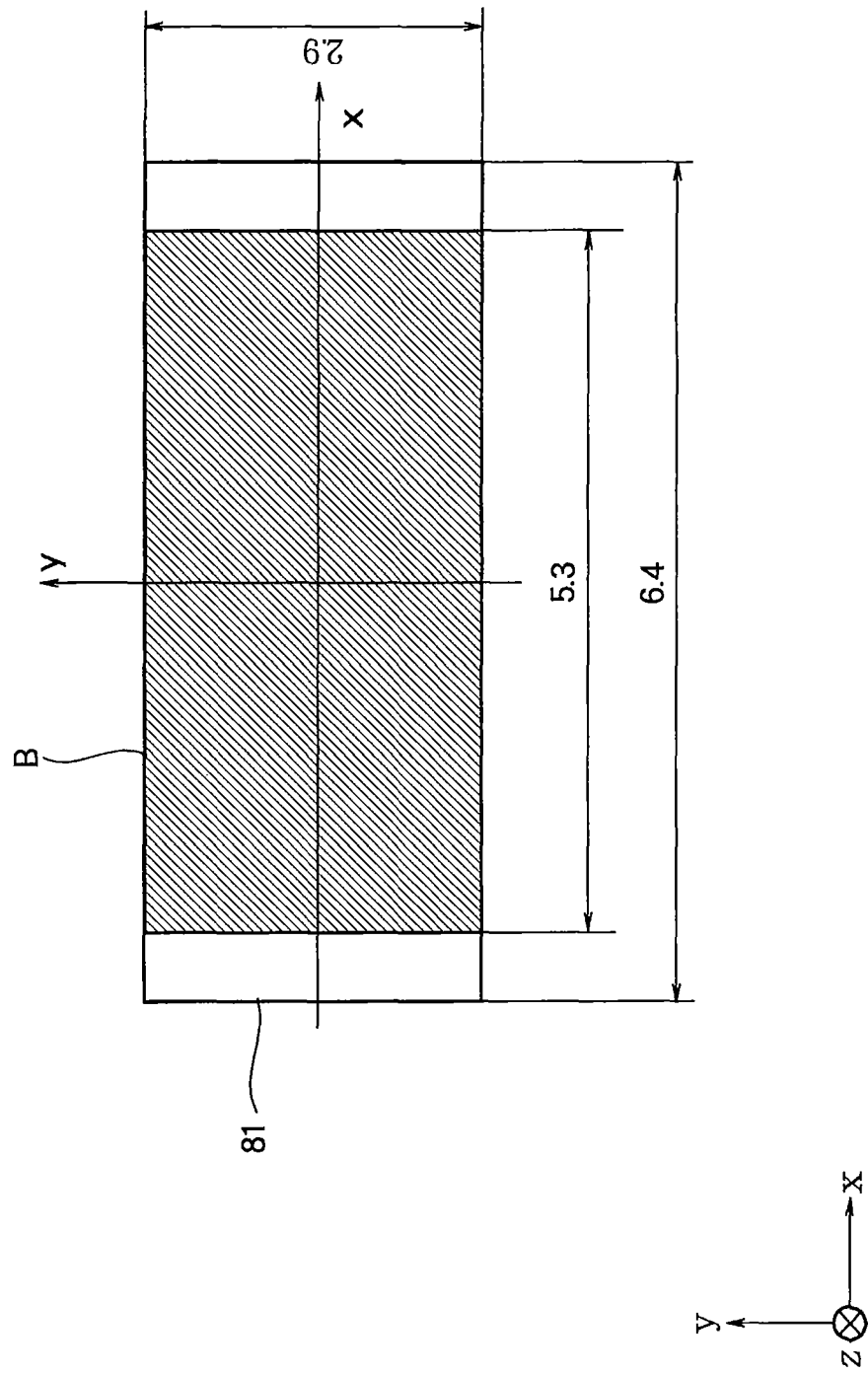

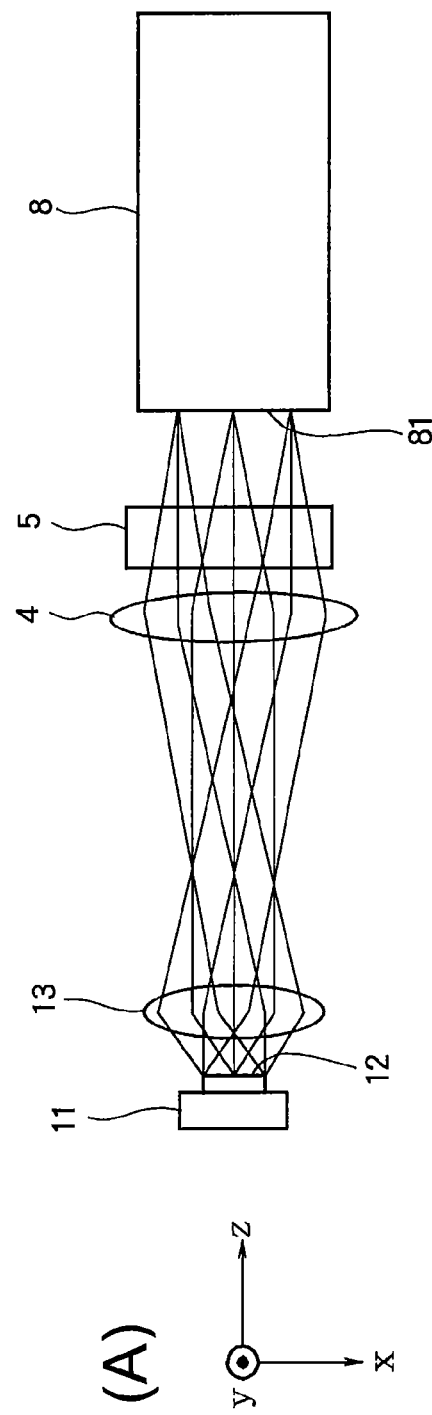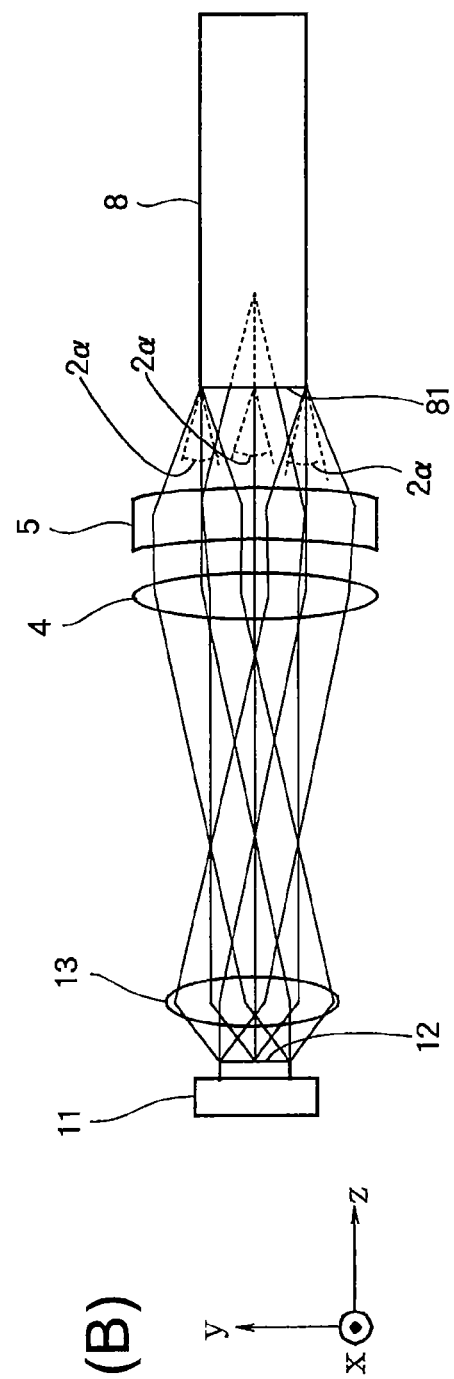
FIG. 26 (A)
FIG. 26 (B)

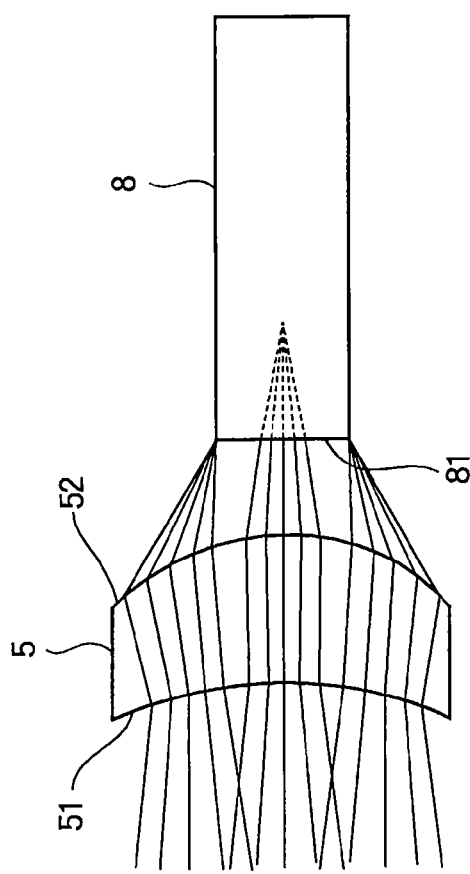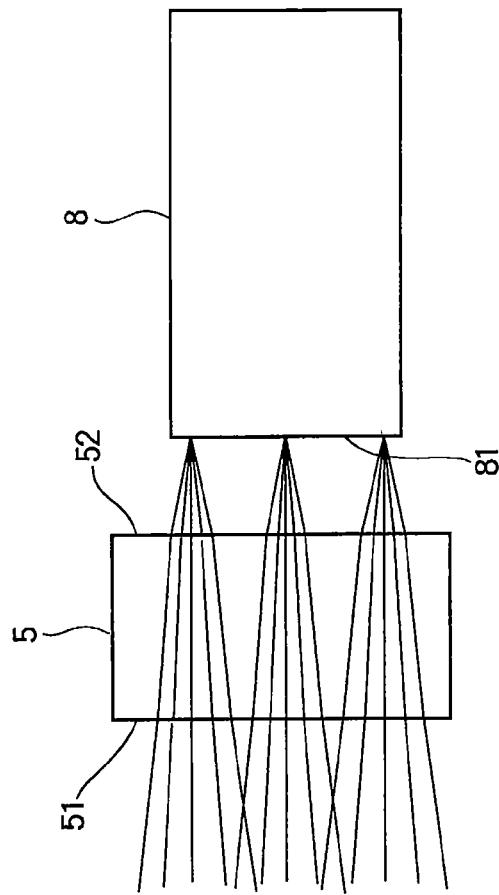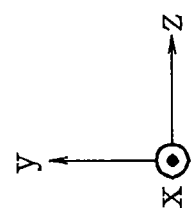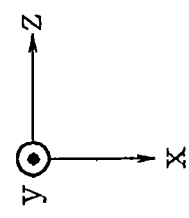
FIG. 29(A)
FIG. 29(B)

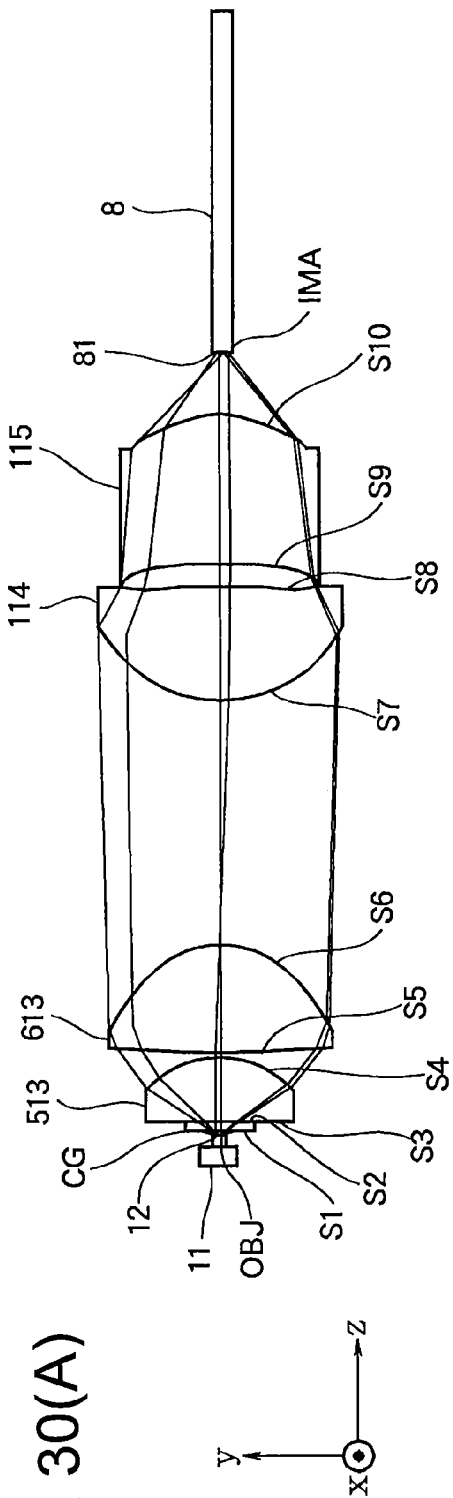
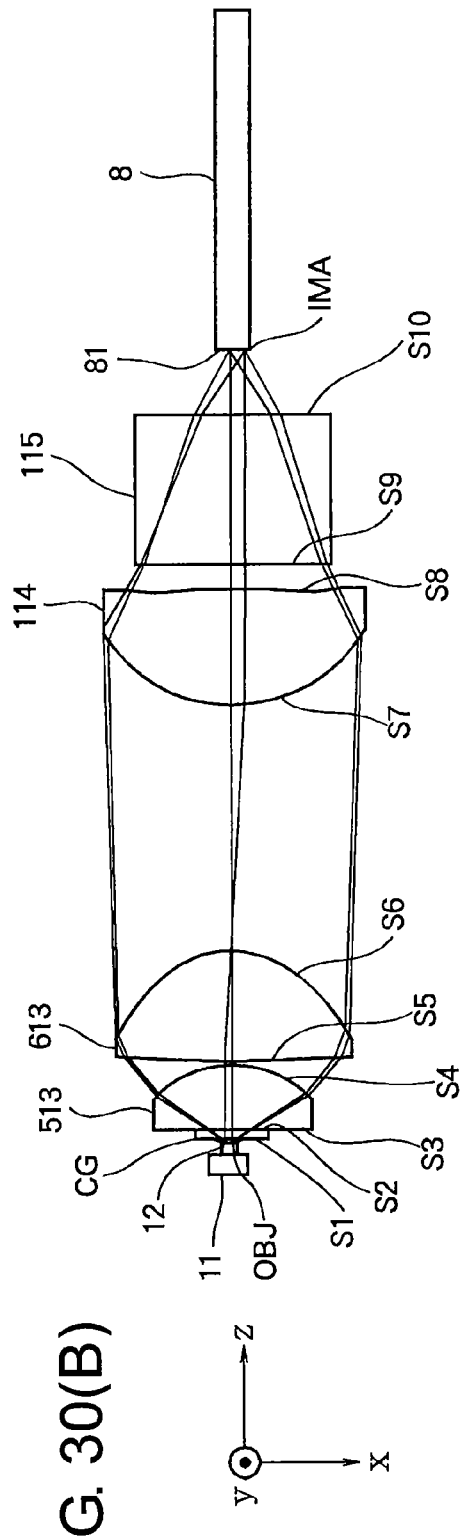
FIG. 30(A)
FIG. 30(B)

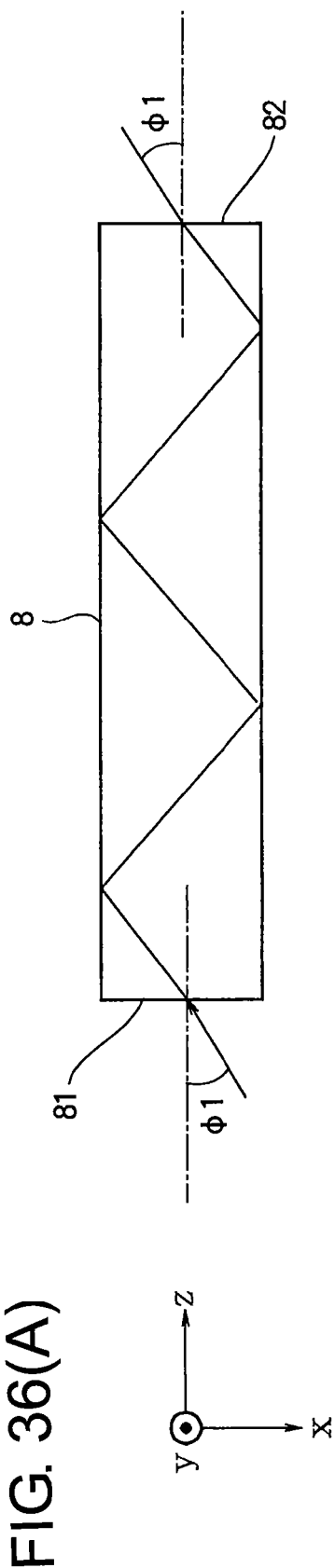
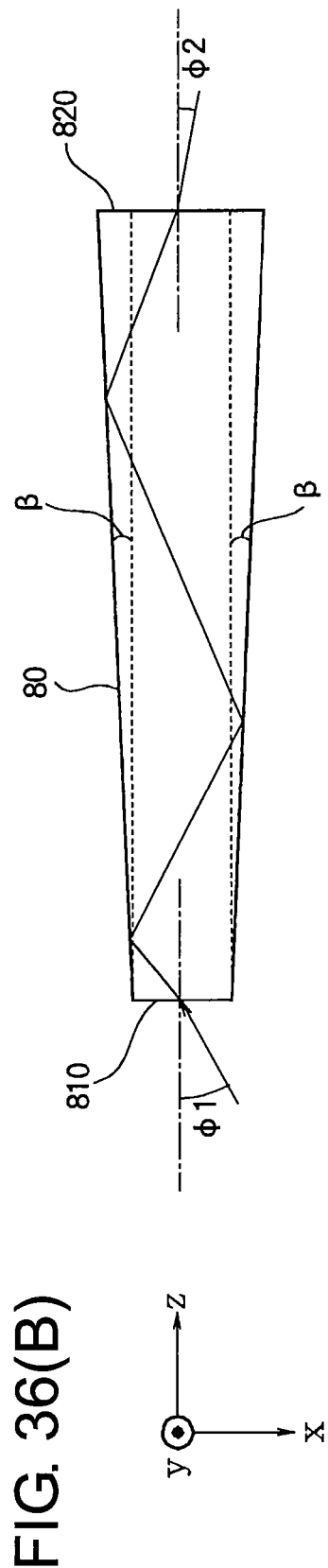
FIG. 36(A)
FIG. 36(B)

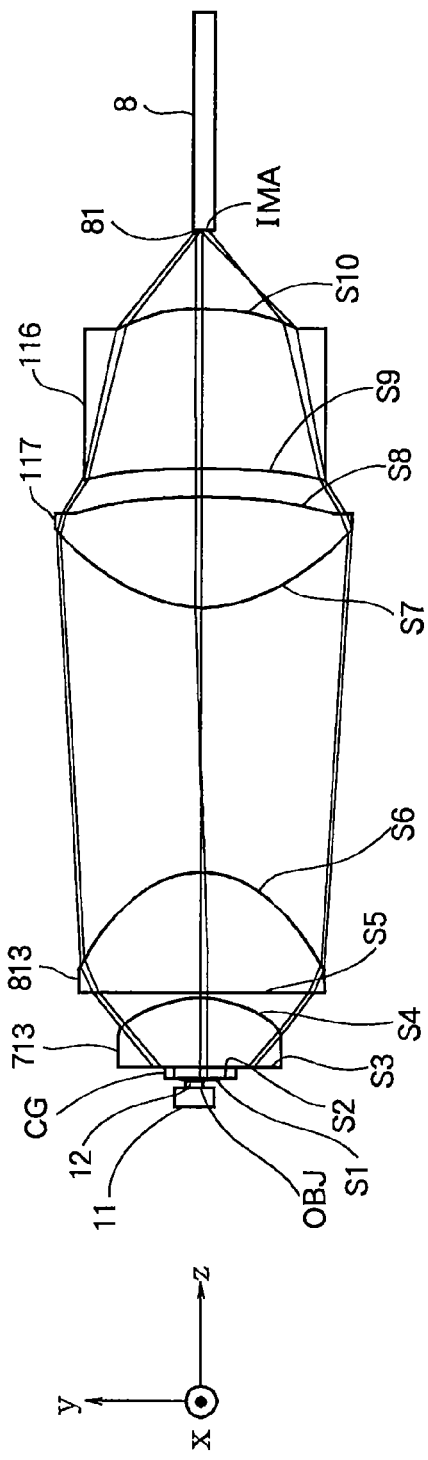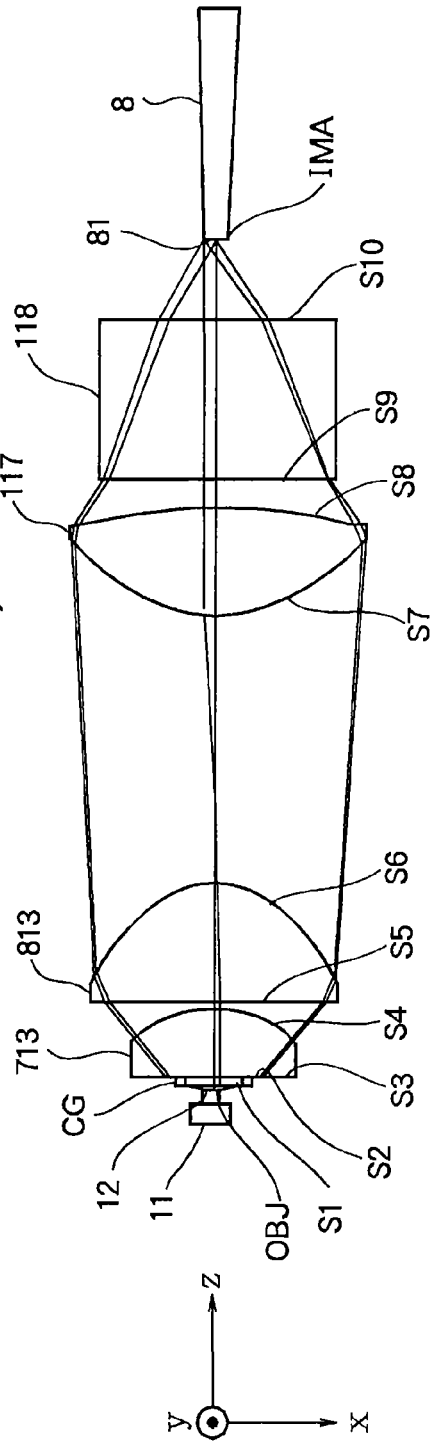

LIGHT CONVERGING OPTICAL SYSTEM AND PROJECTION-TYPE IMAGE DISPLAY APPARATUS

TECHNICAL FIELD

The present invention relates to a light converging optical system and a projection-type image display apparatus using the light converging optical system.

BACKGROUND ART

Conventionally, a lamp light source has been mainly used as a light source of a projection-type image display apparatus. However, the lamp light source has a disadvantage of short lifetime. Therefore, a surface-emission light source such as a light emitting diode (LED) having a longer lifetime is recently used in replacement of the lamp light source. Light emitted from a monochromatic color LED has a narrow wavelength band. Therefore, a wide color reproduction area can be obtained by using LEDs of red (R), green (G) and blue (B) in combination.

In order to enhance light use efficiency, Patent Document 1 discloses an illumination optical system using LEDs of R, G and B having rectangular light emitting surfaces. Light emitted from arbitrary points on the respective light emitting surfaces is parallelized by collimator optical systems, and combined by a dichroic mirror. The combined light is converged by a converging lens on an incident surface of an integrator rod. The illumination optical system forms a light source image of the LED (i.e., an image of the light emitting surface) on the incident surface of the integrator rod at a predetermined magnification.

Further, in an application of an odd-shaped display such as an extremely horizontally oblong display, there are cases where an aspect ratio of the light emitting surface and an aspect ratio of a screen shape of the display are different from each other. In such a case, the light source illuminates an area of the image display element whose aspect ratio is different from that of the light emitting surface, and therefore loss of light quantity occurs.

Then, Patent Document 2 proposes a configuration in which a toric lens is provided in a light path of the illumination optical system of the projection type image display apparatus so as to change the aspect ratio of the light emitting surface of the light source.

PRIOR ART DOCUMENT

Patent Document

Patent Document 1: Japanese Laid-Open Patent Publication No. 2009-300772 (paragraphs 0043-0050)
Patent Document 2: Japanese Laid-Open Patent Publication No. 2004-61848 (paragraph 0046-0052)

SUMMARY OF THE INVENTION

Problem to be Solved by the Invention

In order to suppress loss of light quantity in an illumination optical system of a projection-type image display apparatus, it is necessary to satisfy the following two conditions. A first condition is to set an incident angle of light to an allowable incident angle (i.e., a predetermined angle with which light can be effectively used in the apparatus). A second condition is to converge the light onto a predetermined illumination area.

In technology indicated by Patent Document 1, when an etendue of the LED is sufficiently smaller than an etendue of the integrator rod, the light emitted from the LED is efficiently converged on the integrator rod. However, in order to enhance brightness of the image display element (i.e., a body to be illuminated), the etendue of the LED is made larger than the etendue of the integrator rod. In such a case, if the light source image of the LED is formed to a size substantially the same as the incident surface of the integrator rod, the light is incident on the incident surface of the integrator rod at an incident angle larger than the allowable incident angle. Therefore, loss of light quantity occurs.

Further, even if the etendue of the LED is smaller than the etendue of the integrator rod, the light source image of the LED is blurred at a peripheral portion thereof due to aberration of a converging lens, and therefore a larger image is formed. As a result, the light source image of the LED may become larger than the incident surface of the integrator rod, and therefore loss of light quantity may occur.

Further, in the illumination optical system disclosed by Patent Document 2, the aspect ratio of the light emitting surface of the light source is converted so that the light is converged on the predetermined illumination area having the different aspect ratio. However, when the aspect ratio is converted, a converging angle on the illuminated surface changes due to principle of conservation of etendue. The principle of conservation of etendue is a natural law that a product of a usable area of a light source and a solid angle is constant.

For example, the aspect ratio of the light emitting surface of the light source (LED) is set to 4:3. Projection to a screen is performed by converting the aspect ratio from 4:3 to 16:9. In a configuration of Patent Document 2, an image magnification in a direction perpendicular to an optical axis and an image magnification in a direction parallel to the optical axis are changed using the toric lens having a toroidal surface. A direction of a short side of the screen is a direction in which the aspect ratio is compressed. Further, a converging angle of a light ray in the direction of the short side of the screen becomes large as compared with a light ray in the direction of a long side of the screen. Therefore, the incident angle of the light in the direction of the short side of the screen becomes larger than the predetermined angle (i.e., the allowable incident angle) at which the light can be effectively used in the apparatus. Accordingly, loss of light quantity is not reduced as a whole.

The present invention is intended to solve the above-described problems, and an object of the present invention is to provide a light converging optical system capable of reducing loss of light quantity when converging light emitted from a light source and capable of achieving high light use efficiency, and to provide a projection-type image display apparatus using the light converging optical system. Further, an object of the present invention is to provide a light converging optical system capable of reducing loss of light quantity even when an aspect ratio of a surface-emission light source is different from an aspect ratio of a light-intensity-distribution equalizing element or an image display element, and to provide a projection-type image display apparatus using the light converging optical system.

Means of Solving the Problem

A light converging optical system according to the present invention includes a surface-emission light source that has a light emitting surface and emits light from the light emitting surface, a collimator optical system that has a positive power and converts the light emitted from the light emitting surface into approximately parallel light, a light converging element that has a positive power and converges the light converted into the approximately parallel light, and a light-intensity-distribution equalizing element that has an incident surface on which the light converged by the light converging element is incident, equalizes light intensity distribution of incident light and emits the light from an emission surface. Among the light converged on the incident surface of the light-intensity-distribution equalizing element, a converging angle of the light converged on a center portion of the incident surface is smaller than a converging angle of the light converged on a corner portion of the incident surface.

Further, a light converging optical system according to the present invention includes a surface-emission light source that has a light emitting surface and emits light from the light emitting surface, a collimator optical system that has a positive power and converts the light emitted from the light emitting surface into approximately parallel light, a light converging element that has a positive power and converges the light converted into the approximately parallel light, and a light-intensity-distribution equalizing element that has an incident surface on which the light converged by the light converging element is incident, equalizes light intensity distribution of incident light and emits the light from an emission surface. Among light spots formed by the light incident on the incident surface of the light-intensity-distribution equalizing element, a light spot formed at a center portion of the incident surface is larger than a light spot formed at a corner portion of the incident surface.

Further, a light converging optical system according to the present invention includes a surface-emission light source that has a light emitting surface and emits light from the light emitting surface, a collimator optical system that has a positive power and converts the light emitted from the light emitting surface into approximately parallel light, a light converging element that has a positive power and converges the light converted into the approximately parallel light, and a light-intensity-distribution equalizing element that has an incident surface on which the light converged by the light converging element is incident, equalizes light intensity distribution of incident light and emits the light from an emission surface. Among the light emitted from the light emitting surface of the surface-emission light source, the light emitted from a center portion of the light emitting surface is converged on a position farther from the light converging element as compared with the light emitted from a corner portion of the light emitting surface.

Further, a light converging optical system according to the present invention includes a surface-emission light source that has a light emitting surface and emits light from the light emitting surface, a collimator optical system that has a positive power and converts the light emitted from the light emitting surface into approximately parallel light, a light converging element that has a positive power and converges the light converted into the approximately parallel light, and a light-intensity-distribution equalizing element that has an incident surface on which the light converged by the light converging element is incident, equalizes light intensity distribution of incident light and emits the light from an emission surface. An image magnification at which an image of the light emitting surface of the surface-emission light source is formed on the incident surface of the light-intensity-distribution equalizing element is larger at a corner portion of the light emitting surface than at a center portion of the light emitting surface.

Further, a light converging optical system according to the present invention includes a surface-emission light source that has a light emitting surface and emits light from the light emitting surface, a collimator optical system that has a positive power and converts the light emitted from the light emitting surface into approximately parallel light, and a light converging element that has a positive power and converges the light converted into the approximately parallel light on a display surface of an image display element. Among the light converged on the display surface of the image display element, a converging angle of the light converged on a center portion of the display surface is smaller than a converging angle of the light converged on a corner portion of the display surface.

Further, a light converging optical system according to the present invention includes a surface-emission light source that has a light emitting surface and emits light from the light emitting surface, a collimator optical system that has a positive power and converts the light emitted from the light emitting surface into approximately parallel light, and a light converging element that has a positive power and converges the light converted into the approximately parallel light on a display surface of an image display element. Among light spots formed by the light incident on the display surface of the image display element, a light spot formed at a center portion of the display surface is larger than a light spot formed at a corner portion of the display surface.

Further, a light converging optical system according to the present invention includes a surface-emission light source that has a light emitting surface and emits light from the light emitting surface, a collimator optical system that has a positive power and converts the light emitted from the light emitting surface into approximately parallel light, and a light converging element that has a positive power and converges the light converted into the approximately parallel light on a display surface of an image display element. Among the light emitted from the light emitting surface of the surface-emission light source, the light emitted from a center portion of the light emitting surface is converged on a position farther from the light converging element as compared with the light emitted from a corner portion of the light emitting surface.

Further, a light converging optical system according to the present invention includes a surface-emission light source that has a light emitting surface and emits light from the light emitting surface, a collimator optical system that has a positive power and converts the light emitted from the light emitting surface into approximately parallel light, and a light converging element that has a positive power and converges the light converted into the approximately parallel light on a display surface of an image display element. An image magnification at which an image of the light emitting surface of the surface-emission light source is formed on the display surface of the image display element is larger at a corner portion of the display surface than at a center portion of the display surface.

Further, a light converging optical system according to the present invention includes a surface-emission light source that has a light emitting surface and emits light from the light emitting surface, a collimator optical system that has a positive power and converts the light emitted from the light emitting surface into approximately parallel light, a light converging element that has a positive power, has two or more toroidal surfaces, and converges the light converted into the approximately parallel light, and a light-intensity-distribution equalizing element that has an incident surface on which the light converged by the light converging element is incident, equalizes light intensity distribution of incident light and emits the light from an emission surface. An aspect ratio of the light emitting surface is different from an aspect ratio of the incident surface. Among the light converged on the incident surface, a converging angle of the light converged on a center portion of the incident surface in a direction in which the aspect ratio is compressed is smaller than a converging angle of the light converged on a peripheral portion of the incident surface in the direction in which the aspect ratio is compressed.

Effect Of The Invention

According to the present invention, loss of light quantity can be reduced, and a light use efficiency can be enhanced. Further, even when an aspect ratio of a surface-emission light source is different from an aspect ratio of a light-intensity-distribution equalizing element, loss of light quantity at the light-intensity-distribution equalizing element can be reduced, and the light use efficiency can be improved.

BRIEF DESCRIPTION OF DRAWINGS

FIG. 6(A) is a view showing light spots formed on the incident surface of the integrator rod of the light converging optical system of Reference Example 1, and FIG. 6(B) is a view showing light spots formed on the incident surface of the integrator rod of the light converging optical system according to Embodiment 1.

FIG. 7 is a view schematically showing a size of an image formed on the incident surface of the integrator rod according to Embodiment 1.

FIGS. 22(A) and 22(B) are schematic views showing a configuration of a light converging optical system of Reference Example 2.

FIG. 25 is a schematic view showing a converging area on an incident surface of an integrator rod of Reference Example 3.

FIGS. 26(A) and 26(B) are view showing a configuration of a light converging optical system according to Embodiment 3 of the present invention.

FIGS. 29(A) and 29(B) are schematic views showing a state where light is converged by a converging F-number control lens of the light converging optical system according to Embodiment 3.

FIGS. 30(A) and 30(B) are views showing a configuration of a light converging optical system corresponding to Numerical Example 2.

FIGS. 36(A) and 36(B) are views for illustrating a shape of an integrator rod having a tapered shape according to Embodiment 4 as contrasted with a general integrator rod.

FIGS. 39(A) and (B) are views showing a configuration of a light converging optical system according to Numerical Example 2.

MODE FOR CARRYING OUT THE INVENTION

Embodiment 1.

Figure 1:
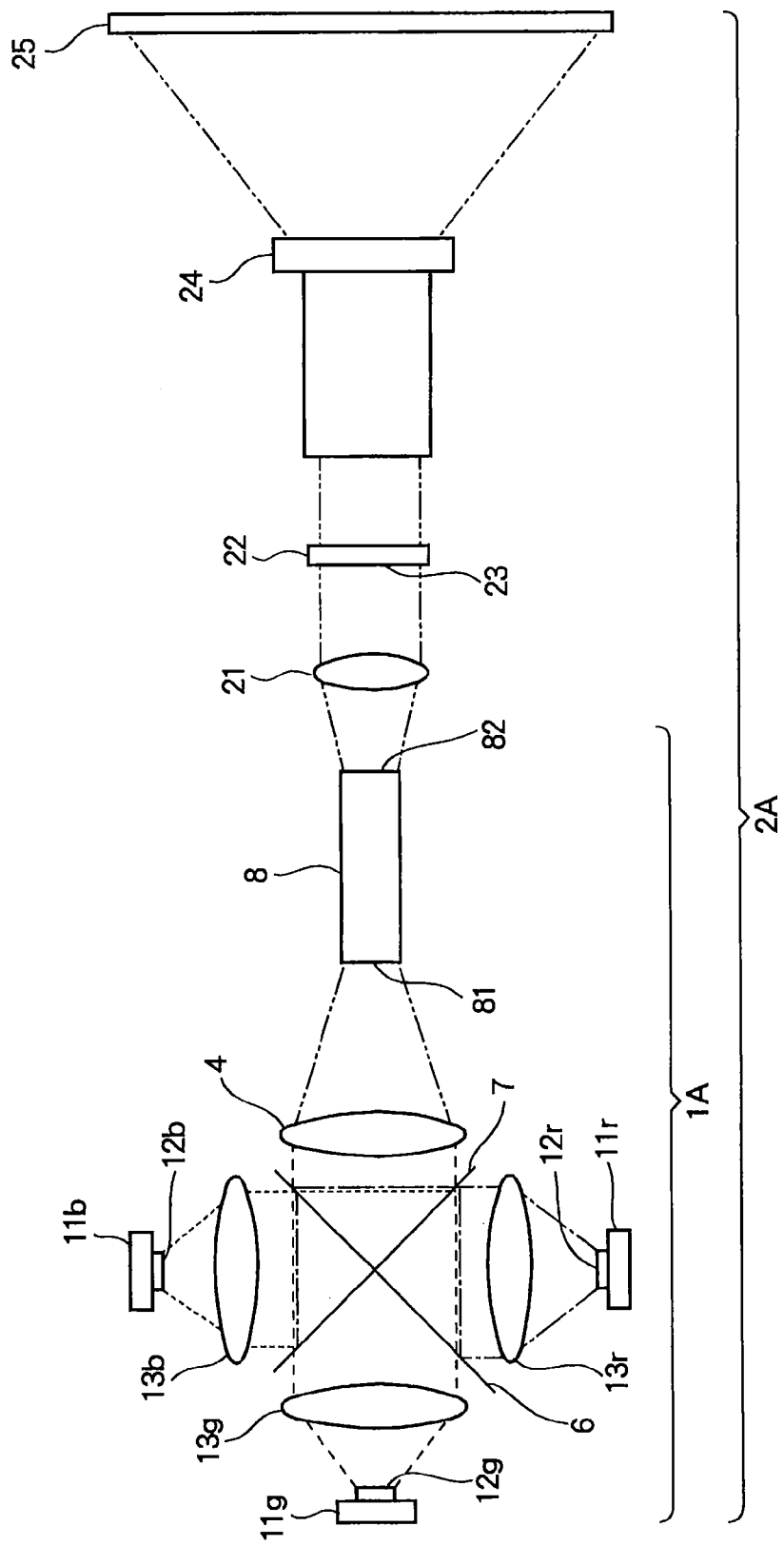
FIG. 1 is a view showing a basic configuration of a projection-type image display apparatus including a light converging optical system according to Embodiment 1 of the present invention.

FIG. 1 is a view showing a basic configuration of a projection-type image display apparatus 2A including a light converging optical system 1A according to Embodiment 1 of the present invention. The light converging optical system 1A of Embodiment 1 includes a red surface-emission light source 11r that emits light of a wavelength band of red (R) (hereinafter, red light), a green surface-emission light source 11g that emits light of a wavelength band of green (G) (hereinafter, green light) and a blue surface-emission light source 11b that emits light of a wavelength band of blue (B) (hereinafter, blue light).

In FIG. 1, red light (R) is shown by dashed lines, green light (G) is shown by long broken lines, and blue light (B) is shown by short broken lines.

The surface-emission light source 11r has a light emitting surface 12r that emits red light. Further, the surface-emission light sources 11g has a light emitting surface 12g that emits green light. The surface-emission light source 11b has a light emitting surface 12b that emits blue light. The light emitting surfaces 12r, 12g and 12b are flat surfaces having the same rectangular shape and having the same size.

The surface-emission light sources 11r, 11g and 11b can be constituted by LEDs (Light Emitting Diodes), EL (Electro-Luminescence) elements, semiconductor lasers, or a combination of these elements. Hereinafter, description will be made of a case where the LEDs are used as the surface-emission light sources 11r, 11g and 11b.

The light converging optical system 1A further includes collimator lenses (i.e., collimator optical systems) 13r, 13g and 13b respectively on emission sides of the light emitting surfaces 12r, 12g and 12b of the surface-emission light sources 11r, 11g and 11b. The collimator lenses 13r, 13g and 13b have positive power.

The collimator lens 13r converts the red light emitted from the red light emitting surface 12r into approximately parallel light. The collimator lens 13g converts the green light emitted from the green light emitting surface 12g into approximately parallel light. The collimator lens 13b converts the blue light emitted from the light emitting surface 12b into approximately parallel light.

The light converging optical system 1A includes a light synthesizing means that synthesizes the red light passing through the red collimator lens 13r, the green light passing through the green collimator lens 13g, and the blue light passing through the blue collimator lens 13b. The light synthesizing means is constituted by, for example, cross dichroic mirrors including two dichroic mirrors 6 and 7 that intersect perpendicularly with each other. The dichroic mirrors 6 and 7 have characteristics to transmit or reflect light of a specific wavelength band. In FIG. 1, the synthesized light is shown by two dotted chain lines.

In Embodiment 1, the light synthesizing means includes the dichroic mirror 6 that transmits the green light and the blue light and reflects the red light, and the dichroic mirror 7 that transmits the red light and the green light and reflects the blue light. In the cross dichroic mirrors, the mirrors are disposed in a relatively small space. Therefore, a more compact light converging optical system can be achieved as compared with a case where two dichroic mirrors are disposed apart from each other. In this regard, the light synthesizing means is not limited to the configuration shown in FIG. 1.

The light converging optical system 1A further includes a condenser lens (i.e., a light converging element) 4 that has a positive power and converges the light synthesized by the light synthesizing means (i.e., the dichroic mirrors 6 and 7), and an integrator rod 8 as a light-intensity-distribution equalizing element that equalizes intensity distribution of the light converged by the condenser lens 4. The integrator rod 8 has an incident surface 81 on which the light converged by the condenser lens 4 is incident, and an emission surface 82 from which the light whose intensity distribution is equalized is emitted.

The light synthesized by the dichroic mirrors 6 and 7 is incident on the condenser lens 4. The condenser lens 4 converges the synthesized light on the incident surface 81 of the integrator rod 8 at a desired angle. The light emitting surfaces 12r, 12g and 12b of the R, G and B surface-emission light sources 11r, 11g and 11b and the incident surface 81 of the integrator rod 8 are in conjugate relationship with each other. Secondary light source images of the light emitting surfaces 12r, 12g and 12b are formed on the incident surface 81 of the integrator rod 8.

The integrator rod 8 is constituted by a transparent member (in this example, glass) having a quadrangular prism shape with a rectangular cross section. The incident surface 81 has a rectangular shape similar to an image display element (shown by mark 22 in FIG. 1). The light incident on the incident surface 81 of the integrator rod 8 propagates through an interior of the integrator rod while repeating total reflection at boundaries between glass and air so that the light of respective colors is equalized, and is emitted from the emission surface 82. In this regard, the light-intensity-distribution equalizing element is not limited to the integrator rod 8, but may be a hollow light pipe with which total reflection at inner surfaces is utilized, or other elements.

The projection-type image display apparatus 2A includes the light converging optical system 1A configured in this way, an illumination optical system 21 on which the light (i.e., the light whose light intensity distribution has been equalized with the integrator rod 8) emitted from the light converging optical system 1A is incident, an image display element 22 that modulates the light from the illumination optical system 21 and generates image light, and a projection optical system 24 that projects the image light generated by the image display element 22 in an enlarged scale. In the case of a rear projection-type image display apparatus, the projection-type image display apparatus 2A further includes a screen 25 onto which the image light is projected in an enlarged scale.

The illumination optical system (also referred to as an illumination optical element) 21 causes the light emitted from the integrator rod 8 to be irradiated onto a display surface (i.e., a display area) 23 of the image display element 22, and is constituted by lenses or the like.

The emission surface 82 of the integrator rod 8 and the display surface 23 of the image display element 22 are in conjugate relationship with each other. An image of the emission surface 82 of the integrator rod 8 having a rectangular shape and having uniform brightness is formed on the display surface 23 of the image display element 22. Since the emission surface 82 of the integrator rod 8 and the display surface 23 of the image display element 22 have mutually similar shapes, the display surface 23 of the image display element 22 can be efficiently illuminated, and high light use efficiency can be obtained.

The image display element 22 is, for example, a liquid crystal panel of a transmission-type or a reflection-type, or a DMD (Digital Micro-Mirror Device) of a reflection-type. The display surface 23 of the image display element 22 has a configuration in which many pixels are arranged in two dimensions. The image display element 22 generates image light by intensity modulation of the light emitted from the illumination optical system 21 for respective pixels according to image signal.

The projection optical system 24 projects the light (i.e., image light) modulated by the image display element 22 on the screen 25 in an enlarged scale. In the case of a front projection type (i.e., a front projector), a reflection-type screen is used as the screen 25, and an observer views an image formed by reflected light. In the case of a rear projection type (i.e., a rear projector), a transmission-type screen is used as the screen 25, and the observer views an image formed by transmission light. The surface of the screen 25 and the display surface 23 of the image display element 22 are disposed on positions which are conjugate with each other.

In the projection-type image display apparatus 2A configured in this way, an image is displayed as follows. That is, the red light, green light and blue light emitted from the light emitting surfaces 12r, 12g and 12b of the surface-emission light sources 11r, 11g and 11b pass through the corresponding collimator lenses (i.e., the collimator optical systems) 13r, 13g and 13b, are converted into approximately parallel light, are incident on the dichroic mirrors 6 and 7, and are synthesized. The light synthesized by the dichroic mirrors 6 and 7 is converged by the condenser lens 4 on the incident surface 81 of the integrator rod 8. The light whose intensity distribution has been equalized by the integrator rod 8 passes through the illumination optical system 21, and is incident on the image display element 22. The image light modulated by the image display element 22 is projected by the projection optical system 24 onto the screen 25 in an enlarged scale, and an image is displayed on the screen 25.

The light converging optical system 1A has function to illuminate the image display element 22 (i.e., a body to be illuminated), and therefore may be referred to an illumination device.

Next, a relationship between sizes of the light emitting surfaces 12r, 12g and 12b of the surface-emission light sources 11r, 11g and 11b, a size of the incident surface 81 of the integrator rod 8, and a size of the display surface 23 of the image display element 22 will be described. In Embodiment 1, the light emitting surfaces 12r, 12g and 12b of the surface-emission light sources 11r, 11g and 11b and the incident surface 81 of the integrator rod 8 are in conjugate relationship with each other. The emission surface 82 of the integrator rod 8 and the display surface 23 of the image display element 22 are in conjugate relationship with each other.

Generally, when designing a light converging optical system and an illumination optical system, a quantity called etendue is taken into consideration. Here, a concept of etendue is applied to the light converging optical system 1A and the projection-type image display apparatus 2A of Embodiment 1. When light distribution of light fluxes emitted from the light emitting surfaces 12r, 12g and 12b of the surface-emission light sources 11r, 11g and 11b is assumed to be Lambertian distribution (i.e., perfect diffusion), etendue (Es) of the surface-emission light sources 11r, 11g and 11b, etendue (Ei) of the integrator rod 8 and etendue (El) of the image display element 22 are expressed by the following formulas (1) through (3), i.e., as a product of an area of a light emitting surface or an light receiving surface and a solid angle of light emitted from the light emitting surface or received by the light receiving surface.

$$Es = As \times \pi \times \sin^2(\theta s) \quad (1)$$

$$Ei = Ai \times \pi \times \sin^2(\theta i) \quad (2)$$

$$El = Al \times \pi \times \sin^2(\theta l) \quad (3)$$

In the formula (1), Es is etendue of the surface-emission light sources 11r, 11g and 11b. As is an area of the light emitting surfaces 12r, 12g and 12b of the surface-emission light sources 11r, 11g and 11b. θs is an angle (i.e., an acceptance angle) of a light ray emitted at a largest divergence angle among light rays emitted from the light emitting surfaces 12r, 12g and 12b of the surface-emission light sources 11r, 11g and 11b and to be incident on the collimator lenses 13r, 13g and 13b, with respect to a normal line of the light emitting surfaces 12r, 12g and 12b. π is a circular constant.

In the formula (2), Ei is etendue of the integrator rod 8. Ai is an area of the incident surface 81 of the integrator rod 8. θi is an angle (i.e., a converging angle) of the light ray emitted from the light emitting surfaces 12r, 12g and 12b of the surface-emission light sources 11r, 11g and 11b at the above described acceptance angle and to be incident on the incident surface 81 of the integrator rod 8, with respect to a normal line of the incident surface 81 of the integrator rod 8.

In the formula (3), El is etendue of the image display element 22. Al is an area of the display surface 23 of the image display element 22. θl is an angle (i.e., an illumination angle) of the light ray incident on the incident surface 81 of the integrator rod 8 at the above-described converging angle and to be incident on the display surface 23 of the image display element 22, with respect to a normal line of the display surface 23.

Generally, a light converging optical system and an illumination optical system are designed so that the values of above Es, Ei and El are the same. For example, when the sizes (a horizontal direction×a vertical direction) of the light emitting surfaces 12r, 12g and 12b of the surface-emission light sources 11r, 11g and 11b are 3 mm×4 mm (i.e., a diagonal size is 5 mm), and the light distribution of light fluxes emitted hemispherically)(θs=90°) from the light emitting surfaces 12r, 12g and 12b is Lambertian distribution, the etendue (Es) of the surface-emission light sources 11r, 11g and 11b is calculated as follows using the formula (1), and the result is approximately 37.7.

$$\begin{aligned} Es &= As \times \pi \times \sin^2(\theta s) \\ &= (3 \times 4) \times \pi \times \sin^2(90°) \\ &= 12 \times \Pi \approx 37.7 \end{aligned}$$

When the size of the display surface 23 of the image display element 22 is 12 mm×16 mm (i.e., a diagonal size is 20 mm), the F-number of the light illuminating the display surface 23 of the image display element 22 is 2.0 (θl≈14.5°), the etendue (El) of the image display element 22 is calculated as follows using the formula (3), and the result is approximately 37.7. That is, the etendue (El) of the image display element 22 can be the same as the etendue (Es) of the surface-emission light sources 11r, 11g and 11 b.

$$El = Al \times \pi \times \sin^2(\theta l)$$
$$= (12 \times 16) \times \pi \times \sin^2(14.5°)$$
$$\approx 192 \times \pi \times 0.0627 \approx 37.7$$

Further, when the F-number of the light incident on the incident surface 81 of the integrator rod 8 is 1.0 (θi=30°) and the size of the incident surface 81 of the integrator rod 8 is 6 mm×8 mm (i.e., a diagonal size is 10 mm), the etendue (Ei) of the integrator rod 8 is calculated as follows using the formula (2), and the result is approximately 37.7. That is, the etendue (Ei) of the integrator rod 8 can be the same as both of the etendue (Es) of the surface-emission light sources 11r, 11g and 11b and the etendue (El) of the image display element 22.

$$Ei = Ai \times \pi \times \sin^2(\theta i)$$
$$= (6 \times 8) \times \pi \times \sin^2(30°)$$
$$= 48 \times \pi \times 0.25 \approx 37.7$$

In the above-described example, the optical system including the collimator lenses 13r, 13g and 13b and the condenser lens 4 forms each image of the light emitting surfaces 12r, 12g and 12b (size: 3 mm×4 mm) of the surface-emission light sources 11r, 11g and 11b on the incident surface 81 (size: 6 mm×8 mm) of the integrator rod 8 in a scale twice as large as each of the light emitting surfaces 12r, 12g and 12b. In this state, when the light source image of the LED is blurred at a peripheral portion thereof due to aberration of the optical system including the collimator lenses 13r, 13g and 13b and the condenser lens 4 so that the image is formed in a larger size, or when the image magnification of the above described optical system is so large that the secondary light source images of the light emitting surfaces 12r, 12g and 12b of the surface-emission light sources 11r, 11g and 11b are formed in a larger size, the light is also irradiated outside the incident surface 81 of the integrator rod 8 (i.e., light that is not incident on the incident surface 81 exists), and loss of light quantity occurs.

In contrast, when the magnification of the optical system including the collimator lens 13r, 13g, and 13b and the condenser lens 4 is smaller than a desired value, secondary light source images of the light emitting surfaces 12r, 12g and 12b of the surface-emission light sources 11r, 11g and 11b become smaller, and the light incident outside the incident surface 81 of the integrator rod 8 is eliminated. However, in this case, the converging angle of the light incident on the incident surface 81 of the integrator rod 8 becomes large, the illumination angle of the light incident on the display surface 23 of the image display element 22 also becomes large. As a result, loss of light quantity or an enlargement of the projection optical system may be caused.

That is, in the light converging optical system 1A, it is necessary that the light emitted from the light emitting surfaces 12r, 12g and 12b of the surface-emission light sources 11r, 11g and 11b at a predetermined acceptance angle is converged to a predetermined size at a predetermined converging angle. If these predetermined converging angle and the predetermined size are exceeded, loss of light quantity or the like may occur.

However, difficulty in accepting all the light emitted from the surface-emission light sources 11r, 11g and 11b (to θs=90°) is taken into consideration. Further, manufacturing errors and uniformity are also taken into consideration. With these being taken into consideration, in practice, the acceptance angle and the size of the incident surface 81 of the integrator rod 8 are suitably optimized according to specifications of the optical system by, for example, illuminating a slightly larger area of the display surface 23 of the image display element 22 (i.e., an illumination margin).

When the etendue of the image display element 22 and the etendue of the integrator rod 8 are assumed to be the same as each other or have a certain relationship, it is most desirable in respect of light use efficiency that the etendue of the surface-emission light sources 11r, 11g and 11b and the etendue of the integrator rod 8 are the same as each other. However, there are limited choices of sizes and specifications of the surface-emission light sources 11r, 11g and 11b and the image display element 22 in practice. Therefore, it is not always possible to make the etendue of the surface-emission light sources 11r, 11g and 11b and the etendue of the integrator rod 8 the same as each other.

If the etendue of the surface-emission light source is smaller than the etendue of the integrator rod, the highest brightness attainable in the image display element 22 cannot be obtained. Therefore, in many cases, the etendue of the surface-emission light source is set to be larger than the etendue of the integrator rod. Further, even when the etendue of the surface-emission light source is smaller than the etendue of the integrator rod, loss of light quantity occurs if the aberration of the converging system is large.

Thus, when the etendue of the surface-emission light source is set to be larger than the etendue of the integrator rod, all the light emitted from the surface-emission light source cannot be taken into the integrator rod at a converging angle smaller than or equal to a desired angle, and loss of light quantity occurs. This will be described with reference to Reference Example 1 of FIG. 2 and FIG. 3.

Figure 2:
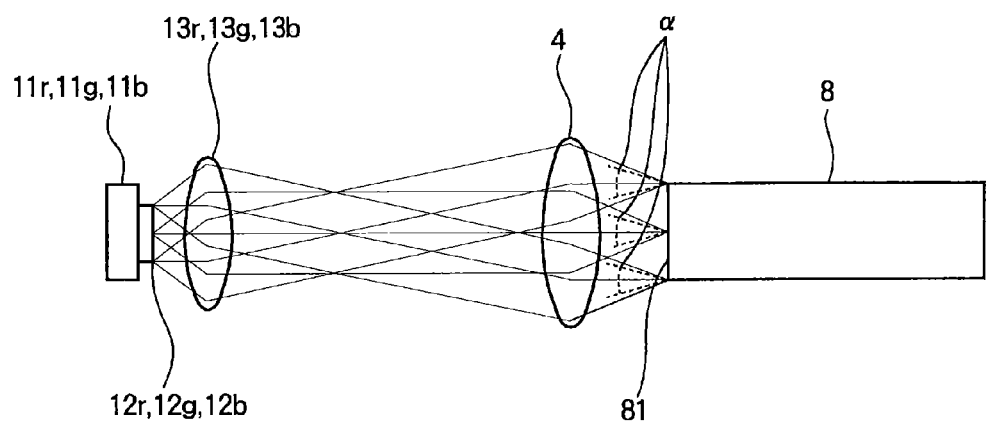
FIG. 2 is a view showing a configuration of the light converging optical system of Reference Example 1.
Figure 3:
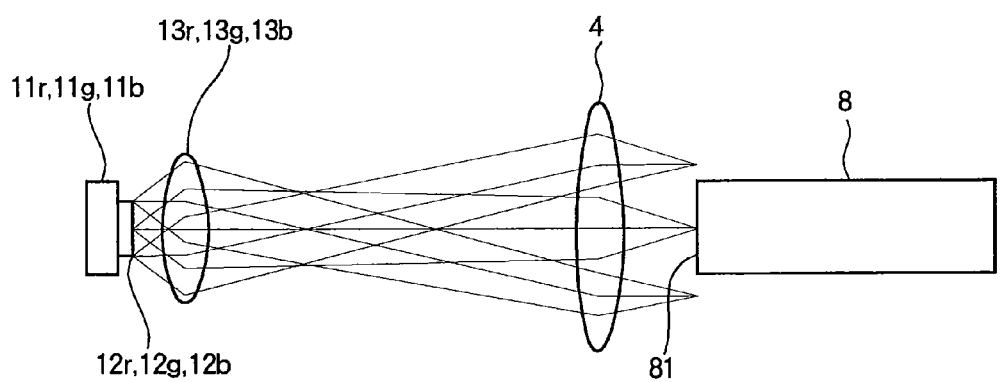
FIG. 3 is a view showing the configuration of the light converging optical system of Reference Example 1.

As Reference Example 1, FIG. 2 and FIG. 3 show a configuration in the case where all the light emitted from the surface-emission light source cannot be taken into the integrator rod at the converging angle smaller than or equal to a desired angle and loss of light quantity occurs. For convenience in explanation, components of Reference Example 1 will be described using the same marks as the components of Embodiment 1.

The size of the incident surface 81 of the integrator rod 8 is defined in accordance with the specifications (i.e., the area and F-number) of the image display element 22. In Reference Example 1 shown in FIG. 2, each image of the light emitting surfaces 12r, 12g and 12b of the surface-emission light sources 11r, 11g and 11b is formed on the incident surface 81 of the integrator rod 8 with the image magnification so that the size of the image is the same size as the incident surface 81 of the integrator rod 8. In this case, the light emitted from each point of the light emitting surfaces 12r, 12g and 12b of the surface-emission light sources 11r, 11g and 11b is converged on the incident surface 81 of the integrator rod 8 at a larger angle α than an allowable incident angle. Therefore, loss of light quantity occurs. This loss of light quantity is referred to as "angle-based loss of light quantity".

In this regard, the allowable incident angle is a limit of the incident angle such that, when the incident angle is larger than the allowable incident angle, a part of light emitted from the integrator rod 8 is not incident on subsequent optical elements (in this example, the illumination optical system 21 and the projection optical system 24).

In contrast, in Reference Example 1 shown in FIG. 3, the light emitted from each point of the light emitting surfaces 12r, 12g and 12b of the surface-emission light sources 11r, 11g and 11b is converged on a plane including the incident surface 81 of the integrator rod 8 at an angle smaller than or equal to the allowable incident angle. However, the image magnification becomes larger than in FIG. 2. Therefore, the secondary light source image of the light emitting surfaces 12r, 12g and 12b of the surface-emission light sources 11r, 11g and 11b become larger than the size of the incident surface 81 of the integrator rod 8, and loss of light quantity occurs. This loss of light quantity is referred to as "area-based loss of light quantity".

Figure 4:
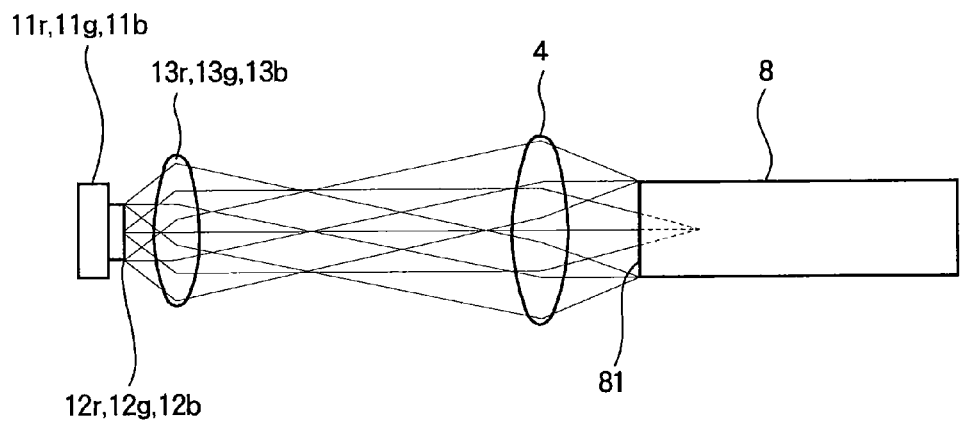
FIG. 4 is a view showing the configuration of the light converging optical system according to Embodiment 1.

FIG. 4 is a view showing optical paths in the light converging optical system 1A according to Embodiment 1 of the present invention. In this regard, an influence of the dichroic mirrors 6 and 7 on a state of convergence of the light emitted from the surface-emission light sources 11r, 11g and 11b is negligible, and therefore the dichroic mirrors 6 and 7 are omitted in FIG. 4. As in Reference Example 1 (FIG. 2 and FIG. 3), the etendue of the surface-emission light sources 11r, 11g and 11b is larger than the etendue of the integrator rod 8.

In this regard, in the following explanation, the surface-emission light sources 11r, 11g and 11b will be collectively referred to as the "surface-emission light source 11" as necessary. Further, the light emitting surfaces 12r, 12g and 12b will be collectively referred to as "the light emitting surface 12", and the collimator lenses 13r, 13g and 13b will be collectively referred to as "collimator lens 13" as necessary.

When the etendue of the surface-emission light source 11 is larger than the etendue of the integrator rod 8, the angle-based loss of light quantity (FIG. 2), the area-based loss of light quantity (FIG. 3) or both occurs as described above. Embodiment 1 is intended to reduce, particularly, the angle-based loss of light quantity (FIG. 2).

In FIG. 4, the light emitted from corner portions (i.e., four corners) of the light emitting surface 12 of the surface-emission light source 11 is incident on corner portions of the incident surface 81 of the integrator rod 8 at a predetermined incident angle. In contrast, the light emitted from a center portion of the light emitting surface 12 of the surface-emission light source 11 is incident on a center portion of the incident surface 81 of the integrator rod 8 at an incident angle smaller than the incident angle of the light emitted from four corners of the light emitting surface 12.

In other words, the image magnification when the image of the light emitting surface 12 of the surface-emission light source 11 is formed on the incident surface 81 of the integrator rod 8 is larger at the center portion than at the corner portion of the incident surface 81.

Figure 5:
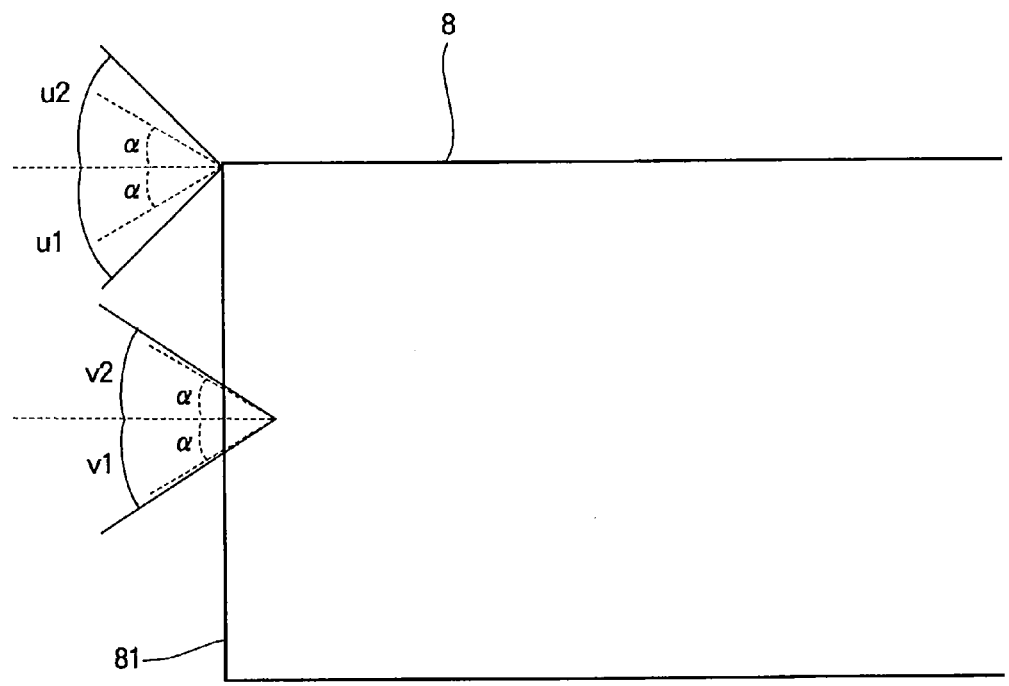
FIG. 5 is a view showing a state where light is converged on an incident surface of an integrator rod of the light converging optical system according to Embodiment 1.

FIG. 5 is an enlarged view showing a state where the light emitted from the light emitting surface 12 (12r, 12g, 12b) of the surface-emission light source 11 (11r, 11g, 11b) is converged on the integrator rod 8. Here, for convenience in explanation, description will be made on assumption that a direction of a normal line of the incident surface 81 of the integrator rod 8 is a horizontal direction.

The light emitted downward with respect to the horizontal direction from one point of the corner portion of the light emitting surface 12 of the surface-emission light source 11 is converged at an angle u1 upward with respect to the horizontal direction on the corner portion of the incident surface 81 of the integrator rod 8. The light emitted upward with respect to the horizontal direction from one point of the corner portion of the light emitting surface 12 of the surface-emission light source 11 is converged at an angle u2 downward with respect to the horizontal direction on the corner portion of the incident surface 81 of the integrator rod 8.

Further, the light emitted downward with respect to the horizontal direction from one point of the center portion of the surface-emission light source 11 is converged at an angle v1 upward with respect to the horizontal direction on the center portion of the incident surface 81 of the integrator rod 8. The light emitted upward with respect to the horizontal direction from one point of the center portion of the surface-emission light source 11 is converged at the angle v2 downward with respect to the horizontal direction on the center portion of the incident surface 81 of the integrator rod 8.

The allowable incident angle on the integrator rod 8 in each of upward and downward direction is expressed as $\alpha$. At the corner portion of the incident surface 81 of the integrator rod 8, the converging angles u1 and u2 are larger than $\alpha$, and therefore the angle-based loss of light quantity occurs. In contrast, at the center portion of the incident surface 81 of the integrator rod 8, the converging angles v1 and v2 are smaller than $\alpha$, and therefore the angle-based loss of light quantity does not occur.

As a result, as compared with Reference Example 1 shown in FIG. 2, the angle-based loss of light quantity of the light emitted from the center portion of the light emitting surface 12 of the surface-emission light source 11 can be reduced. In this case, when the converging angle of the light emitted from the center portion of the surface-emission light source 11 is smaller than the allowable incident angle, and as the converging angle of the light emitted from the center portion of the surface-emission light source 11 is closer to the allowable incident angle, the loss of light quantity can be made smaller.

In Embodiment 1, although the size of the secondary light source image and the size of the incident surface 81 of the integrator rod 8 are made the same as each other. However, Embodiment 1 is not limited to such a configuration, but can be modified. For example, it is also possible to make the image magnification be slightly larger.

FIG. 6 shows light spots formed on the incident surface 81 of the integrator rod 8 by the light emitted from four corners and the center portion of the surface-emission light source. FIG. 6(A) shows light spots on the incident surface 81 of the light converging optical system of Reference Example 1 shown in FIG. 2. FIG. 6(B) shows light spots on the incident surface 81 of the light converging optical system of Embodiment 1 shown in FIG. 4.

As shown in FIG. 6(A), in the light converging optical system of Reference Example 1, all the light spots formed at four corners and the center portion of the light emitting surface 12 of the surface-emission light source 11 are small (in this regard, the light spots on the peripheral portion is not exactly converged at one point but is blurred to some extent, and therefore there is light that is not incident on the incident surface 81 of the integrator rod 8 also exists). In contrast, in the light converging optical system of Embodiment 1, the light spots formed at four corners of the light emitting surface 12 of the surface-emission light source 11 are small, but the light spot formed at the center portion is large as shown in FIG. 6(B).

The reason is as follows. The image magnification of the light emitted from four corners of the light emitting surface 12 of the surface-emission light source 11 is made larger than the image magnification of the light emitted from the center portion of the light emitting surface 12. Therefore, although the light emitted from four corners of the light emitting surface 12 are converged on the incident surface 81 of the integrator rod 8, the light emitted from the center portion of the light emitting surface 12 is converged on the emission surface 82 side (i.e., a side farther from the condenser lens 4) with respect to the incident surface 81 of the integrator rod 8 (FIG. 5).

If the light spots become large on four corners of the incident surface 81 of the integrator rod 8, part of the light spots protrude outside the incident surface 81, and the above described area-based loss of light quantity occurs. In contrast, on the center portion of the incident surface 81 of the integrator rod 8, the light spot does not protrude outside even if the light spot becomes large to some extent. Therefore, the angle-based loss of light quantity can be reduced, without causing the area-based loss of light quantity.

FIG. 7 is a schematic view showing a state where images of minute areas of the center portion and the corner portion of the light emitting surface 12 of the surface-emission light source 11 are formed on the incident surface 81 of the integrator rod 8.

Images of minute lengths Δa at the center portion and the corner portion of the light emitting surface 12 of the surface-emission light source 11 are formed on the incident surface 81 of the integrator rod 8 respectively as a length Δc (at the center portion) and a length Δp (at the corner portion) by the collimator lens 13 and the condenser lens 4. In this state, as described above, the converging angle on the incident surface 81 of the integrator rod 8 is larger at the center portion than at the corner portion. That is, Δc is larger than Δp.

Figure 8:
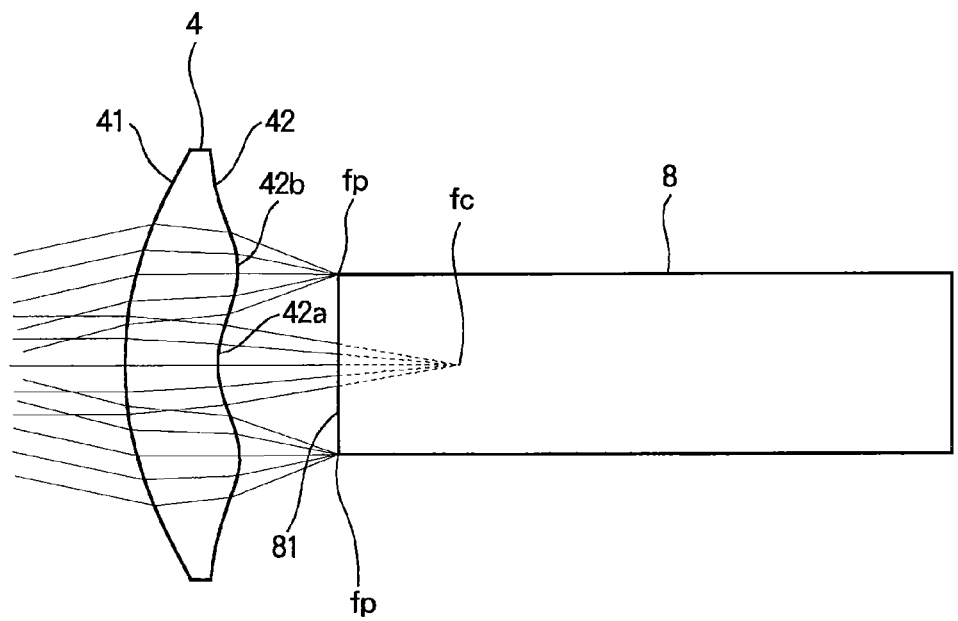
FIG. 8 is a view showing an example of a shape of a condenser lens of the light converging optical system and a state where light is converged by the condenser lens according to Embodiment 1.

FIG. 8 is a view showing an example of a shape of the condenser lens 4. The condenser lens 4 includes a first surface 41 on which the light from the surface-emission light source 11 is incident, and a second surface 42 from which the light incident on the first surface 41 is emitted. The condenser lens 4 has a positive power as a whole, and converges the light incident on the first surface 41 and emits the light from the second surface 42. The first surface 41 has a shape of a convex surface. In a cross section including an optical axis (i.e., a center) of the condenser lens 4, the second surface 42 has a center-vicinity 42a having a shape of a concave surface, and a peripheral portion 42b having a shape of a convex aspheric surface.

The light emitted from the corner portion of the light emitting surface 12 of the surface-emission light source 11 is subjected to converging action at the first surface 41, further subjected to converging action at the peripheral portion 42b (i.e., the convex surface) of the second surface 42, and is converged on a converging point fp. This converging point fp is located approximately on the incident surface 81 of the integrator rod 8.

In contrast, although the light emitted from the center portion of the light emitting surface 12 of the surface-emission light source 11 is subjected to converging action at the first surface 41, but is almost not subjected to diverging/converging action at the center-vicinity 42a (i.e., the concave surface) of the second surface 42, and is converged on a converging point fc. This converging point fc is located on the emission surface 82 side (i.e., on a side farther from the condenser lens 4) with respect to the incident surface 81 of the integrator rod 8.

With such a configuration, the converging angle on the center portion of the incident surface 81 of the integrator rod 8 can be made smaller than the converging angle on the corner portion.

In this regard, although the center-vicinity 42a of the second surface 42 of the condenser lens 4 has a shape closer to a spherical surface having a center on the converging point fc (i.e., the converging point of the light from the center portion of the light emitting surface 12 of the surface-emission light source 11), the center-vicinity 42a is not limited to such a shape.

Figure 9:
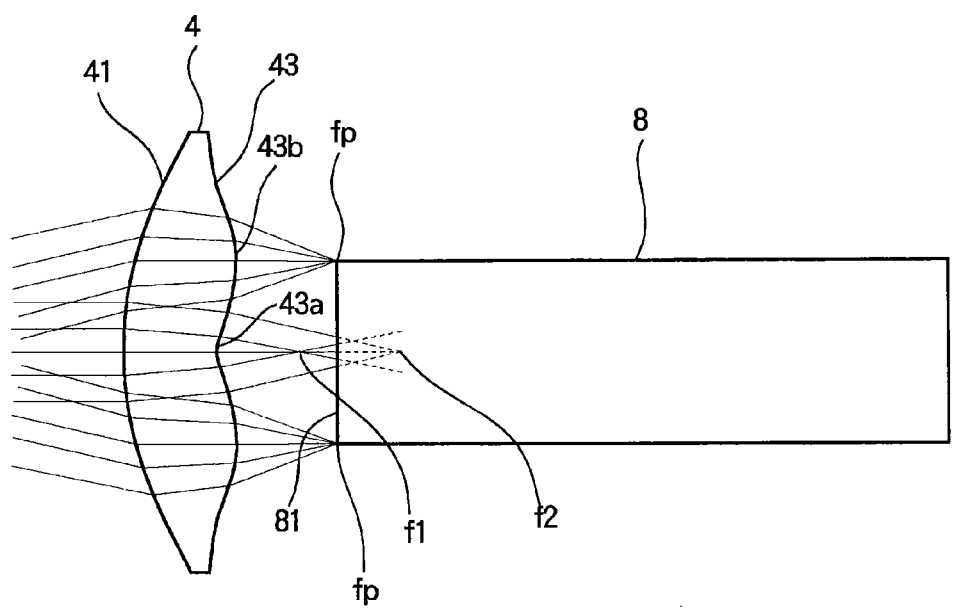
FIG. 9 is a view showing an example of a shape of a condenser lens of a light converging optical system and a state where light is converged by the condenser lens according to Modification.

FIG. 9 shows a modification of a shape of the condenser lens 4. In this modification, a shape of a concave surface of a center-vicinity 43a of a second surface 43 is not an approximately spherical surface. In this modification, the center-vicinity 43a of the second surface 43 of the condenser lens 4 has a larger curvature than the center-vicinity 42a of the second surface 42 of the condenser lens 4 shown in FIG. 8, or has a discontinuous shape at the center. In this example, converging points (f1 and f2) of light from respective ring zones in the center-vicinity 43a of the condenser lens 4 are largely different, and light from the center portion of the light emitting surface 12 of the surface-emission light source 11 does not have a specific converging point. Also this case, when the light is incident on the incident surface 81 of the integrator rod 8 at an angle smaller than or equal to the allowable incident angle, the loss of light quantity can be prevented.

In this regard, in the above description, a difference in the converging angle of the light between the corner portion and the center portion of the incident surface 81 of the integrator rod 8 is provided by the surface shape of the second surface 43 of the condenser lens 4. However, this embodiment is not limited to such a configuration.

For example, function to provide the difference in the converging angle of the light between the corner portion and the center portion of the incident surface 81 of the integrator rod 8 may be shared by surface shapes of the first surface 41 and the second surface 42 of the condenser lens 4. Further, the condenser lens 4 may be constituted by a plurality of lenses that share the above described function with each other.

Further, it is only necessary that the function to provide the difference in the converging angle of the light between the corner portion and the center portion of the incident surface 81 of the integrator rod 8 is fulfilled by a whole of the light converging optical system including the collimator lens 13 and the condenser lens 4. The above described function may be fulfilled by the collimator lens 13 only, or may be fulfilled by both of the collimator lens 13 and the condenser lens 4.

In this regard, if the surface fulfilling the function to provide the difference in the converging angle of the light between the corner portion and the center portion of the incident surface 81 of the integrator rod 8 has a aspherical surface, and if a cost for producing the aspherical surface is higher than a cost for producing the spherical surface, it is desirable that the condenser lens 4 fulfils the function. This is because the condenser lens commonly acts on the light emitted from the surface-emission light sources 11 (11r, 11g, 11b) of respective colors (i.e., the number of elements is small).

Numerical Example 1

Figure 10:
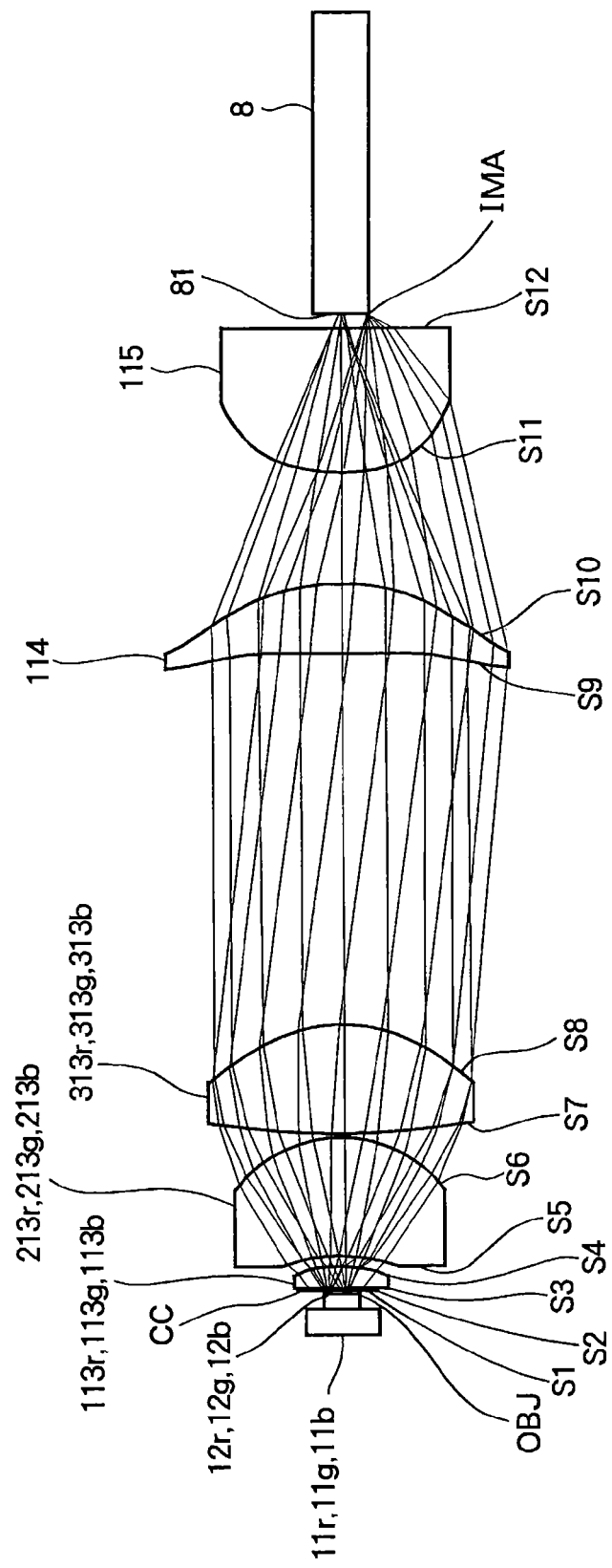
FIG. 10 is a view showing a specific configuration of a light converging optical system corresponding to Numerical Example 1 of Embodiment 1.

Hereinafter, Numerical Example 1 of the light converging optical system 1A according to Embodiment 1 will be described. Table 1 shows optical data of the light converging optical system 1A. FIG. 10 shows a configuration of the light converging optical system corresponding to the optical data of Table 1.

In this example, each size of the light emitting surface 12 (12r, 12g, 12b) of the surface-emission light source 11 is 4.16 mm×2.6 mm. The size of the incident surface 81 of the integrator rod 8 is 6.08 mm×3.8 mm. The acceptance angle of the light from the surface-emission light source 11 is 80 degrees (in half angle). The allowable incident angle on the integrator rod 8 is 30 degrees (i.e., F-number is 1.0) in half angle. This is equivalent to a case where an area of 15.2 mm×9.5 mm on the display surface 23 of the image display element 22 is illuminated with F-number 2.5 (approximately 11.5 degrees (in half angle)). Wavelengths of the red light (11b), the green light (11g) and the blue light (11r) emitted from the surface-emission light source 11 are respectively 623 nm, 526 nm and 462 nm.

side in the direction of the optical axis. The radius of curvature Ri and the surface interval Di are expressed in unit of millimeter (mm). Columns of Nd and νd respectively show a refractive index for d-line (wavelength is 587.6 nm) and an Abbe number.

TABLE 1

| LENS | SURFACE NUMBER Si | RADIUS OF CURVATURE Ri (mm) | SURFACE INTERVAL Di (mm) | REFRACTIVE INDEX Nd | ABBE NUMBER νd |
|---|---|---|---|---|---|
| 12r | OBJ | INFINITY | 0.37 | — | — |
| 12g | | | | | |
| 12b | | | | | |
| CG | S1 | INFINITY | 0.3 | 1.5231 | 55 |
| | S2 | INFINITY | (r)0.17 | — | — |
| | | | (g)0.1 | | |
| | | | (b)0.05 | | |
| 113r | S3 | INFINITY | 2.7 | 1.7433 | 49.2 |
| 113g | S4 | −21.30196 | 1.29 | — | — |
| 113b | | | | | |
| 213r | S5 | −29.52049 | 16 | 1.7433 | 49.2 |
| 213g | | | | | |
| 213b | S6 | −18.54711 | 0.5 | — | — |
| 313r | S7 | 113.3922 | 14.8 | 1.523 | 58.3 |
| 313g | S8* | −20.95281 | 50 | — | — |
| 313b | | | | | |
| 114 | S9* | 115.4164 | 9.346487 | 1.7433 | 49.2 |
| | S10* | −28.29934 | 14.95514 | — | — |
| 115 | S11* | 28.58163 | 19.62288 | 1.523 | 58.3 |
| | S12* | INFINITY | 1.767459 | — | — |
| — | IMA | INFINITY | — | — | — |

In a column of the surface number Si in the optical data shown in Table 1, a surface number of i-th surface corresponding to a mark Si shown in FIG. 10 is provided. A number i is a natural number greater than or equal to 1. The number of a surface of a most object-side element is 1. The number i sequentially increases toward an image side. The "object side" indicates the surface-emission light sources 11r, 11g and 11b side. In the column of the surface number Si, the light emitting surfaces 12r, 12g and 12b of the surface-emission light sources are expressed as OBJ, and the incident surface 81 of the integrator rod 8 is expressed as IMA. CG indicates a cover glass of the surface-emission light source.

Regarding the surface interval of S2 of Table 1, (r), (g) and (b) correspond to surface intervals respectively for the red, green and blue surface-emission light sources. In order to correct chromatic aberration between the respective colors, an interval between the surface S2 and the surface S3 is set to different values for the respective colors.

Further, in Table 1, a sign "*" given to an upper right of the surface number indicates that the lens surface is an aspherical surface. Here, S8, S9, S10, S11 and S12 are aspherical surfaces. Table 2 shows aspherical surface data.

TABLE 2

| | SURFACE NUMBER | | | | |
|---|---|---|---|---|---|
| | S8 | S9 | S10 | S11 | S12 |
| k | −8.022716E−01 | −2.44512E+03 | −1.19044E+00 | 1.89839E+00 | 0 |
| A1 | 0 | 0 | 0 | 0 | 0 |
| A2 | 0 | 0 | 0 | 0 | 2.582873E−01 |
| A3 | 0 | 0 | 0 | 0 | −1.455971E−01 |
| A4 | −5.680631E−06 | −1.748405E−05 | −3.938850E−06 | −1.078345E−05 | 3.232564E−02 |
| A5 | 0 | 0 | 0 | 0 | −3.530807E−03 |
| A6 | 4.538869E−08 | 6.726470E−09 | 3.247966E−10 | 8.854132E−07 | 1.803433E−04 |
| A7 | 0 | 0 | 0 | 0 | −2.341330E−06 |
| A8 | −4.538019E−11 | 1.202274E−11 | −5.310997E−12 | −7.148446E−09 | −7.555612E−08 |
| A9 | 0 | 0 | 0 | 0 | 0 |
| A10 | −1.236856E−13 | 1.266630E−14 | 3.509382E−14 | 3.135224E−11 | 0 |
| A11 | 0 | 0 | 0 | 0 | 0 |
| A12 | −2.594120E−16 | 0 | 0 | −6.369895E−14 | 0 |
| A13 | 0 | 0 | 0 | 0 | 0 |
| A14 | 1.771464E−18 | 0 | 0 | 4.978408E−17 | 0 |

A column of a radius of curvature Ri in Table 1 shows a radius of curvature of the i-th surface from the object side. A column of a surface interval Di shows an interval between the i-th surface Si and the (i+1)-th surface Si+1 from the object The aspherical surface data in Table 2 show respective aspherical coefficients k and Ai of the expression of the aspherical surface shape expressed by the following expression (4). Z is an aspherical sag (mm) at a radius r (mm) from an optical axis. k represents a conic coefficient. C represents a curvature at a surface vertex. Ai represents an aspherical coefficient of i-th order.

$$Z1(r)=C \cdot r^2/\{1+(1-(1+k)\cdot C^2 \cdot r^2)^{1/2}\}+\Sigma Ai \cdot ri \ (i=1 \ldots n) \quad (4)$$

In this regard, the optical data shown in Table 1 and Table 2 are merely for explaining the functions of the light converging optical system 1A of Embodiment 1. For example, although many aspherical lenses are used here, the aspherical lenses may be replaced with a plurality of spherical lenses. It is also possible to use various glass materials having different refractive indexes or Abbe numbers from those shown in Table 1.

In Table 1 and FIG. 10, CG indicates a cover glass (i.e., a parallel flat plate) of the surface-emission light source 11. The collimator lens 13 (13r, 13g and 13b) includes three lenses, i.e., a first collimator lens 113 (113r, 113g and 113b), a second collimator lens 213 (213r, 213g and 213b) and a third collimator lens 313 (313r, 313g and 313b) from the surface-emission light source 11 side toward the integrator rod 8 side. Further, the condenser lens 4 (FIG. 1) includes two lenses, i.e., the first condenser lens 114 and the second condenser lens 115 from the surface-emission light source 12 sides toward the integrator rod 8 side.

Figure 11:
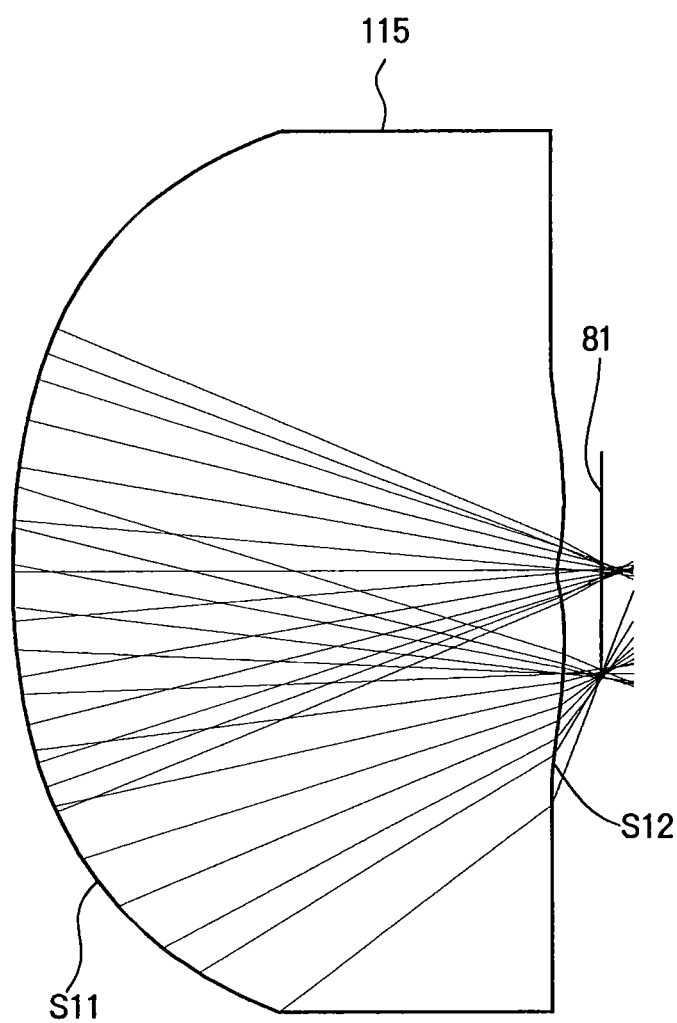
FIG. 11 is a view showing a shape of a condenser lens corresponding to Numerical Example 1 of Embodiment 1.

FIG. 11 shows a shape of the condenser lens 115 and a state where light is converged on the integrator rod 8. The second surface S12 of the condenser lens 115 has a shape of a concave surface in the vicinity of a center. The condenser lens 115 almost does not converge or diverge the light emitted from the center portion of the light emitting surface 12 of the surface-emission light source 11. In contrast, the second surface S12 of the condenser lens 115 has a shape of a convex surface at the peripheral portion. With a positive power of the convex surface, the condenser lens 115 converges the light emitted from the corner portion of the light emitting surface 12 of the surface-emission light source 11. As a result, the converging angle on the incident surface 81 of the integrator rod 8 is smaller at the center portion than at the corner portion.

Figure 12:
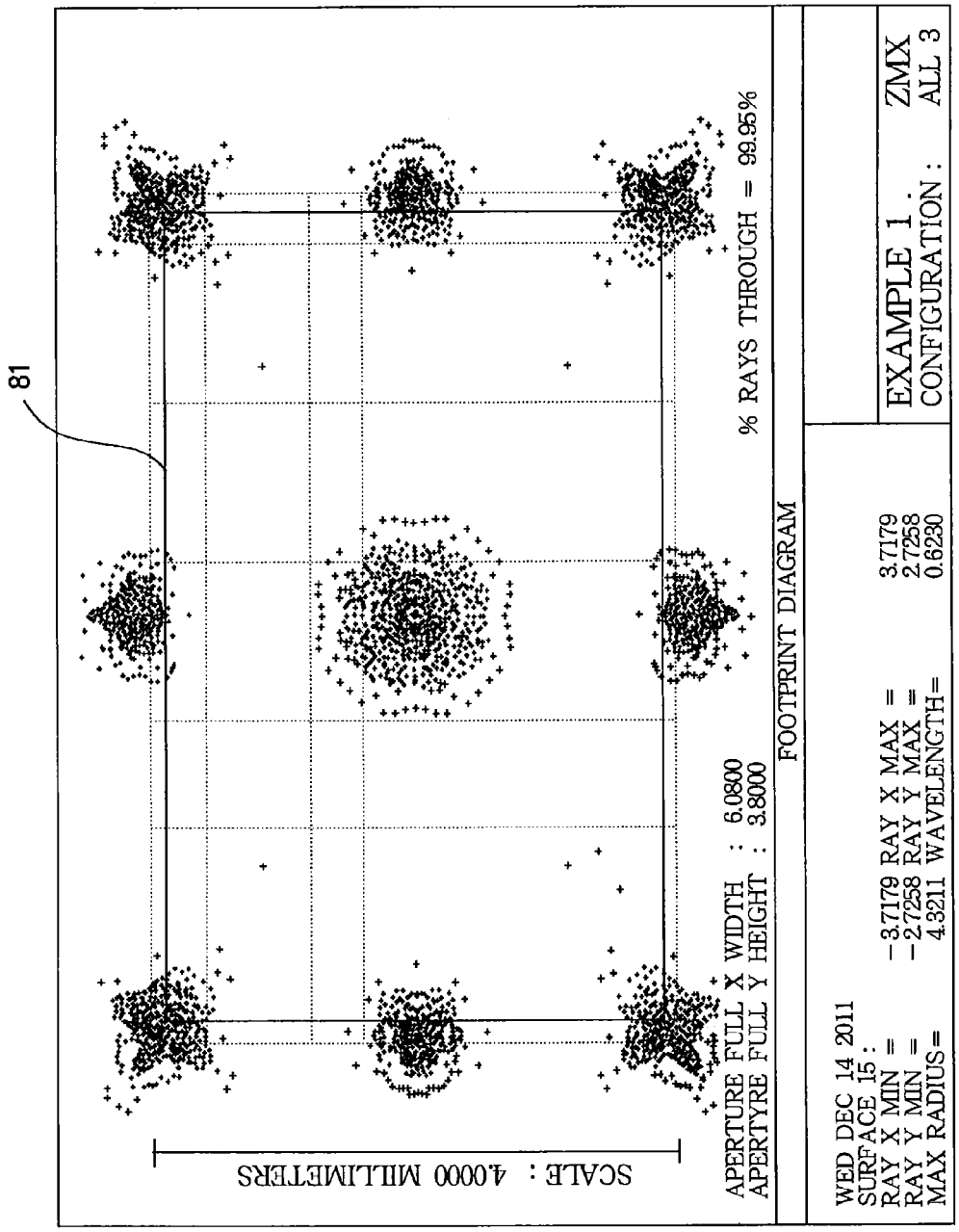
FIG. 12 is a view showing light spots on the incident surface of the integrator rod of the light converging optical system corresponding to Numerical Example 1 of Embodiment 1.

FIG. 12 shows light spots formed on the incident surface 81 of the integrator rod 8 formed by the light emitted from the four corners, the center and middle points of four sides of the light emitting surface 12 of the surface-emission light source 11. It is understood that the light spots on eight points except for the center portion is converged in a small size, but the light spot on the center portion is enlarged.

Table 3 shows a relationship between a relative image height and an F-number of the light converged on the incident surface 81 of the integrator rod 8. The relative image height is an image height standardized by a distance from the center to the corner portion of the incident surface 81 of the integrator rod 8. The relative image height is 0 at the center, and is 1 at the corner portion.

The converging angle of the light on the incident surface 81 of the integrator rod 8 is smaller at the center. Therefore, in Table 3, the F-number is the maximum when the relative image height is 0 (i.e., the center). The F-number becomes smaller as the relative image height becomes large (i.e., as the corner portion is approached). For example, an average value of the F-numbers in a tangential direction and a sagittal direction is 1.016 when the relative image height is 0 (i.e., the center), and is 0.710 when the relative image height is 1 (i.e., the corner portion).

TABLE 3

| RELATIVE IMAGE HEIGHT | F-NUMBER IN TANGENTIAL DIRECTION | F-NUMBER IN SAGITTAL DIRECTION | AVERAGE F-NUMBER |
| --- | --- | --- | --- |
| 0 | 1.016 | 1.016 | 1.016 |
| 0.1 | 0.978 | 0.994 | 0.986 |
| 0.2 | 0.863 | 0.947 | 0.905 |
| 0.3 | 0.767 | 0.903 | 0.835 |
| 0.4 | 0.723 | 0.869 | 0.796 |
| 0.5 | 0.704 | 0.844 | 0.774 |
| 0.6 | 0.697 | 0.827 | 0.762 |
| 0.7 | 0.699 | 0.816 | 0.757 |
| 0.8 | 0.704 | 0.808 | 0.756 |
| 0.9 | 0.703 | 0.804 | 0.754 |
| 1 | 0.618 | 0.803 | 0.710 |

Figure 13:
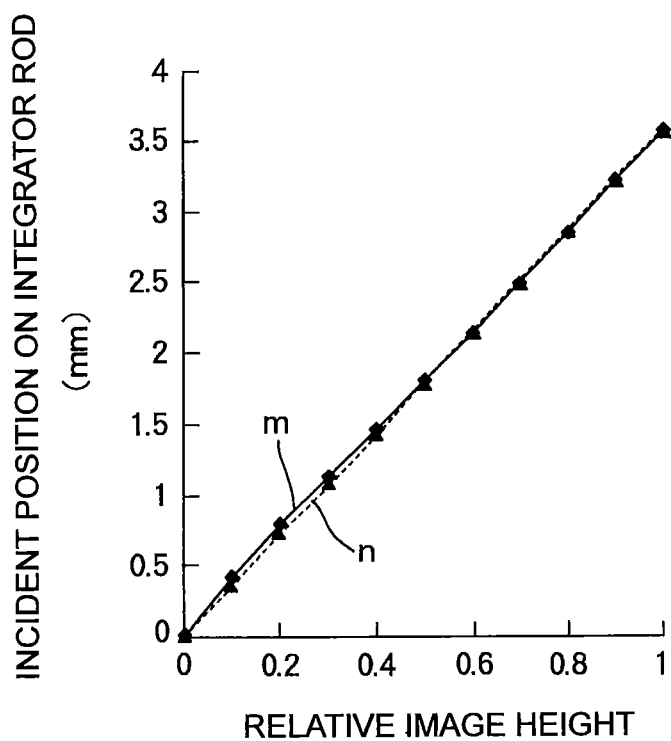
FIG. 13 is a view showing a relationship between a relative image height and an incident position on the incident surface of the integrator rod of the light converging optical system corresponding to Numerical Example 1 of Embodiment 1.

FIG. 13 is a graph showing a relationship between the relative image height and an incident position on the incident surface 81 of the integrator rod 8. The incident position on the incident surface 81 of the integrator rod 8 is expressed by a distance from the center of the incident surface 81. A curve m shown in FIG. 13 is a curve representing the relationship between the relative image height and the incident position shown in Table 3. In contrast, a straight line n shown in FIG. 13 is a straight line indicating that the relative image height is proportional to the incident position (i.e., the magnification is not changed by the relative image height).

That is, as the relative image height becomes large (that is, the corner portion is approached), the curve m and the straight lines n become almost overlapped with each other. In contrast, in a region where the relative image height is low, the curve m is above the straight line n, and therefore it is understood that the image magnification is large in the vicinity of the center of the incident surface 81.

Figure 14B:
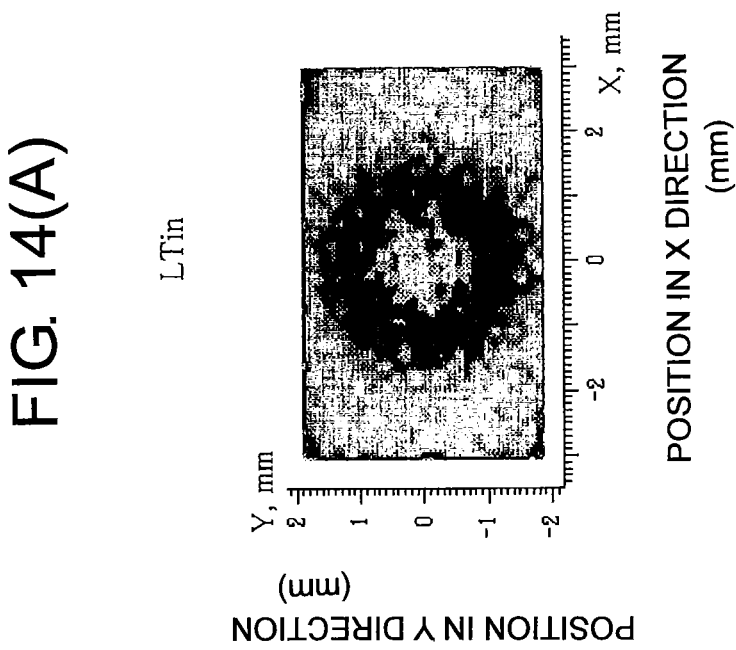
FIGS. 14(A) and 14(B) are views showing illuminance distribution on the incident surface of the integrator rod of the light converging optical system according to Embodiment 1 when a converging angle on the incident surface is not limited.
Figure 14A:
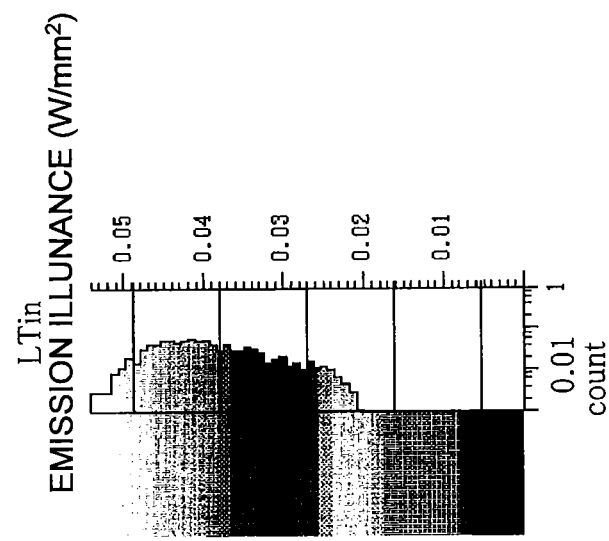

FIG. 14 and FIG. 15 show illuminance distribution on the incident surface 81 of the integrator rod 8. FIG. 14(A) is a view showing illuminance distribution when the converging angle on the incident surface 81 of the integrator rod 8 is not limited (i.e., all the light converged on the incident surface 81 is included) in the light converging optical system of Embodiment 1. FIG. 14(B) is a view showing a variation in the illuminance (unit: W/mm$^2$) corresponding to FIG. 14 (A).

Figure 15B:
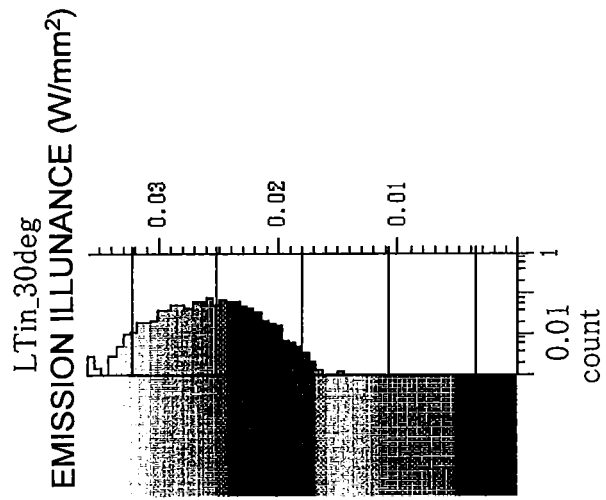
FIGS. 15(A) and 15(B) are views showing illuminance distribution on the incident surface of the integrator rod of the light converging optical system according to Embodiment 1 when the converging angle on the incident surface is limited to 30 degrees (in half angle) as an allowable incident angle.
Figure 15A:
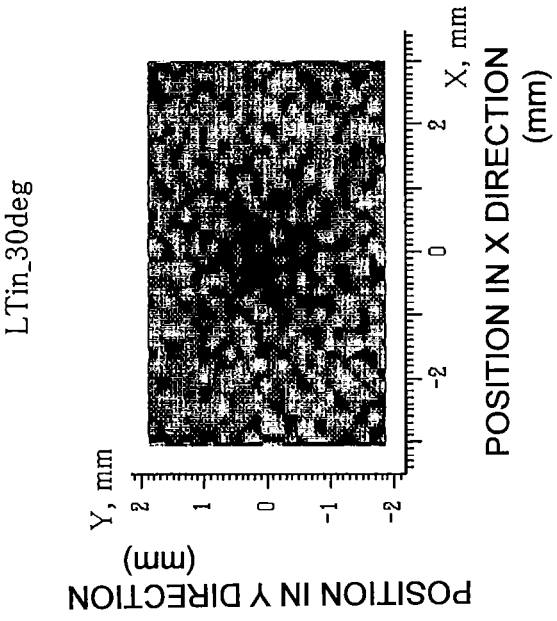

FIG. 15(A) is a view showing illuminance distribution when the converging angle on the incident surface 81 of the integrator rod 8 is limited to 30 degrees (in half angle) (i.e., the light converged on the incident surface 81 at an angle greater than 30 degrees are excluded) in the light converging optical system of Embodiment 1. FIG. 15(B) is a view showing a variation in the illuminance (unit: W/mm$^2$) corresponding to FIG. 15(A).

Figure 16A:
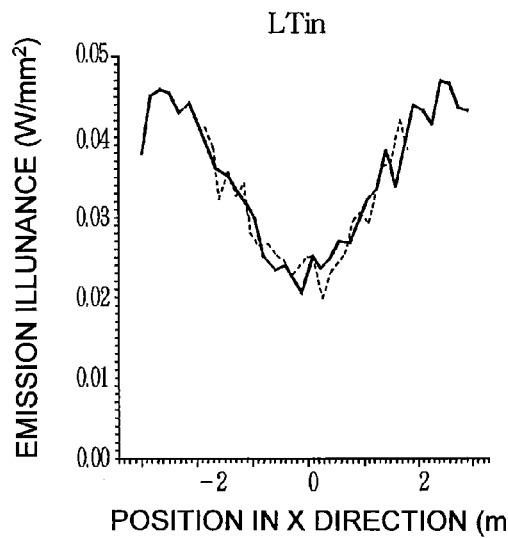
FIGS. 16(A) and 16(B) are graphs showing the illuminance distributions respectively corresponding to FIGS. 14 and 15 as contrasted with each other.
Figure 16B:
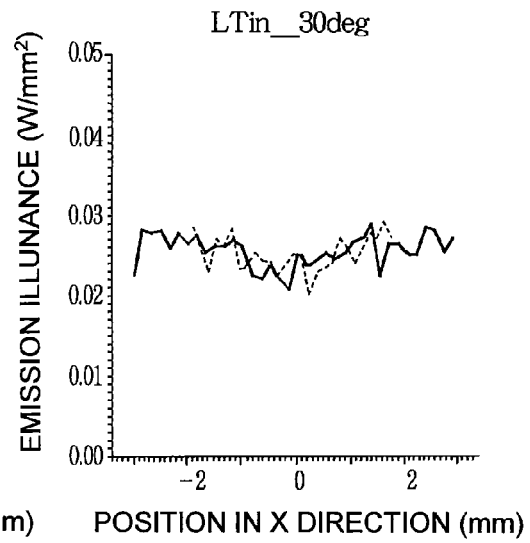
Figure 17:
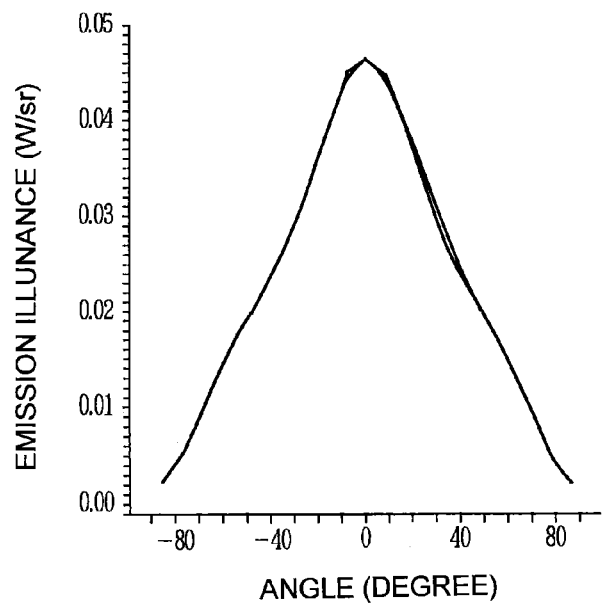
FIG. 17 is a view showing light distribution of a surface-emission light source.

Further, FIG. 16 (A) and FIG. 16 (B) are graphs showing the illuminance distributions respectively corresponding to FIG. 14 and FIG. 15. In FIG. 16, a solid line indicates illuminance distribution in the X direction (i.e., the horizontal direction), and a dashed line indicates illuminance distribution in the Y direction (i.e., the vertical direction). FIG. 17 is a graph showing light distribution of the surface-emission light source 11 used here. In FIG. 17, a horizontal axis indicates an angle and a vertical axis indicates radiant intensity.

In FIG. 14(A), since the image magnification is large at the center portion, the light converged on the center portion is low in density, and the illuminance of the center portion is lower as compared with the corner portion. In FIG. 15(A), the light converged on the corner potion at an angle larger than the allowable incident angle is restricted, and therefore the illuminance of the corner portion is lower as compared with FIG. 14(A). In contrast, in FIG. 15(A), the light is converged on the center portion at an angle within the allowable incident angle, and therefore the illuminance hardly changes from FIG.

14(A) in which the converging angle is not limited. As a result, the illuminance distribution on the incident surface 81 becomes an approximately uniform illuminance distribution as shown in FIG. 15 and FIG. 16(B).

In this regard, although the center portion of the incident surface 81 looks bright in FIG. 14(A), this is because the figure is shown in grayscale. In practice, the center portion of the incident surface 81 is the darkest. Further, in FIG. 14 (B), the illuminance on the incident surface 81 ranges from 0.02 to 0.05 W/mm², i.e., a wide range, and it is understood that a variation in illuminance is large.

Further, in FIG. 15(B), the illuminance on the incident surface 81 is concentrated in a range narrower than in FIG. 14(B), and it is understood that the variation in illuminance is small.

From this result, it is understood that, in Numerical Example 1 of Embodiment 1, light is converged on the incident surface 81 of the integrator rod 8 with approximately uniform illuminance distribution.

Comparison Example 1.

Figure 18:
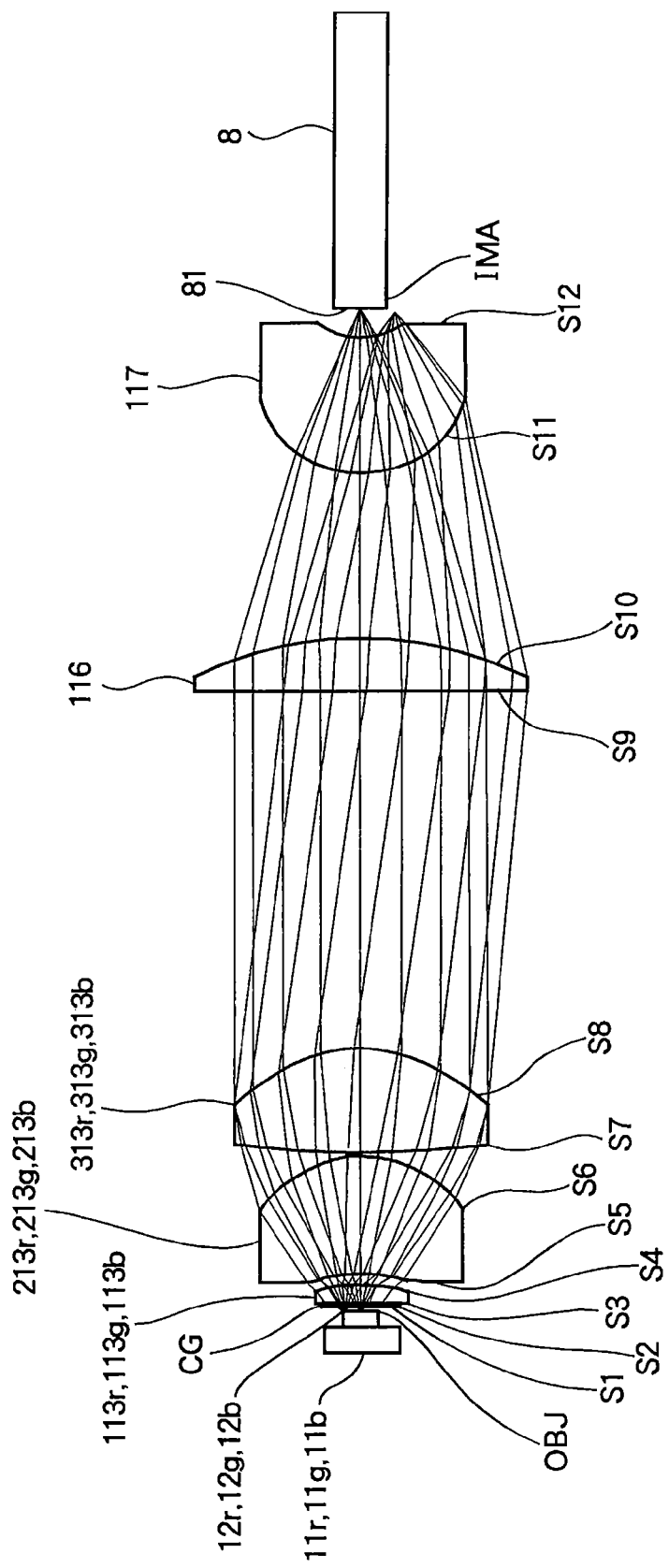
FIG. 18 is a view showing a configuration of a light converging optical system of Comparison Example.

Hereinafter, Comparison Example 1 for contrasting with the light converging optical system 1A of Embodiment 1 will be described. Comparison Example 1 provides a general light converging optical system configured so that light from the surface-emission light source is converged on the integrator rod at the allowable incident angle. Table 4 shows optical data of Comparison Example 1. FIG. 18 shows a configuration corresponding to the optical data.

In Comparison Example 1, the size of the light emitting surface 12 of the surface-emission light source 11 is 4.16 mm×2.6 mm, and the size of the incident surface 81 of the integrator rod 8 is 6.08 mm×3.8 mm. The acceptance angle of the light from the surface-emission light source 11 is 80 degrees (in half angle), and the allowable incident angle on the incident surface 81 of the integrator rod 8 is 30 degrees (in half angle). This is equivalent to a case where an area of 15.2 mm×9.5 mm on the display surface 23 of the image display element 22 is illuminated with F-number 2.5 (approximately 11.5 degrees (in half angle)). Wavelengths of the red light (11b), the green light (11g) and the blue light (11r) emitted from the surface-emission light source 11 are respectively 623 nm, 526 nm and 462 nm. These specifications are the same as those of Numerical Example 1 of Embodiment 1 described above.

Notations of Table 4 are the same as those of Table 1. In Comparison Example 1, OBJ to a surface S8 are the same as those of the above described Numerical Example 1 (Table 1) of Embodiment 1, and a surface S9 and subsequent surfaces are different from Numerical Example 1. Table 5 shows aspherical surface data.

TABLE 5

| | SURFACE NUMBER | |
|---|---|---|
| | S8 | S9 |
| k | −8.022716E−01 | −1.063184E+02 |
| A1 | 0 | 0 |
| A2 | 0 | 0 |
| A3 | 0 | 0 |
| A4 | −5.680631E−06 | −6.144635E−07 |
| A5 | 0 | 0 |
| A6 | 4.538869E−08 | −3.993256E−09 |
| A7 | 0 | 0 |
| A8 | −4.538019E−11 | 3.684179E−13 |
| A9 | 0 | 0 |
| A10 | −1.236856E−13 | 3.084971E−15 |
| A11 | 0 | 0 |
| A12 | −2.594120E−16 | 0 |
| A13 | 0 | 0 |
| A14 | 1.771464E−18 | 0 |

Table 6 shows a relationship between a relative image height (i.e., an image height standardized by a distance from the center to the corner of the surface-emission light source) and an F-number of the light converged on the incident surface 81 of the integrator rod 8 in a similar manner to Table 3. Comparison Example 1 is designed so that the converging angles on the center portion and the corner portion of the incident surface 81 of the integrator rod 8 are approximately the same as each other. Therefore, the F-number is approximately 1 irrespective of the relative image height.

TABLE 6

| RELATIVE IMAGE HEIGHT | F-NUMBER IN TANGENTIAL DIRECTION | F-NUMBER IN SAGITTAL DIRECTION | AVERAGE F-NUMBER |
|---|---|---|---|
| 0 | 0.9894 | 0.9894 | 0.989 |
| 0.1 | 0.9884 | 0.989 | 0.989 |
| 0.2 | 0.9855 | 0.9878 | 0.987 |

TABLE 4

| LENS | SURFACE NUMBER Si | RADIUS OF CURVATURE Ri(mm) | SURFACE INTERVAL Di (mm) | REFRACTIVE INDEX Nd | ABBE NUMBER vd |
|---|---|---|---|---|---|
| — | OBJ | INFINITY | 0.37 | — | — |
| CG | S1 | INFINITY | 0.3 | 1.5231 | 55 |
| | S2 | INFINITY | (r)0.17 (g)0.1 (b)0.05 | — | — |
| 113r 113g 113b | S3 S4 | INFINITY −21.30196 | 2.7 1.29 | 1.7433 — | 49.2 — |
| 213r 213g 213b | S5 S6 | −29.52049 −18.54711 | 16 0.5 | 1.7433 — | 49.2 — |
| 313r 313g 313b | S7 S8* | 113.3922 −20.95281 | 14.8 50 | 1.523 — | 58.3 — |
| 116 | S9* S10 | 359.72236 −54.27529 | 7.53 22.86 | 1.7433 — | 49.2 — |
| 117 | S11 S12 | 15.04105 9.79499 | 19.29 4.26 | 1.523 — | 58.3 — |
| — | IMA | INFINITY | — | — | — |

TABLE 6-continued

| RELATIVE IMAGE HEIGHT | F-NUMBER IN TANGENTIAL DIRECTION | F-NUMBER IN SAGITTAL DIRECTION | AVERAGE F-NUMBER |
| --- | --- | --- | --- |
| 0.3 | 0.9803 | 0.9857 | 0.983 |
| 0.4 | 0.9726 | 0.9828 | 0.978 |
| 0.5 | 0.9618 | 0.979 | 0.970 |
| 0.6 | 0.9471 | 0.9741 | 0.961 |
| 0.7 | 0.9275 | 0.9681 | 0.948 |
| 0.8 | 0.9017 | 0.961 | 0.931 |
| 0.9 | 0.8677 | 0.9525 | 0.910 |
| 1 | 0.8232 | 0.9424 | 0.883 |

Figure 19:
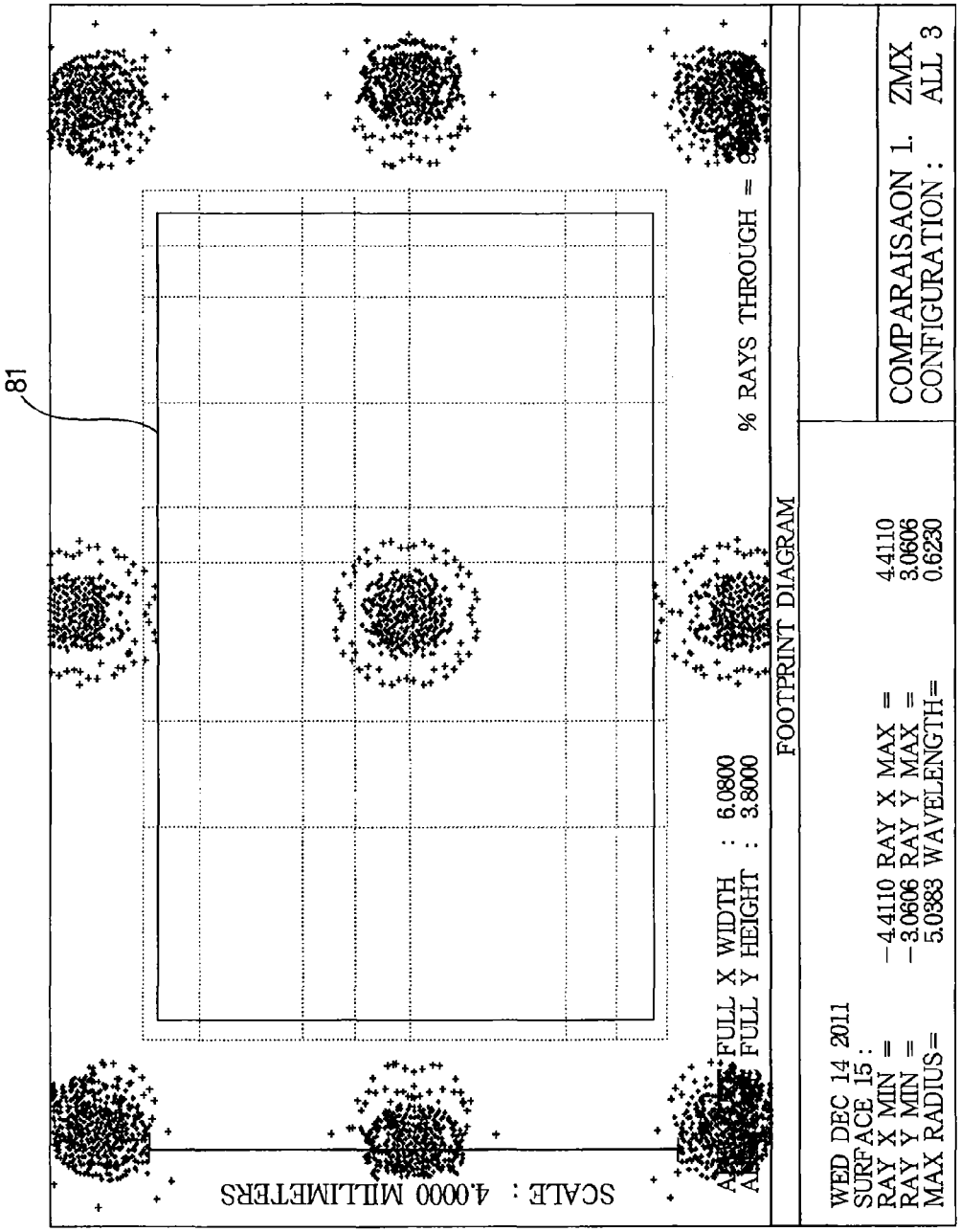
FIG. 19 is a view showing light spots on an incident surface of an integrator rod of the light converging optical system of Comparison Example.

FIG. 19 shows light spots formed on the incident surface 81 of the integrator rod 8 by the light emitted from four corners, the center portion and middle points of four sides of the light emitting surface 12 of the surface-emission light source 11. In Comparison Example 1, the etendue of the surface-emission light source 11 is larger than the etendue of the integrator rod 8. Therefore, when the converging angle on the incident surface 81 of the integrator rod 8 is set to the allowable incident angle, the angle-based loss of light quantity does not occur, but the area-based loss of light quantity occurs. This is because the image magnification increase, and therefore the light emitted from the corner portion of the light emitting surface of the surface-emission light source 11 is converged outside the light emitting surface 81 of the integrator rod 8.

Table 7 shows a converging efficiency on the incident surface 81 of the integrator rod 8 when using the surface-emission light source 11 having the light distribution shown in FIG. 17 (i.e., when the allowable incident angle is set to 30 degrees (in half angle)) by comparison of Comparison Example 1 and Numerical example 1 of Embodiment 1 described above.

TABLE 7

| ITEM | COMPARISON EXAMPLE 1 | NUMERICAL EXAMPLE 1 |
| --- | --- | --- |
| CONVERGING EFFICIENCY ON INCIDENT SURFACE (ALLOWABLE INCIDNET ANGLE: 30 DEGREES) | 55.19% | 58.68% |
| RELATIVE EFFICIENCY (COMPARISON EXAMPLE: 100%) | 100% | 106.32% |

In Table 7, the converging efficiency in Numerical example 1 of Embodiment 1 is 58.68%, while the converging efficiency in Comparison Example 1 is 55.19%. Form this, it is understood that light use efficiency is improved by 6.32%. In this regard, since the size of the integrator rod 8 is suitably determined based on the size of the image display element 22 and the illumination F-number, and therefore it is conceived that, in principle, the light incident on the integrator rod 8 reaches the screen 25 without loss of light except for an illumination margin, transmission loss at lenses or the like, and loss at the image display element 22.

As described above, in the light converging optical system 1A and the projection-type image display apparatus 2A of Embodiment 1, among the light converged on the incident surface 81 of the light-intensity-distribution equalizing element (i.e., the integrator rod 8), the converging angle of the light converged on the center portion of the incident surface 81 is smaller than the converging angle of the light converged on the corner portion of the incident surface 81. In other words, among the light spots formed by the light converged on the incident surface 81 of the integrator rod 8, the light spot formed at the center portion of the incident surface 81 is larger than the light spot formed at the corner portion of the incident surface 81. Further, in other words, among the light emitted from the light emitting surface 12 of the surface-emission light source 11, the light emitted from the center portion of the light emitting surface 12 is converged on a position farther from the condenser lens 4 (i.e., the light converging element) as compared with the light emitted from the corner portion of the light emitting surface 12. Furthermore, in other words, the image magnification with which an image of the light emitting surface 12 of the surface-emission light source 11 is formed on the incident surface 81 of the integrator rod 8 (i.e., the light-intensity-distribution equalizing element) is larger at the center portion than at the corner portion of the incident surface 81.

Therefore, even when the etendue of the surface-emission light source 11 is larger than the etendue of the integrator rod 8, the loss of light quantity at the integrator rod 8 can be reduced, and light use efficiency can be enhanced.

In this regard, in Embodiment 1, it is assumed that the etendue of the surface-emission light source 11 is larger than the etendue of the integrator rod 8. However, the present invention is not limited to this, but is also applicable to a case where the etendue of the surface-emission light source 11 is smaller than the etendue of the integrator rod 8.

Further, at least one lens (i.e., the condenser lens 4) of the light converging optical system has an optical surface (i.e., the second surface 42) that converges the light emitted from the corner portion of the light emitting surface 12 of the surface-emission light source 11 with a stronger power than the light emitted from the center portion of the light emitting surface 12. Therefore, a configuration in which the converging angle of the light converged on the center portion of the incident surface 81 is smaller than the converging angle of the light converged on the corner portion of the incident surface 81 can be achieved.

Further, in the second surface 42 of the condenser lens 4, a portion (i.e., the center portion) that acts on the light emitted from the center portion of the light emitting surface 12 of the surface-emission light source 11 is in the form of a concave surface, and a portion (i.e., the peripheral portion) that acts on the light emitted from the corner portion is in the form of a convex surface. Therefore, a configuration in which the converging angle of the light converged on the center portion of the incident surface 81 is smaller than the converging angle of the light converged on the corner portion of the incident surface 81 can be achieved with a simple configuration.

Further, a plurality of surface-emission light sources 11r, 11g and 11b are provided, and the dichroic mirrors 6 and 7 (i.e., light synthesizing means) that synthesize the light emitted from the plurality of surface-emission light sources 11r, 11g and 11b and lead the synthesized light to the condenser lens 4 (i.e., the light converging optical system) are provided. Therefore, light use efficiency can be enhanced in the color projection-type image display apparatus.

In this regard, in the above description, the green surface-emission light sources 11g is disposed so as to face the condenser lens 4, and the red and blue surface-emission light sources 11r and 11b are directed in a direction perpendicular to the green surface-emission light source 11g. However, the present invention is not limited to such a configuration. For example, the blue surface-emission light sources 11b may be disposed so as to face the condenser lens 4, and the red and green surface-emission light sources 11r and 11g may be directed in a direction perpendicular to the blue surface-emission light source 11b. Alternatively, the red surface-emission light sources 11r may be disposed so as to face the condenser lens 4, and the green and blue surface-emission light sources 11g and 11b may be directed in a direction perpendicular to the red surface-emission light source 11r.

Further, in the above description, each of the condenser lenses 13r, 13g and 13b and the collimator lens 4 is constituted by a single convex lens. However, the present invention is not limited to such a configuration. For example, each of the condenser lenses 13r, 13g and 13b and the collimator lens 4 may be constituted by two or more lenses in accordance with specifications of a light converging optical system such as the acceptance angle and the magnification. Further, each of the condenser lenses 13r, 13g and 13b and collimator lens 4 is not limited to a spherical lens, but may be an aspheric surface lens, a free-form surface lens or the like.

Furthermore, in the above description, the light-intensity-distribution equalizing element is the integrator rod. However, the light-intensity-distribution equalizing element is not limited to the integrator rod, but other light-intensity-distribution equalizing elements such as, for example, a hollow light tunnel may be used.

Further, in the above description, the light emitted from the R, G, and B surface-emission light sources 11r, 11g and 11b are synthesized by the dichroic mirrors 6 and 7. However, the light synthesizing means other than the dichroic mirrors may be used. For example, a dichroic prism or the like may be used. Further, the number of the surface-emission light sources is not limited to three.

Embodiment 2.

Figure 20:
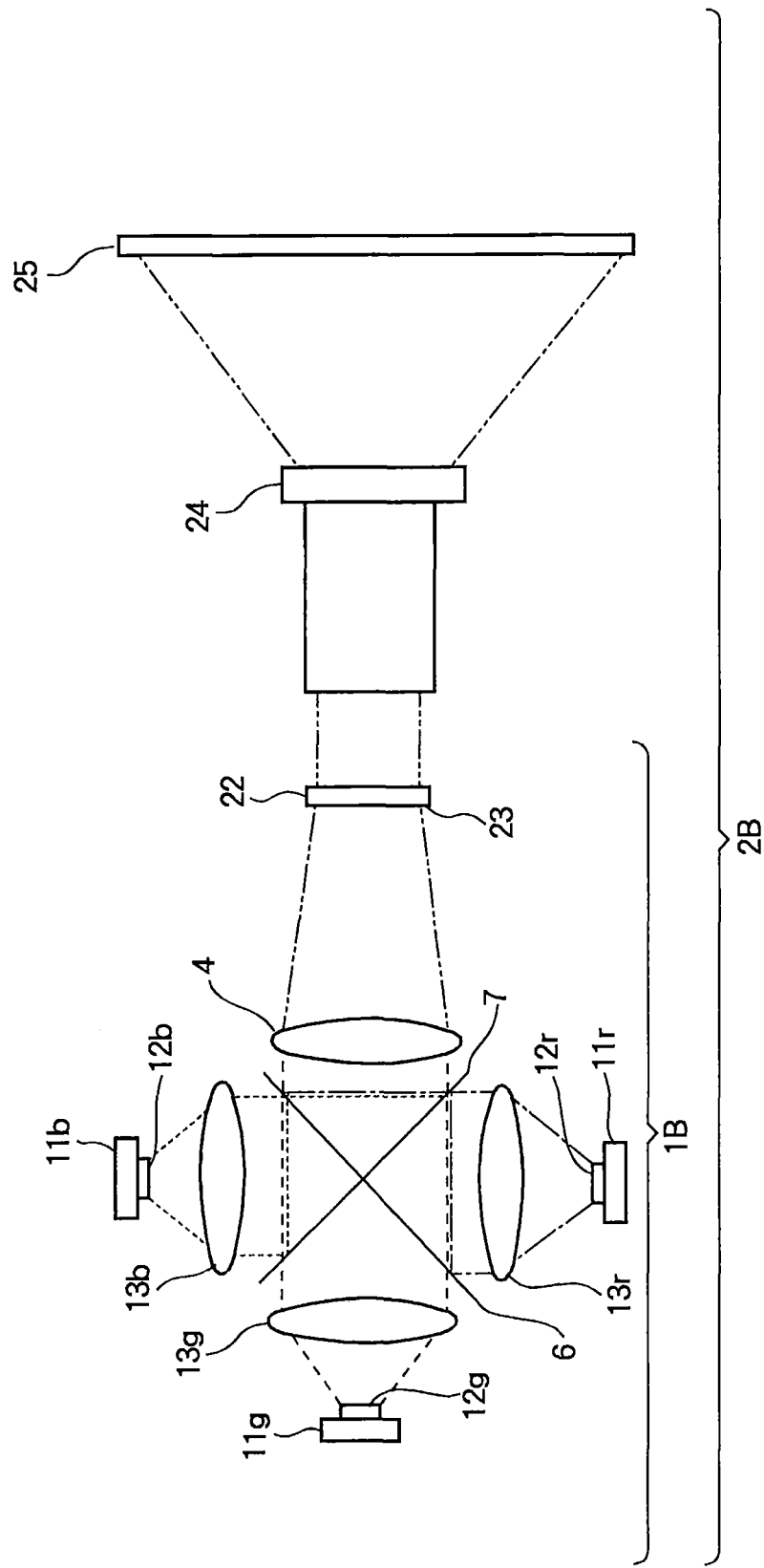
FIG. 20 is a view showing a basic configuration of a projection-type image display apparatus including a light converging optical system according to Embodiment 2 of the present invention.

Next, Embodiment 2 of the present invention will be described. FIG. 20 is a view schematically showing a configuration of a projection-type image display apparatus 2B including a light converging optical system 1B according to Embodiment 2 of the present invention. The light converging optical system 1B of Embodiment 2 is different from the light converging optical system 1A (FIG. 1) of Embodiment 1 in that the integrator rod 8 and the illumination optical system 21 are not provided.

In the above described Embodiment 1, approximately uniform illuminance distribution is obtained on the incident surface 81 of the integrator rod 8 as shown in FIG. 15 and FIG. 16(B).

In Embodiment 2, equalizing of light intensity distribution by the integrator rod is not performed. Instead, the light passing through the condenser lens 4 is directly incident on the display surface 23 of the image display element 22. The illuminance distribution on the display surface 23 of the image display element 22 is made close to the approximately uniform illuminance distribution as shown in FIG. 15 and FIG. 16 (B).

The collimator lens 13 and the condenser lens 4 form the image of the light emitting surface 12 of the surface-emission light source 11 on the display surface 23 of the image display element 22. The display surface 23 of the image display element 22 is larger than the incident surface 81 (FIG. 1) of the integrator rod 8. Therefore, the image magnification is determined in consideration of the size of the display surface 23 of the image display element 22, the size of the light emitting surface 12 of the surface-emission light source 11, and a suitable illumination margin.

Further, in the above described Embodiment 1, the incident angle on the center portion of the incident surface 81 of the integrator rod 8 is made smaller than the incident angle on the corner portion of the incident surface 81. In contrast, in Embodiment 2, the incident angle on the center portion of the display surface 23 of the image display element 22 is made smaller than the incident angle on the corner portion of the display surface 23, so as to achieve reduction of loss of light quantity.

Further, in Embodiment 2, the converging angle of the light on the center portion of the display surface 23 of the image display element 22 is set to be less than or equal to an allowable incident angle on the display surface 23 of the image display element 22. The allowable incident angle is determined based on the allowable incident angle on the incident surface 81 of the integrator rod 8 described in Embodiment 1 and in consideration of the image magnification with which an image of the emission surface 82 of the integrator rod 8 is formed on the display surface 23 of the image display element 22.

The condenser lens 4 has the optical surface that converges the light emitted from the corner portion of the light emitting surface 12 of the surface-emission light source 11 with a stronger power than the light emitted from the center portion of the light emitting surface 12 as described with reference to FIG. 8 and FIG. 9.

Since the integrator rod 8 is not provided, the manufacturing cost of the light converging optical system 1B and the projection-type image display apparatus 2B can be reduced. Further, since there is neither reflection nor transmission loss in the integrator rod 8, the loss of light quantity can further be reduced. Further, since an arrangement space for the integrator rod 8 becomes unnecessary, the size of the apparatus can be reduced. Other configuration is the same as that of Embodiment 1.

As described above, the light converging optical system 1B and the projection-type image display apparatus 2B of Embodiment 2 are constituted so that the converging angle on the center portion of the display surface 23 of the image display element 22 is smaller than the converging angle on the corner portion of the display surface 23. In other words, the light spot formed at the center portion of the display surface 23 of the image display element 22 is larger than the light spot formed at the corner portion. Further, in other words, a position where the light emitted from the center portion of the light emitting surface 12 is converged is farther from the condenser lens 4 (i.e., the light converging element) as compared with a position where the light emitted from the corner portion of the light emitting surface 12 is converged. Furthermore, in other words, the image magnification with which the image of the light emitting surface 12 is formed on the display surface 23 of the image display element 22 is larger at the center portion than at the corner portion of the display surface 23.

With such a configuration, even when the etendue of the surface-emission light source 12 is larger than the etendue of the image display element 22, the loss of light quantity at the image display element 22 can be reduced, and high light use efficiency can be achieved. Further, since the integrator rod is unnecessary, the manufacturing cost can be reduced, and the miniaturization of the apparatus can be achieved.

Embodiment 2 is advantageous in miniaturization of the apparatus and reduction of manufacturing cost particularly when the approximately uniform illuminance distribution as shown in FIG. 15 and FIG. 16(B) are permitted on the display surface 23 of the image display element 22.

In contrast, when more uniform illuminance distribution than the illuminance distribution as shown in FIG. 15 and FIG. 16(B) is required on the display surface 23 of the image display element 22, it is desirable to perform equalizing of light intensity using the integrator rod as in Embodiment 1.

That is, when Embodiment 1 and Embodiment 2 are contrasted with each other, Embodiment 2 is advantageous in terms of the miniaturization of the apparatus and the reduction of the manufacturing cost. Embodiment 1 is advantageous in terms of uniformity of illuminance on a display screen.

In this regard, in Embodiment 2, the etendue of the surface-emission light source 11 is larger than the etendue of the display surface 23 of the image display element 22. However, the present invention is not limited to such a configuration, but is applicable to a configuration in which the etendue of the surface-emission light source 11 is smaller than the etendue of the display surface 23 of the image display element 22.
Embodiment 3.

Next, Embodiment 3 of the present invention will be described. Hereinafter, three directions intersecting perpendicularly each other will be referred to as an x direction (i.e., a horizontal direction), a y direction (i.e., a vertical direction), and a z direction (i.e., a direction parallel to an optical axis).

Figure 21:
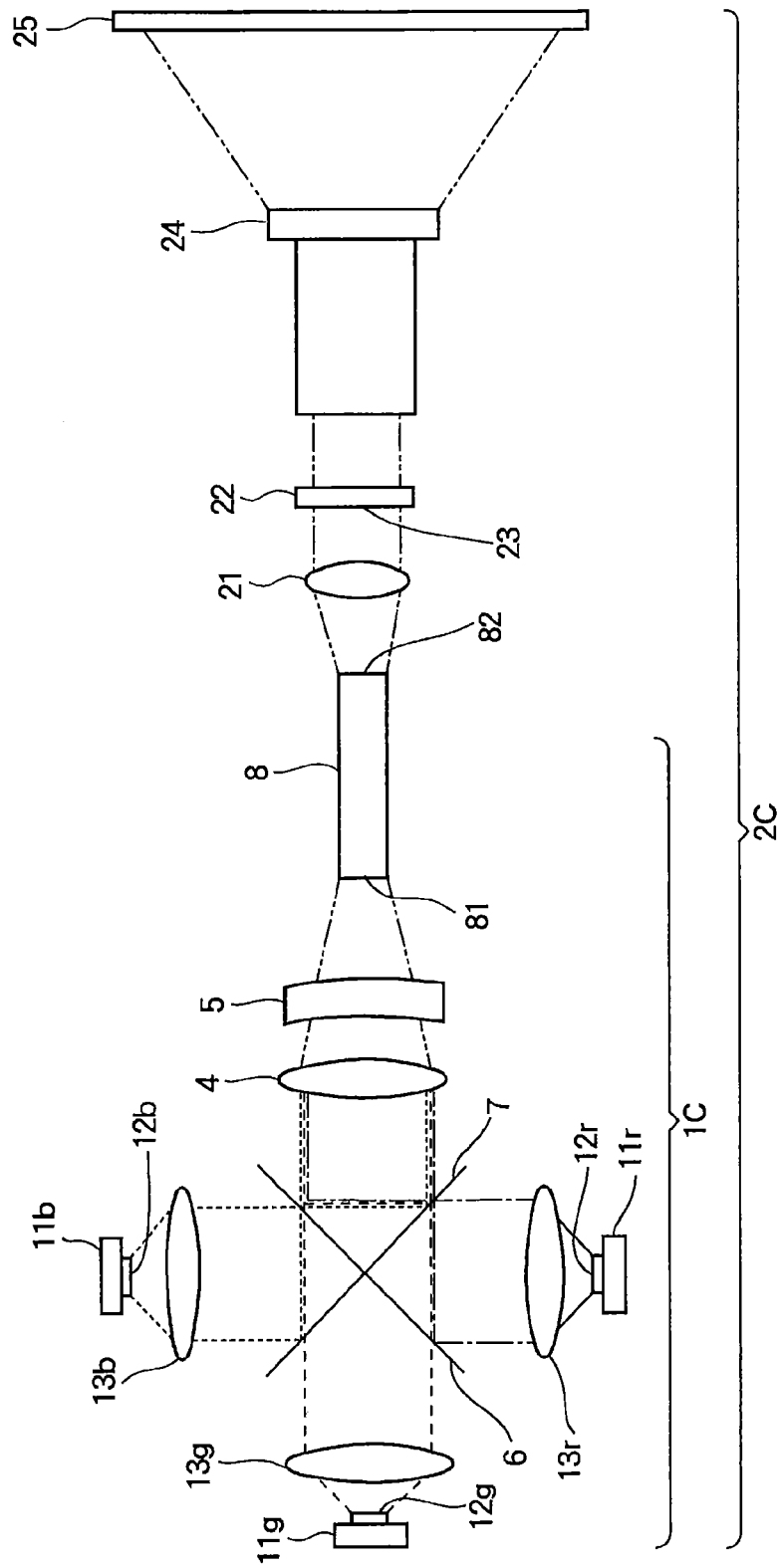
FIG. 21 is a view schematically showing a configuration of a light converging optical system and a projection-type image display apparatus according to Embodiment 3 of the present invention.

FIG. 21 is a view showing a configuration of a projection-type image display apparatus 2C including a light converging optical system 1C according to Embodiment 3 of the present invention. As shown in FIG. 21, the light converging optical system 1C of Embodiment 3 includes the surface-emission light sources 11r, 11g and 11b. The surface-emission light source 11r emits the red light (R) from the light emitting surface 12r. The surface-emission light source 11g emits the green light (G) from the light emitting surface 12g. The surface-emission light source 11b emits the blue light (B) from the light emitting surface 12b.

In FIG. 21, the red light (R) is shown by dashed lines, the green light (G) is shown by long broken lines, and the blue light (B) is shown by short broken lines.

The surface-emission light sources 11r, 11g and 11b are constituted by LEDs, EL elements, semiconductor lasers, or by combination of these elements. Hereinafter, description will be made of a case where the LEDs are used as the surface-emission light sources 11r, 11g and 11b.

The light converging optical system 1C further includes collimator lenses (i.e., collimator optical systems) 13r, 13g and 13b having positive power. The collimator lens 13r converts the red light emitted from the red light emitting surface 12r of the surface-emission light sources 11r into approximately parallel light. The collimator lens 13g converts the green light emitted from the green light emitting surface 12g of the surface-emission light sources 11g into approximately parallel light. The collimator lens 13b converts the blue light emitted from the light emitting surface 12b of the surface-emission light sources 11b into approximately parallel light.

The light converging optical system 1C further includes a light synthesizing means that synthesizes the red light passing through the red collimator lens 13r, the green light passing through the green collimator lens 13g, and the blue light passing through the blue collimator lens 13b. In FIG. 21, light the synthesized by the light synthesizing means is shown by two dotted chain lines.

In an example shown in FIG. 21, the light synthesizing means is constituted by, for example, cross dichroic mirrors including two dichroic mirrors 6 and 7 that intersect perpendicularly with each other. The dichroic mirrors 6 and 7 have characteristics to transmit light of a specific wavelength band or reflect light of a specific wavelength band.

Here, the dichroic mirror 6 transmits the green light and the blue light and reflects the red light. The dichroic mirror 7 transmits the red light and the green light and reflects blue light. In the cross dichroic mirrors, the mirrors are disposed in a relatively small space. Therefore, a more compact light converging optical system can be achieved as compared with a case where two dichroic mirrors are disposed apart from each other. In this regard, the light synthesizing means is not limited to the configuration shown in FIG. 21.

The light converging optical system 1C further includes a condenser lens 4, a converging F-number control lens 5 and an integrator rod 8. The condenser lens 4 has a positive power, and converges the light synthesized by the light synthesizing means.

The converging F-number control lens 5 (i.e., a light converging element) has function to control a converging F-number, and includes two or more toroidal surfaces. In this regard, the toroidal surface includes a cylindrical surface. The light converged by the condenser lens 4 is incident on the converging F-number control lens 5. The converging F-number control lens 5 converges the light on the incident surface 81 of the integrator rod 8 at a desired angle.

The integrator rod 8 has the incident surface 81 and the emission surface 82, and has a function as a light-intensity-distribution equalizing element. The light from the converging F-number control lens 5 is incident on incident surface 81. The light whose intensity distribution is equalized is emitted from the emission surface 82.

The condenser lens 4 is a configuration common to the red light, the green light and the blue light, respectively. The converging F-number control lens 5 is a configuration common to the red light, the green light and the blue light, respectively.

The condenser lens 4 converges the light synthesized by the dichroic mirrors 6 and 7. The converging F-number control lens 5 converges the light converged by the condenser lens 4 on the incident surface 81 of the integrator rod 8 at a desired angle. The incident surface 81 of the integrator rod 8 and the light emitting surfaces 12r, 12g and 12b are in conjugate relationship with each other. Secondary light source images of the light emitting surfaces 12r, 12g and 12b are formed on the incident surface 81 of the integrator rod 8. In this regard, the light emitting surfaces 12r, 12g and 12b are rectangular flat surfaces having the same size.

The integrator rod 8 has, for example, a quadrangular prism shape having a rectangular cross section. The integrator rod 8 is formed of, for example, glass. The incident surface 81 has a shape similar to the display surface 23 of the image display element 22. Here, since the image display element 22 has a rectangular shape, the incident surface 81 also has a rectangular shape. The light incident on the incident surface 81 of the integrator rod 8 propagates through an interior of the integrator rod 8 while repeating total reflection at boundaries between glass and air. As the light propagates through the interior of the integrator rod 8, the light of respective colors are equalized. The equalized light is emitted from the emission surface 82.

In this regard, the light-intensity-distribution equalizing element is not limited to the integrator rod 8, but may be a hollow light pipe with which total reflection at inner surfaces is utilized, or other elements.

As shown in FIG. 21, the projection-type image display apparatus 2C includes the light converging optical system 1C, the illumination optical system 21, the image display element 22, and the projection optical system 24. In the case of a rear projection-type image display apparatus having a screen, the projection-type image display apparatus 2C further includes the screen 25 on which the image light is projected in an enlarged scale.

The light emitted from the light converging optical system 1C is incident on the illumination optical system 21. The light emitted from the light converging optical system 1C is the light whose intensity distribution has been equalized with the integrator rod 8. The illumination optical system 21 is constituted by, for example, lenses. The image display element 22 modulates the light passing through the illumination optical system 21, and generates image light. The image light is light including image information including static image or moving image. The projection optical system 24 projects the image light generated by the image display element 22 on the screen 25 in an enlarged scape.

The illumination optical system 21 irradiates the display surface 23 of the image display element 22 with the light emitted from the integrator rod 8. The emission surface 82 of the integrator rod 8 and the display surface 23 of the image display element 22 are in conjugate relationship with each other. Therefore, the image of the emission surface 82 is formed on the display surface 23. The emission surface 82 is a rectangular surface having uniform brightness. The emission surface 82 has a similar shape to the display surface 23. Therefore, the display surface 23 can be illuminated efficiently, and high light use efficiency can be obtained.

The image display element 22 is, for example, a liquid crystal panel of a transmission-type or a reflection-type, or a DMD (Digital Micro-Mirror Device) of a reflection-type. The display surface 23 has a configuration in which many pixels are arranged in two dimensions. The image display element 22 generates image light by intensity modulation of the light emitted from the illumination optical system 21 for respective pixels according to image signal.

In the projection-type image display apparatus 2C, an image is displayed as follows. The red light, the green light and the blue light emitted from the light emitting surfaces 12r, 12g and 12b of the surface-emission light sources 11r, 11g and 11b pass through corresponding collimator lenses 13r, 13g and 13b, and are converted into approximately parallel light. The approximately parallel light are synthesized by the dichroic mirrors 6 and 7. The synthesized light is converged by the condenser lens 4. The light converged by the condenser lens 4 is converged by the converging F-number control lens 5 on the incident surface 81 of the integrator rod 8. The light whose intensity distribution has been equalized by the integrator rod 8 is incident on the illumination optical system 21. The light emitted from the illumination optical system 21 is irradiated on the image display element 22. The light is modulated by the image display element 22, and the image light is projected by the projection optical system 24 on the screen 25 in an enlarged scale, and an image is displayed on the screen 25.

Next, geometric relationship between the light emitting surfaces 12r, 12g and 12b, the incident surface 81 and the display surface 23 will be described. In Embodiment 3, the light emitting surfaces 12r, 12g and 12b and the incident surface 81 are in conjugate relationship with each other. However, the surface shape of the light emitting surfaces 12r, 12g and 12b is not similar to the incident surface 81. Therefore, the aspect ratio of the light emitting surfaces 12r, 12g and 12b is different from the aspect ratio of the incident surface 81. The emission surface 82 and the display surface 23 are in conjugate relationship with each other. The surface shape of the emission surface 82 is similar to the surface shape of the display surface 23, and therefore the aspect ratio of the emission surface 82 is the aspect ratio of the display surface 23. Therefore, between the light emitting surfaces 12r, 12g and 12b and the incident surface 81, loss of light quantity occurs due to difference in the aspect ratio. In order to reduce the loss of light quantity, the light converging optical system 1C need be improved.

The reason why the loss of light quantity occurs will be described. Here, concept of etendue described in Embodiment 1 is applied to the light converging optical system 1C and the projection-type image display apparatus 2C of Embodiment 3. Light distribution of light fluxes emitted from the light emitting surfaces 12r, 12g and 12b is assumed to be Lambertian distribution. Lambertian distribution is light distribution in the case of complete diffusion.

Etendue is defined as a product of an area of a light emitting surface and a solid angle of light emitted from the light emitting surface. The etendue is also defined as a product of an area of a light receiving surface and a solid angle of light received by the receiving surface. The etendue Es of the surface-emission light sources 11r, 11g and 11b, the etendue Ei of the integrator rod 8, and the etendue El of the image display element 22 are expressed by formulas (5) to (7) as in Embodiment 1.

$$El = Al \times \pi \times \sin^2(\theta l) \tag{5}$$

$$Ei = Ai \times \pi \times \sin^2(\theta i) \tag{6}$$

$$Es = As \times \pi \times \sin^2(\theta s) \tag{7}$$

In the formula (5), El is etendue of the image display element 22. Al is an area of the display surface 23. $\theta l$ is an angle (i.e., an illumination angle) of the light ray incident on the incident surface 81 at the converging angle $\theta i$ (described later) and then incident on the display surface 23, with respect to the normal line of the display surface 23. $\pi$ is a circular constant.

In the formula (6), Ei is etendue of the integrator rod 8. Ai is an area of the incident surface 81. $\theta i$ is an angle (i.e., a converging angle) the light ray emitted from the light emitting surfaces 12r, 12g and 12b at the acceptance angle $\theta s$ (described later) and incident on the incident surface 81, with respect to the normal line of the incident surface 81.

In the formula (7), Es is etendue of the surface-emission light sources 11r, 11g and 11b. As is an area of the light emitting surfaces 12r, 12g and 12b. $\theta s$ is an angle (i.e., an acceptance angle) of a light ray emitted at a largest divergence angle among light rays emitted from the light emitting surfaces 12r, 12g and 12b and to be incident on the collimator lenses 13r, 13g and 13b, with respect to a normal line of the light emitting surfaces 12r, 12g and 12b.

Generally, a light converging optical system and an illumination optical system are designed so as to make values of the above-described etendue Es, Ei and El the same as each other. For example, the size of the display surface 23 is 16.0 mm×7.0 mm. In this case, the aspect ratio of the display surface 23 is 16:7. The F-number of light for illuminating the display surface 23 is set to 2.5. In this case, the illumination angle $\theta l$ is 11.53 degrees ($\theta l \approx 11.53°$). The etendue El of the image display element 22 is calculated as follows using the formula (5), and the result is approximately 14.1.

$$\begin{aligned} El &= Al \times \pi \times \sin^2(\theta l) \\ &= (16.0 \times 7.0) \times \pi \times \sin^2(11.53°) \\ &\approx 14.1 \end{aligned}$$

The F-number of the light incident on the incident surface 81 is set to 1.0. In this case, the converging angle $\theta i$ 30 degrees ($\theta i = 30°$). The size of the incident surface 81 is set to 6.4 mm×2.8 mm. The aspect ratio of the incident surface 81 is 16:7. The etendue Ei of the integrator rod 8 is calculated as follows using the formula (6), and the result is approximately 14.1. The etendue Ei of the integrator rod 8 can be made the same as the etendue El of the image display element 22.

$$Ei = Ai \times \pi \times \sin^2(\theta i)$$
$$= (6.4 \times 2.8) \times \pi \times \sin^2(30°)$$
$$\approx 14.1$$

Here, each size of the light emitting surfaces 12r, 12g and 12b of the surface-emission light sources 11r, 11g and 11b is 2.7 mm×2.0 mm. The aspect ratio of the light emitting surfaces 12r, 12g and 12b is 4:3. The light distribution of light fluxes emitted hemispherically from the light emitting surfaces 12r, 12g and 12b is assumed to be Lambertian distribution. In the case of hemispherical emission, the acceptance angle θs is 90 degrees (θs=90°). The etendue Es of the surface-emission light sources 11r, 11g and 11b is calculated as follows using the formula (7), and the result is approximately 17.0.

$$Es = As \times \pi \times \sin^2(\theta s)$$
$$= (2.7 \times 2.0) \times \pi \times \sin^2(90°)$$
$$= 17.0$$

Therefore, the etendue Es of the surface-emission light sources 11r, 11g and 11b has a larger value than the etendue El of the image display element 22 and the etendue Ei of the integrator rod 8. The etendue is an optical invariant. If the etendue Ei of the integrator rod 8 is smaller than the etendue Es of the surface-emission light sources 11r, 11g and 11b, it means that loss of light quantity occurs.

From the above described consideration of light use efficiency in relation to etendue, it is understood that loss of light quantity occurs in the conventional light converging optical system when the aspect ratio of the light emitting surface and the aspect ratio of the converging surface (i.e., the incident surface 81) are different from each other. However, since the etendue is defined as a product of an area of a light emitting surface and a solid angle of light emitted from the light emitting surface, or a product of an area of a light receiving surface and a solid line of light received by the light receiving surface. Therefore, it can be said that the etendue expresses two-dimensional relationship. In order to consider energy use efficiency when the aspect ratio of the light emitting surface and the aspect ratio of the converging surface are different from each other, it is necessary to further consider a one-dimensional relationship.

Hereinafter, light use efficiency will be considered using formulas in which etendue is expressed in one dimension. Here, a relationship between the surface-emission light sources 11r, 11g and 11b and the integrator rod 8 will be described. When the formula in which etendue is expressed in one dimension is used, the condition for not causing loss of light quantity between the surface-emission light sources 11r, 11g and 11b and the integrator rod 8 is to fulfill both of two conditions expressed in a formula (8) and a formula (9).

$$xs \times \sin(\theta s) \leq xi \times \sin(\theta i) \quad (8)$$

$$ys \times \sin(\theta s) \leq yi \times \sin(\theta i) \quad (9)$$

In the formula (8) and the formula (9), xs indicates a length of the light emitting surfaces 12r, 12g and 12b in the horizontal direction (i.e., the x direction), and ys indicates a length of the light emitting surfaces 12r, 12g and 12b in the vertical direction (i.e., the y direction). xi indicates a length of the incident surface 81 in the horizontal direction (i.e., the x direction), yi indicates a length of the incident surface 81 in the vertical direction (i.e., the y direction).

When sizes of respective parts described in formulas (5) through (7) are substituted in the formula (8), the left-hand side and the right-hand side of the formula (8) are respectively as follows.

$$xs \times \sin(\theta s) = 2.7 \times \sin(90°) = 2.7$$

$$xi \times \sin(\theta i) = 6.4 \times \sin(30°) = 3.2$$

Therefore, the formula (8) are fulfilled. That is, it is understood that loss of light quantity does not occur in the horizontal direction (i.e., the x direction).

Similarly, the left-hand side and the right-hand side of the formula (9) are respectively as follows.

$$ys \times \sin(\theta s) = 2.0 \times \sin(90°) = 2.0$$

$$yi \times \sin(\theta i) = 2.8 \times \sin(30°) = 1.4$$

Therefore, $ys \times \sin(\theta s) > yi \times \sin(\theta i)$, and the formula (9) is not fulfilled. That is, it is understood that loss of light quantity occurs in the vertical direction (i.e., the y direction).

As described above, the formulas (5) through (7) are insufficient to consider the loss of light quantity when the aspect ratio of the light emitting surface and the aspect ratio of the converging surface are different from each other, and it is necessary to use both of the formula (8) and the formula (9) in which etendue is expressed in one dimension. When the aspect ratio of the light emitting surface and the aspect ratio of the converging surface are different from each other, loss of light quantity cannot be avoided in the conventional light converging optical system in which one or both of the formula (8) and the formula (9) is not fulfilled.

However, it is difficult to accept all the light emitted from the surface-emission light sources 11r, 11g and 11b. To accept all the emitted light means that the acceptance angle θs is 90 degrees (θs=90°). Further, in general, when illuminating the display surface 23, an illumination area is slightly larger than the display surface 23 in consideration of manufacturing errors and uniformity. This is referred to as an illumination margin. Based on these, the acceptance angle and the size of the incident surface 81 and the like may be suitably optimized in accordance with specifications of the optical system in practice.

As described in Embodiment 1, in the light converging optical system in which the light emitting surface and the light receiving surface have different aspect ratios, there are two kinds of loss of light quantity, i.e., the angle-based loss of light quantity and the area-based loss of light quantity. The angle-based loss of light quantity is loss of light quantity caused by light emitted from the light emitting surface and incident on the converging surface at an angle larger than the allowable incident angle. The area-based loss of light quantity is loss of light quantity caused by light emitted from the light emitting surface and incident outside the light receiving surface.

<Reference Example 2>

Here, a configuration where loss of light quantity occurs will be described as Reference Example 2. Components of Reference Example 2 will be described using the same marks as the component of Embodiment 3 for convenience in explanation. FIG. 22 is a view showing a configuration of a light converging optical system of Reference Example 2. FIG. 22(A) is a view of the light converging optical system as seen from +y direction. FIG. 22(B) is a view of the light converging optical system as seen from +x direction. In FIG. 22, the surface-emission light sources 11*r*, 11*g* and 11*b* are collectively expressed by mark 11, and the light emitting surfaces 12*r*, 12*g* and 12*b* are collectively expressed by mark 12. The collimator lenses 13*r*, 13*g* and 13*b* are collectively expressed by mark 13. The light converging optical system of Reference Example 2 is a light converging optical system designed by a conventional design method, and in which loss of light quantity occurs.

In the light converging optical system of Reference Example 2, the light emitted from the light emitting surface 12 is converted into the parallel light by the collimator lens 13, and the parallel light is converged on the incident surface 81 of the integrator rod 8 by the condenser lens 4.

Figure 23:
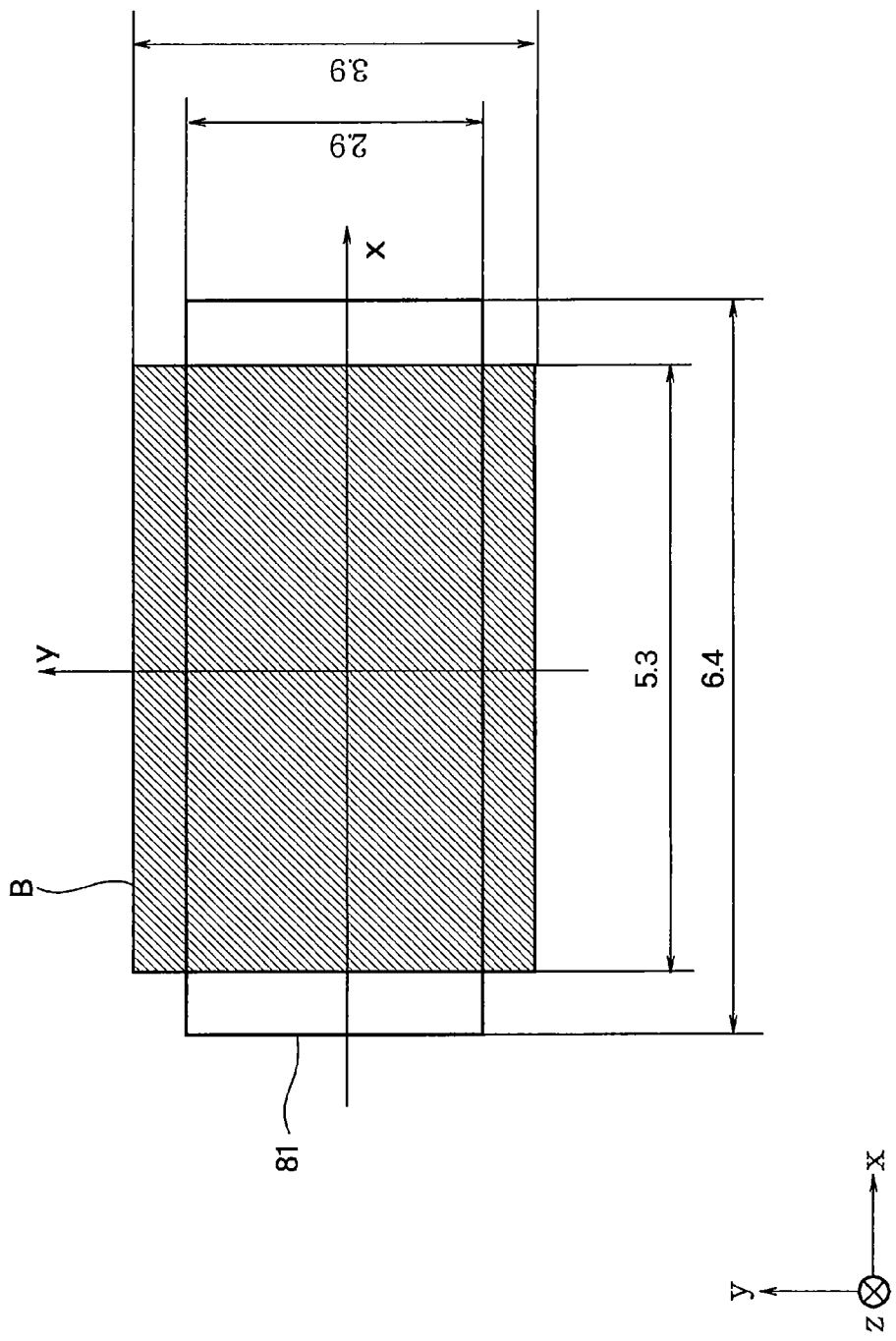
FIG. 23 is a schematic view showing a converging area on the incident surface of the integrator rod of Reference Example 2.

FIG. 23 is a schematic view showing a converging area of illumination light on the incident surface 81 of the integrator rod 8 of Reference Example 2. In FIG. 23, the converging area is indicated by the mark B. The size of the incident surface 81 is defined in accordance with specifications of the image display element 22, i.e., the area of the display surface 23, the F-number and the like.

As shown in FIG. 22(A), in Reference Example 2, the converging angle θi on the incident surface 81 is within the allowable incident angle. The allowable incident angle is a predetermined angle with which light can be effectively used. Therefore, there is no loss of light quantity caused by light incident on an ineffective incident angle (angle with which light is not effectively used). That is, the angle-based loss of light quantity does not occur.

However, when the converging angle θi is set to an angle with which the angle-based loss of light quantity does not occur, an area where light can be converged is uniquely determined by the etendue. Therefore, as shown in FIG. 22(B) and FIG. 23, illumination light protrudes outside the incident surface 81 of the integrator rod 8 in the y direction. That is, the area-based loss of light quantity occurs.

<Reference Example 3>

Figure 24A:
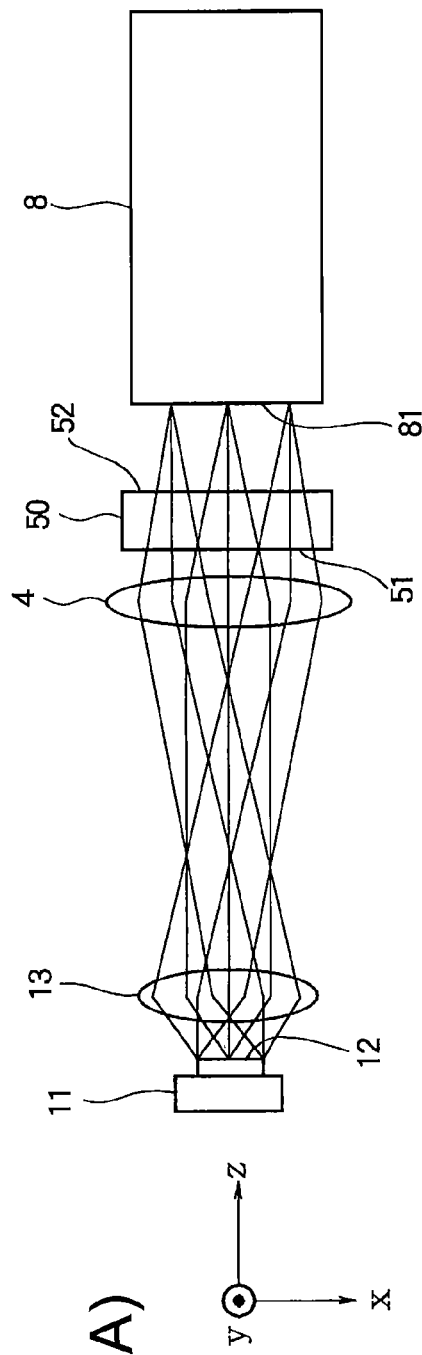
FIGS. 24(A) and 24(B) are schematic views showing a configuration of a light converging optical system of Reference Example 3.
Figure 24B:
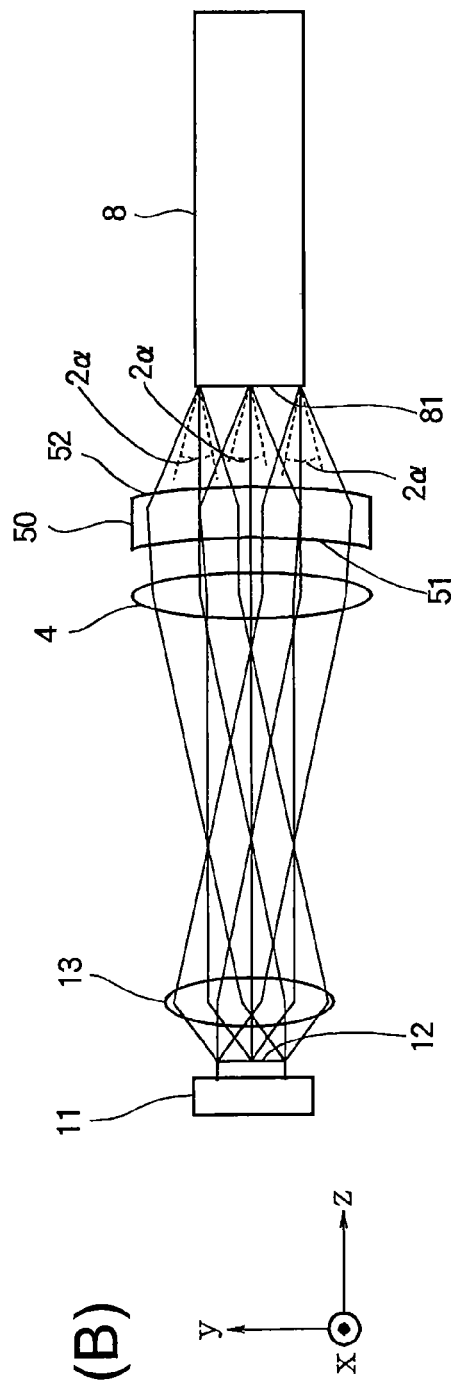

FIG. 24 is a view showing a configuration of a light converging optical system of Reference Example 3. FIG. 24(A) is a view of the light converging optical system as seen from +y direction. FIG. 24(B) is a view of the light converging optical system from +x direction. The light converging optical system of Reference Example 3 is a light converging optical system designed by a conventional design method, and in which loss of light quantity occurs.

The light converging optical system of Reference Example 3 has a toroidal lens 50. That is, in the light converging optical system of Reference Example 3, the light emitted from the light emitting surface 12 is converted into parallel light by the collimator lens 13. The parallel light is incident on the condenser lens 4, and is converged. The light is converged on the incident surface 81 of the integrator rod 8 via the toroidal lens 50.

FIG. 25 is a schematic view showing a converging area of illumination light on the incident surface 81 of the integrator rod 8 of Reference Example 3. In FIG. 25, the converging area is indicated by mark B.

The toroidal lens 50 can have different refracting powers in the x direction and in the y direction, respectively. In Reference Example 3, a first surface 51 on an incidence side and a second surface 52 on an emission side of the toroidal lens 50 have refraction powers only in the y direction. With such an arrangement, as shown in FIG. 25, the area-based loss of light quantity can be prevented. However, as shown in FIG. 24(B), the converging angle in the y direction on the incident surface 81 is larger than the allowable incident angle (α). That is, the angle-based loss of light quantity occurs in Reference Example 3. In this case, the loss of light quantity is the same as the loss of light quantity of Reference Example 2 (FIG. 22, FIG. 23).

As in Reference Example 2 and Reference Example 3, when the aspect ratio of the light emitting surface 12 is different from the aspect ratio of the incident surface 81, the area-based loss of light quantity, the angle-based loss of light quantity, or both occurs. Embodiment 3 of the present invention achieves reduction of the angle-based loss of light quantity in the y direction shown in FIG. 24(B) using the toroidal lens.

<Light Converging Optical System of Embodiment 3>

FIG. 26 is a view showing a configuration of a light converging optical system 1C according to Embodiment 3. Here, the surface-emission light sources 11*r*, 11*g* and 11*b* are collectively expressed by mark 11, the light emitting surfaces 12*r*, 12*g* and 12*b* are collectively expressed by mark 12 collectively. The collimator lens 13*r*, 13*g* and 13*b* collectively expresses by mark 13. The direction of an optical axis is defined as the z direction, the horizontal direction is defined as the x direction and the vertical direction is defined as the y direction. FIG. 26(A) is a view of the light converging optical system 1C of Embodiment 3 as seen from +y direction. FIG. 26(B) is a view of the light converging optical system 1C of Embodiment 3 as seen from +x direction.

In the light converging optical system 1C of Embodiment 3, the light emitted from the light emitting surface 12 of the surface-emission light source 11 is converted into parallel light by collimator lens 13. The parallel light is incident on the condenser lens 4, and is converged. The light converged by the condenser lens 4 is incident on the converging F-number control lens 5, and is converged on the incident surface 81.

As shown in FIG. 26(B), the converging angle θi of the center portion of the incident surface 81 in the y direction is different from the converging angle θi of the peripheral portion of the incident surface 81 in the y direction. More specifically, the converging angle θi of the center portion of the incident surface 81 is smaller than the converging angle θi of the peripheral portion of the incident surface 81. The y direction is a direction in which the aspect ratio by the toroidal surface of the converging F-number control lens 5, i.e., a direction in which the loss of light quantity occurs. In this regard, compression of the aspect ratio will be described later.

That is, in FIG. 26(B), an image formation state of light within a surface parallel to a y-z plane is observed. The light emitted from the peripheral portion of the light emitting surfaces 12*r*, 12*g* and 12*b* in the y direction is converged on a peripheral portion of the incident surface 81 at a predetermined magnification. In contrast, the light emitted from the center portion of the light emitting surfaces 12*r*, 12*g* and 12*b* in the y direction is converged at a larger image magnification than the image magnification of the light emitted from the peripheral portion. In other words, the light emitted from the center portion of the light emitting surfaces 12*r*, 12*g* and 12*b* in the y direction is converged on the incident surface 81 at an angle θi smaller than the light emitted from the peripheral portion in the y direction edge.

Figure 27:
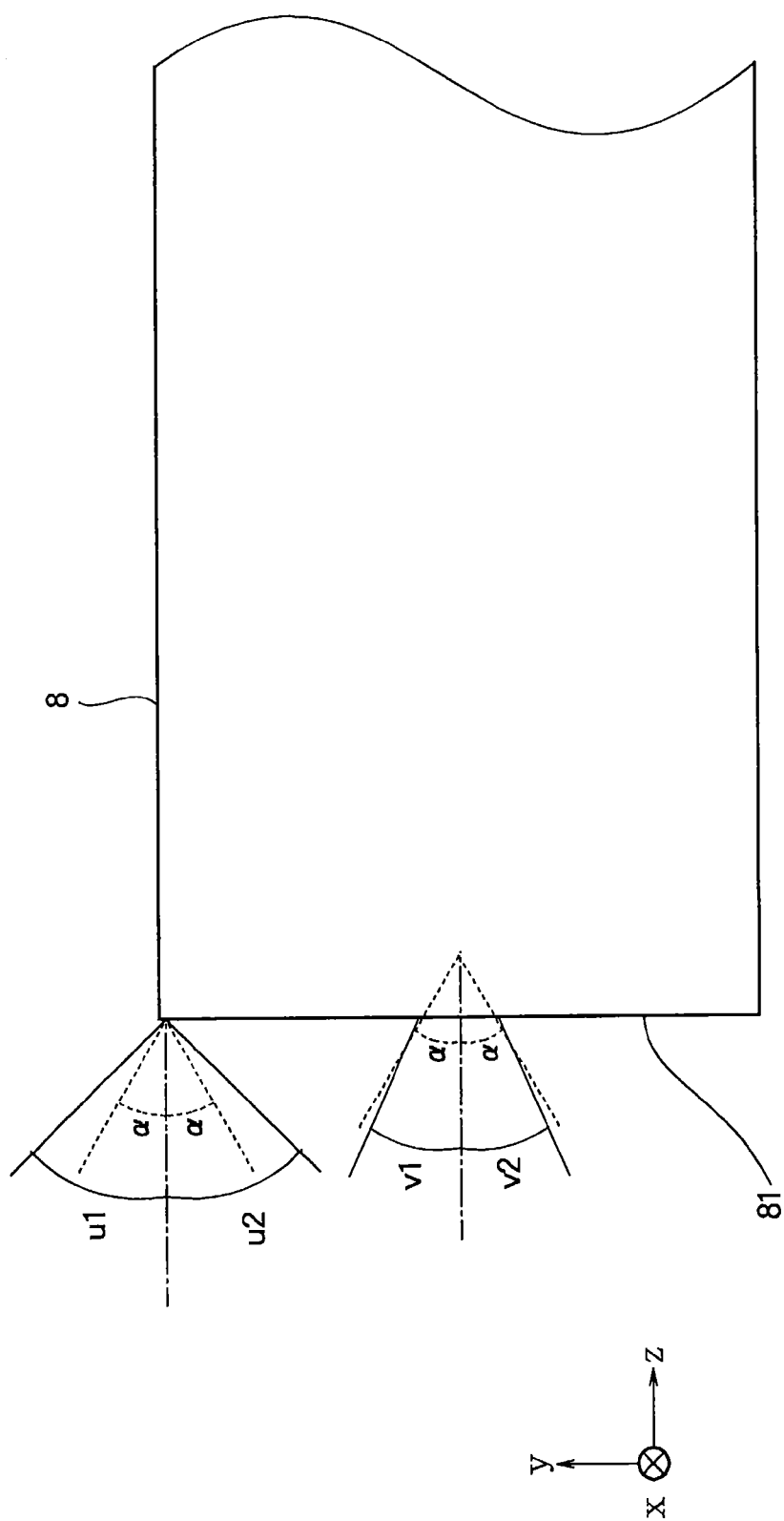
FIG. 27 is a schematic view showing a state where light is converged in the light converging optical system according to Embodiment 3.

FIG. 27 is a schematic view showing the state where the light emitted from the light emitting surfaces 12*r*, 12*g* and 12*b* is converged on the incident surface 81 of the integrator rod 8 in a y-z plane. FIG. 27 is a view showing the vicinity of the incident surface 81 as seen from +X direction.

The light emitted in +Z direction from one point on the light emitting surfaces 12*r*, 12*g* and 12*b* spreads at a certain spread angle. Among the emitted light, a largest angle of light incident on the collimating lenses 13*r*, 13*g* and 13*b* is an acceptance angle θs. The Acceptance angle θs is defined as an angle with respect to the normal line of the light emitting surfaces 12r, 12g and 12b. Therefore, in the y-z plane, both of light emitted in +y direction at an acceptance angle θs1 and light emitted in −y direction at an acceptance angle θs2 exist with respect to the z direction.

In contrast, the light incident on one point on the incident surface 81 is converged at a certain angle. The angle of the light incident on one point on the incident surface 81 is a converging angle θi. The converging angle θi is defined as an angle with respect to the normal line of the incident surface 81. For this reason, in the y-z plane, both of light incident from +Y direction at a converging angle θi1, and light incident from −y direction at a converging angle θi2 exist with respect to the z direction. In FIG. 27, marks u1 and v1 show the light incident at the converging angle θi1. Further, marks u2 and v2 show the light at the converging angle θi2.

The light emitted from the peripheral portion of the light emitting surfaces 12r, 12g and 12b in −y direction (see FIG. 26(B)) at the acceptance angle θs2 is converged on the incident surface 81 at the converging angle u2. The light emitted from the peripheral portion of the light emitting surfaces 12r, 12g and 12b in −y direction at the acceptance angle θs1 is converged on the incident surface 81 at the converging angle u1.

The light emitted from the center portion (see FIG. 26(B)) of the light emitting surfaces 12r, 12g and 12b of the y direction at the acceptance angle θs2 is converged on the incident surface 81 at the converging angle v2. The light emitted from the center portion of the light emitting surfaces 12r, 12g and 12b in the y direction at the acceptance angle θs1 is converged on the incident surface 81 at the converging angle v1.

The allowable incident angle on the integrator rod 8 is expressed as α. The allowable incident angle α is defined as an angle with respect to the normal line of the incident surface 81. At the peripheral portion of the incident surface 81, the converging angles u1 and u2 are larger than the allowable incident angle α, and therefore the angle-based loss of light quantity occurs. In contrast, at the center portion of the incident surface 81, the converging angles v1 and v2 are smaller than the converging angles u1 and u2, the angle-based loss of light quantity can be eliminated, or can be reduced at a lower level than at the peripheral portion of the incident surface 81.

As a result, as compared with Reference Example 3 of FIG. 24(B), the angle-based loss of light quantity can be reduced from the center portion to the peripheral portion of the light emitting surfaces 12r, 12g and 12b. In this case, the loss of light quantity becomes smaller as the converging angles v1 and v2 in the y direction of the light emitted from the center of the light emitting surfaces 12r, 12g and 12b are closer to the allowable incident angle α. Therefore, it is desirable that the converging angles v1 and v2 are smaller than or equal to the allowable incident angle α.

In this regard, in Embodiment 3, the size of the secondary light source image of the light emitting surface and the size of the incident surface 81 are the same as each other. However, Embodiment 3 is not limited to such a configuration, but can be modified. For example, it is also possible to make the image magnification be slightly larger.

Figure 28:
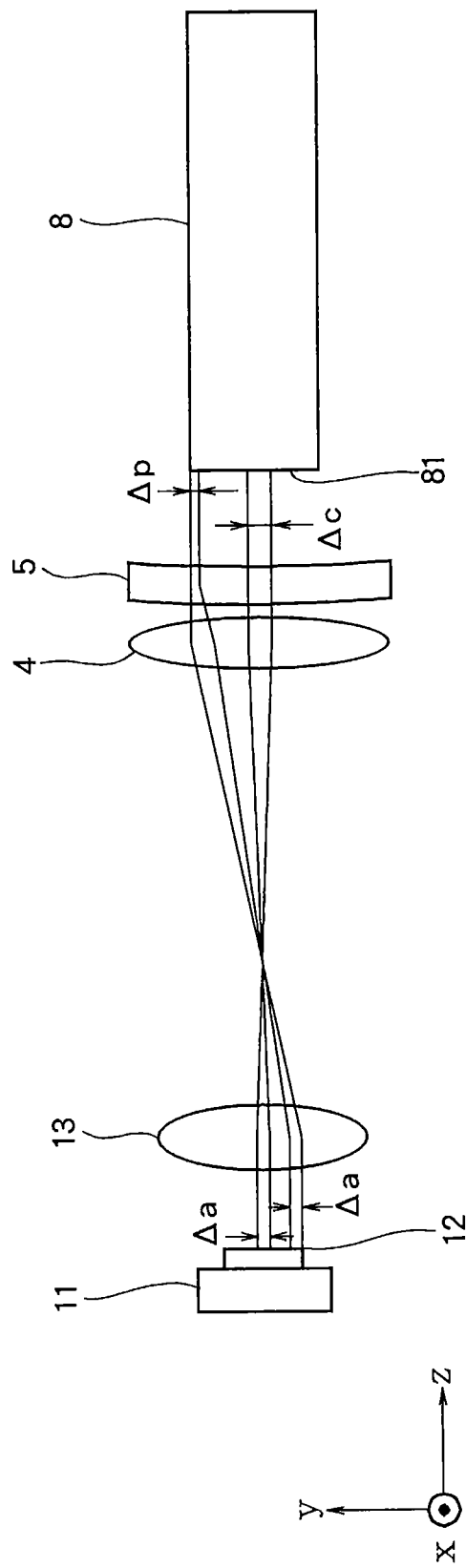
FIG. 28 is a schematic view showing a state where image is formed by light emitted from a minute emission area of the light converging optical system according to Embodiment 3.

FIG. 28 is a schematic view showing a state where an image of a minute emission area on the light emitting surfaces 12r, 12g and 12b is formed on the incident surface 81 of the integrator rod 8 in the y-z plane. The surface-emission light sources 11r, 11g and 11b are collectively expressed by mark 11, and the light emitting surfaces 12r, 12g and 12b are collectively expressed by mark 12. The collimator lens 13r, 13g and 13b are collectively expressed by mark 13.

In FIG. 28, a minute length of a minute emission area on the light emitting surfaces 12r, 12g and 12b in the y direction is expressed as Δa. In FIG. 28, light rays emitted from the area of the minute length Δa of the center portion of the light emitting surfaces 12r, 12g and 12b at a right angle to the light emitting surface are shown. Further, light rays emitted from the area of the minute length Δa of the peripheral portion of the light emitting surfaces 12r, 12g and 12b at a right angle to the light emitting surface are also shown.

An image of the minute emission area having the minute length Δa at the center portion of the light emitting surfaces 12r, 12g and 12b is formed on the incident surface 81 as an image having a minute length Δc. In contrast, an image of the minute emission area having the minute length Δa at the peripheral portion of the light emitting surfaces 12r, 12g and 12b is formed on the incident surface 81 as an image having a minute length Δp. As described above, the converging angles v1 and v2 (FIG. 27) on the center portion of the incident surface 81 are smaller than the converging angles u1 and u2 on the peripheral portion of the incident surface 81. In other words, the image magnification at the center portion is larger than the image magnification at the peripheral portion. Therefore, the minute length Δc is larger than the minute length Δp. Accordingly, the angle-based loss of light quantity can be reduced without causing the area-based loss of light quantity to occur (i.e., without causing the light to be incident outside the incident surface 81).

FIG. 29 is a schematic view showing a configuration of the converging F-number control lens 5 and a converging action thereof. FIG. 29 (A) is a view as seen from +x direction, and FIG. 29 (B) is a view as seen from +y direction. The converging F-number control lens 5 includes a first surface 51 and a second surface 52. The first surface 51 is a surface on which the light from the surface-emission light sources 11r, 11g and 11b is incident. The second surface 52 is a surface through which the light incident on the first surface 51 is emitted from the converging F-number control lens 5. Both of the first surface 51 and the second surface 52 are toroidal surfaces. In this regard, the toroidal surface includes a cylindrical surface.

The converging F-number control lens 5 has two functions. The first function is a function to compress an aspect ratio. The second function is a function to control a converging F-number. The first function is a function to compress the aspect ratio in the x direction, or a function to compress the aspect ratio in the y direction. Further, the second function is a function to control the converging F-number in the direction in which the aspect ratio is compressed in the incident surface 81.

First, the function (i.e., the first function) to compress the aspect ratio will be described. As shown in FIG. 29(A), the first surface 51 and the second surface 52 have convex shapes protruding in the +z direction in the y-z plane. In contrast, as shown in FIG. 29(B), the radius of curvature of the first surface 51 and the second surface 52 are infinity in the x direction. That is, the first surface 51 and the second surface 52 have flat shapes in the x direction.

Therefore, as shown in FIG. 29(B), in the x-y plane, an incident angle when light rays are incident on the first surface 51 and an emission angle when the light rays are emitted from the second surface 52 are the same. The converging F-number control lens 5 converges the light emitted from the light emitting surfaces 12r, 12g and 12b on the incident surface 81 at a desired angle.

In contrast, as shown in FIG. 29(A), light rays in the y direction are light rays in a direction in which the aspect ratio is compressed. The light rays in the Y direction are light rays on a plane parallel to the y-z plane, and therefore need be incident on the incident surface 81 at a larger angle than light rays in the x direction. The light rays in the x direction are light rays on a plane parallel to the x-z plane. In order to converge the light rays in the y direction on an arbitrary position on the incident surface 81, it is necessary that a light path of the light rays in the y direction is longer than or shorter than that of the light rays in the x direction according to a converging position. For this purpose, at two least two toroidal surfaces are needed. The toroidal surfaces have refracting power in the direction in which the aspect ratio is compressed. The direction in which the aspect ratio is compressed is the y direction. The two toroidal surfaces are the first surface 51 and the second surface 52.

Next, the function (i.e., the second function) to control the converging F-number will be described. In FIG. 29(A), the curvature in the y-z plane of the converging F-number control lens 5 is a curvature that makes a refracting power at the center portion smaller than a refracting power at the peripheral portion. In this regard, the refracting power at the center portion of the converging F-number control lens 5 is a power for refracting the light rays emitted from the center portion of the light emitting surfaces 12r, 12g and 12b in the y direction. Further, the refracting power at the peripheral portion of the converging F-number control lens 5 is a power for refracting the light rays emitted from the peripheral portion of the light emitting surfaces 12r, 12g and 12b in the y direction.

The converging F-number control lens 5 can make the converging angles v1 and v2 on the incident surface 81 smaller than the converging angles u1 and u2. The converging angles v1 and v2 are converging angles (in the Y direction) of light rays converged on the center portion of the incident surface 81. The converging angles u1 and u2 are converging angles (in the Y direction) of light rays converged on the peripheral portion of the incident surface 81 in the Y direction. That is, the converging F-number control lens 5 can control the converging F-number in the direction (here, the y direction) in which the aspect ratio is compressed on the incident surface 81.

In this regard, in the above description, only the converging F-number control lens 5 has a function to make the converging angles u1 and u2 at the peripheral portion of the incident surface 81 different from the converging angles v1 and v2 at the center portion in the direction in which the aspect ratio is compressed. However, Embodiment 3 is not limited to such a configuration. For example, the converging F-number control lens 5 may be constituted by a plurality of lenses, and the plurality of the lenses may have a function to make the converging angles u1 and u2 at the peripheral portion different from the converging angles v1 and v2 at the center portion in the direction in which the aspect ratio is compressed.

Further, the above described function (i.e., function to make the converging angles u1 and u2 at the peripheral portion of the incident surface 81 different from the converging angles v1 and v2 at the center portion in the direction in which the aspect ratio is compressed) need only be fulfilled by a whole of the light converging optical system 1C. For example, the function may be assigned to any of the collimator lenses 13r, 13g and 13b, the condenser lens 4 and converging F-number control lens 5. Alternatively, the function may be assigned to a plurality of lenses constituting the light converging optical system 1C.

<Numerical Example 2>

Hereinafter, Numerical Example 2 of the light converging optical system 1C of Embodiment 3 will be described. Optical data of the light converging optical system 1C is shown in Table 8. FIG. 30 is a view showing a configuration of a light converging optical system 1C corresponding to the optical data shown in Table 8. FIG. 30(A) is a view of the light converging optical system 1C as seen in the x direction. FIG. 30(B) is a view of the light converging optical system 1C as seen in the y direction.

The light converging optical system 1C shown in FIG. 30 includes the surface-emission light source 11, the collimator lenses 513 and 613, the condenser lens 114, the toroidal lens 115, and the integrator rod 8.

In this example, each size of the light emitting surfaces 12r, 12g and 12b of the surface-emission light source 11 is 2.7 mm×2.0 mm. The size of the incident surface 81 of the integrator rod 8 is 6.39 mm×2.86 mm. The acceptance angle of the light from the surface-emission light source 11 is 80 degrees. The allowable incident angle on the integrator rod 8 is 30 degrees. In this case, the F-number is 1.0 (F=1.0). This is equivalent to a case where an area of 15.97 mm×7.16 mm on the display surface 23 of the image display element 22 is illuminated with F2.5. In this case, an illumination angle θ1 is approximately 11.5 degrees. The refractive index of the glass material used for each lens is 1.52.

TABLE 8

| LENS | Si (Surface Number) | SHAPE OF LENS SURFACE | RADIUS OF CURVATURE (mm) (x-z plane) | RADIUS OF CURVATURE (mm) (y-z plane) | THICKNESS (mm) |
|---|---|---|---|---|---|
| 12r 12g 12b | OBJ | — | INFINIFY | INFINIFY | — |
| CG | S1 | SPHERICAL | INFINIFY | INFINIFY | 0.90 |
|  | S2 | SPHERICAL | INFINIFY | INFINIFY |  |
| 513r 513g 513b | S3 | SPHERICAL | INFINIFY | INFINIFY | 12.00 |
|  | S4 | SPHERICAL | −19.39 | −19.39 |  |
| 613r 613g 613b | S5 | SPHERICAL | 249.04 | 249.04 | 21.00 |
|  | S6 | ASPHERICAL | −17.06 | −17.06 |  |
| 114 | S7 | ASPHERICAL | 21.25 | 21.25 | 22.00 |
|  | S8 | ASPHERICAL | −19.04 | −19.04 |  |
| 115 | S9 | TOROIDAL | INFINIFY | −100.49 | 28.74 |
|  | S10 | TOROIDAL | INFINIFY | −19.04 |  |
| 81 | IMA | — | INFINIFY | INFINIFY | — |

In a column of the surface number Si in the optical data shown in Table 8, a surface number of i-th surface corresponding to a mark Si shown in FIG. 30 is provided. A number i is a natural number greater than or equal to 1. The number of a surface of a most object-side element is 1 (i=1). The number i sequentially increase toward an image side. The object side is the surface-emission light sources 11r, 11g and 11b side. OBJ indicates an object surface, i.e., the light emitting surfaces 12r, 12g and 12b in FIG. 30. IMA indicates an imaging surface, i.e., the incident surface 81 in FIG. 30. CG indicates a cover glass (i.e., a parallel flat plate) of the surface-emission light source.

Further, in Table 8, the surfaces S6, S7 and S8 are aspherical surfaces. Table 9 shows aspherical surface data.

TABLE 9

| | SURFACE NUMBER | | |
|---|---|---|---|
| | S6 | S7 | S8 |
| k | −6.62448E−01 | −2.081848E−01 | 1.32866E+05 |
| A1 | 0 | 0 | 0 |
| A2 | 0 | 0 | 0 |
| A3 | 0 | 0 | 0 |
| A4 | −1.153015E−05 | −1.972017E−05 | −5.202847E−05 |
| A5 | 0 | 0 | 0 |
| A6 | −1.601567E−08 | 1.053233E−07 | 2.461847E−07 |
| A7 | 0 | 0 | 0 |
| A8 | 5.269177E−11 | −3.518916E−10 | −2.534288E−08 |
| A9 | 0 | 0 | 0 |
| A10 | 5.93521E−14 | 1.836680E−13 | −2.534288E−08 |

The aspherical surface data in Table 9 show respective aspherical coefficients k and Ai of the expression of the aspherical surface expressed by the following expression (10). k represents a conic coefficient. C represents a curvature at a surface vertex. Ai represents an aspherical coefficient of i-th order. Z is an aspherical sag (depth: mm) at a radius r (mm) from an optical axis. The sag is a distance to each lens surface from a plane (i.e., a base surface) perpendicular to an optical axis and including an intersection (i.e., surface vertex) between the lens surface and the optical axis, with respect to a distance from an optical axis.

$$Z1(r) = C \cdot r^2 / \{1 + (1-(1+k) \cdot C^2 \cdot r^2)^{1/2}\} + \Sigma Ai \cdot r^i \ (i=1 \ldots n) \quad (10)$$

In Table 8, the surfaces S9 and S10 are toroidal surfaces as aspheric surfaces. Table 10 shows aspherical surface data.

TABLE 10

| | SURFACE NUMBER | |
|---|---|---|
| | S8 | S9 |
| k | 6.659493E+00 | −4.57159E−01 |
| A1 | 0 | 0 |
| A2 | 0 | 0 |
| A3 | 0 | 0 |
| A4 | −3.904142E−06 | 4.766106E−05 |
| A5 | 0 | 0 |
| A6 | −2.534288E−08 | 4.766106E−05 |
| A7 | 0 | 0 |
| A8 | 6.541012E−22 | −1.46983E−07 |
| A9 | 0 | 0 |
| A10 | −1.219541E−13 | −4.307774E−13 |

The aspherical surface data in Table 10 show respective aspherical coefficients k and Ai of the expression of the aspherical surface expressed by the following expression (11). k represents a conic coefficient. C represents a curvature at a surface vertex. Ai represents aspherical coefficient of i-th order. Z is an aspherical sag (depth: mm) at a radius ry (mm) in the y direction from an optical axis.

$$Z1(y) = C \cdot ry^2 / \{1 + (1-(1+k) \cdot C^2 \cdot ry^2)^{1/2}\} + \Sigma Ai \cdot ry^i \ (i=1 \ldots n) \quad (11)$$

In this regard, the optical data shown in Tables 8, 9, and 10 is for explaining the function of the light converging optical system 1C of Embodiment 3. For example, although a lot of aspherical surface lenses are used in Numerical Example 2, the aspherical surface lenses may be replaced with a plurality of spherical surface lenses. As glass material used for the lenses, various materials having different refractive indexes may be used.

The collimator lens 13 is constituted by two lenses, i.e., a first collimator lens 513 and a second collimator lens 613. The first collimator lens 513 is located on the surface-emission light source 11 side. The second collimator lens 613 is located on the integrator rod 8 side. The condenser lens 4 is constituted by one lens, i.e., a condenser lens 114. The converging F-number control lens 5 is constituted by one lens, i.e., a condenser lens 115.

In this regard, the surface-emission light sources 11r, 11g and 11b are collectively expressed by mark 11. The collimator lenses 13r, 13g and 13b are collectively expressed by mark 13. The first collimator lenses 513r, 513g and 513b are collectively expressed by mark 513. The second collimator lenses 613r, 613g and 613b are collectively expressed by mark 613.

Figure 31:
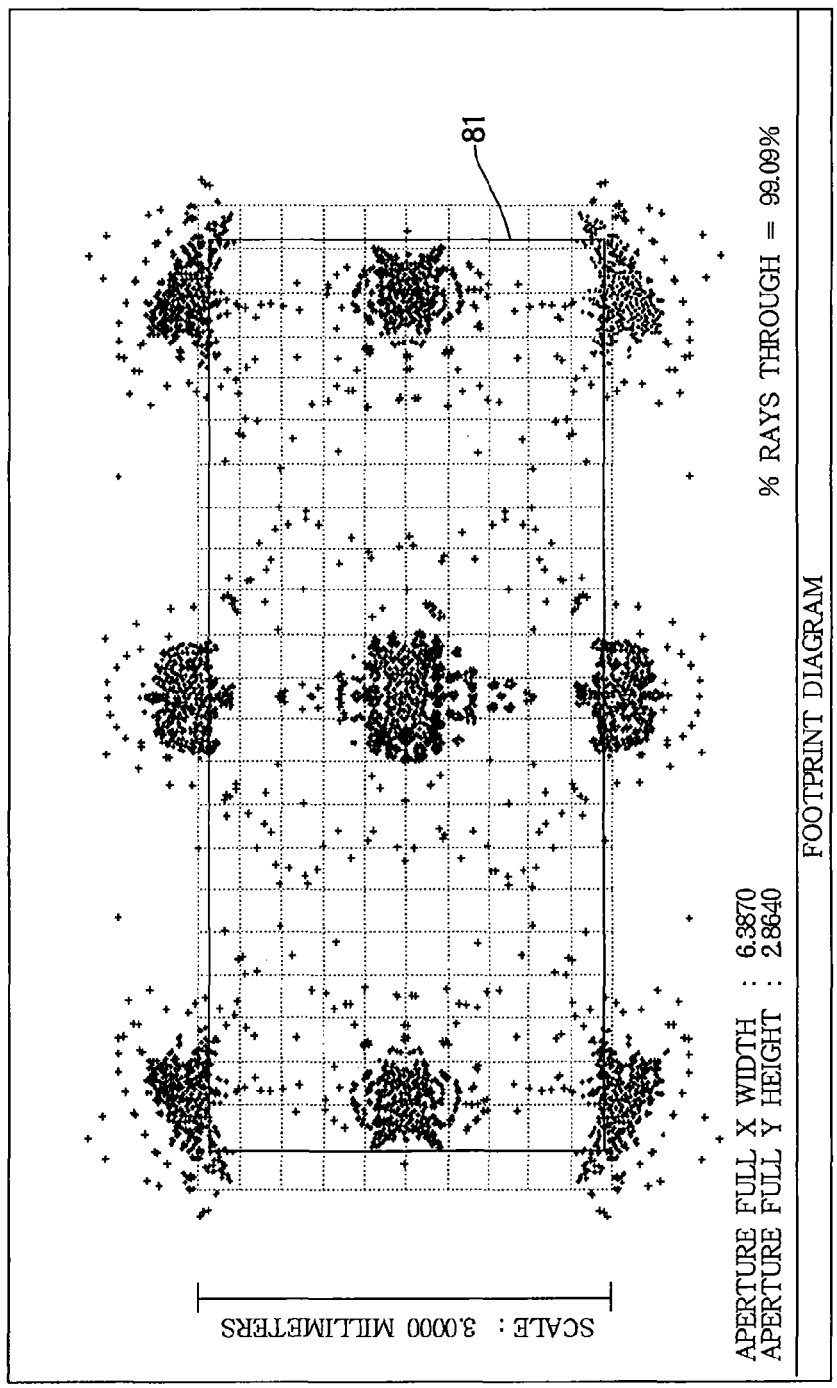
FIG. 31 is a view showing light spots on an incident surface of an integrator rod of the light converging optical system corresponding to Numerical Example 2.

FIG. 31 is a view showing a simulation result of light converging spots on the incident surface 81. In FIG. 31, a rectangular frame indicates a range of the incident surface 81. A horizontal axis is an x axis. A right direction along the horizontal axis is +x direction. A vertical axis is a y axis. An upward direction along the vertical axis is +y direction. In this regard, light converging spots of light having a wavelength of 550 nm are shown in FIG. 31, as a representative example of light of three wavelength bands (i.e., the red light, the green light and the blue light) emitted from the surface-emission light sources 11r, 11g and 11b.

Light converging spots are formed by the following nine light. That is, light converging spots are formed by the light emitted from four corners of the light emitting surfaces 12r, 12g and 12b, the light emitted from the centers of the light emitting surfaces 12r, 12g and 12b, and the light emitted from the middle points of respective sides of the light emitting surfaces 12r, 12g and 12b. The light emitted from the light emitting surfaces 12r, 12g and 12b are converged on the incident surface 81 in such a manner that the aspect ratios of the light emitting surfaces 12r, 12g and 12b are changed.

Figure 32:
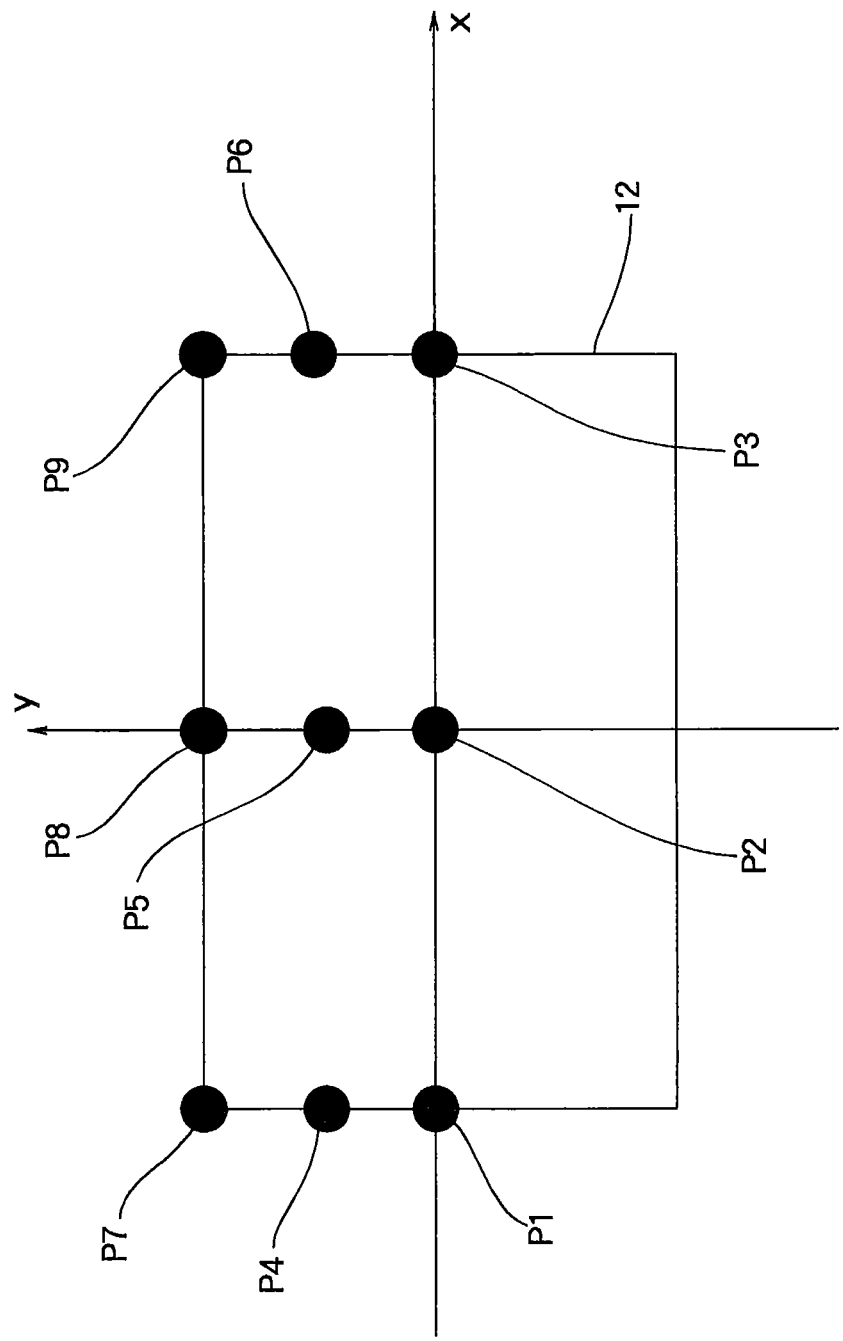
FIG. 32 is a view showing emitting positions of light emitted from a light emitting surface.

Table 11 shows F-numbers in the x direction and the y direction when the light rays emitted from points P1 through P9 on the light emitting surface 12 defined in FIG. 32 are converged on the incident surface 81 of the integrator rod 8.

An emission position P1 is a point of an end in −x direction of a straight line passing through a center of the light emitting surface 12 in the x direction. An emission position P2 is a center point of the light emitting surface 12. An emission position P3 is a point of an end in +x direction of the straight line passing through the center of the light emitting surface 12 in the x direction. An emission position P7 is a point of an end in −x direction of a side of the light emitting surface 12 at an end in +y direction. An emission position P8 is a center point of the side of the light emitting surface 12 at the end in +y direction. The emission position P9 is a point of an end in +x direction of the side of the light emitting surface 12 at the end of +y direction. The emission position P4 is a middle point between the emission position P1 and the emission position P7. The emission position P5 is a middle point between the emission position P2 and the emission position P8. The emission position P6 is a middle point between the emission position P3 and the emission position P9.

The converging angle θi on the incident surface 81 in the y direction is smaller as a position becomes closer to the center of the incident surface 81. Therefore, in Table 11, there is a tendency that the F-number becomes larger as a position becomes closer to the center of the light emitting surfaces 12r, 12g and 12b in the y direction. Further, there is a tendency that the F-number becomes smaller as a position becomes closer to the peripheral portion of the light emitting surfaces 12r, 12g and 12b in the y direction.

TABLE 11

| EMISSION POSITION OF LIGHT RAY | CONVERGING F-NUMBER in Y DIRECTION | CONVERGING F-NUMBER in X DIRECTION |
|---|---|---|
| P1 | 0.807 | 1.041 |
| P2 | 0.808 | 1.047 |
| P3 | 0.807 | 1.041 |
| P4 | 0.803 | 1.040 |
| P5 | 0.804 | 1.046 |
| P6 | 0.803 | 1.040 |
| P7 | 0.756 | 1.036 |
| P8 | 0.756 | 1.043 |
| P9 | 0.756 | 1.036 |

<2>

Hereinafter, Comparison Example 2 for contrasting with an effect of the light converging optical system 1C of Embodiment 3 will be described. The light converging optical system of Comparison Example 2 is a general light converging optical system designed to converge the light emitted from the surface-emission light sources 11r, 11g and 11b on the incident surface 81 of the integrator rod 8 at the allowable incident angle α.

Figure 33:
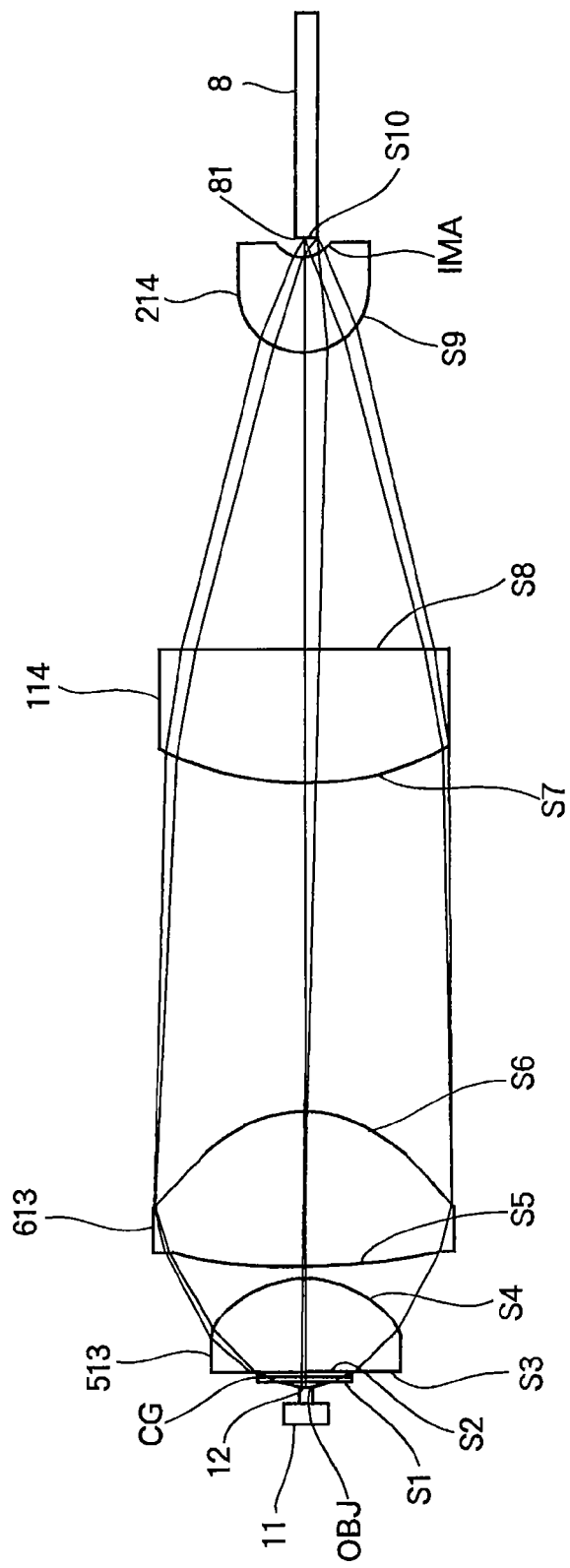
FIG. 33 is a view showing a configuration of a light converging optical system corresponding to Comparison Example 2.

Table 12 shows optical data of the light converging optical system of Comparison Example 2. FIG. 33 is a view showing a configuration of a light converging optical system corresponding to the optical data shown in Table 12. As shown in FIG. 33, the light converging optical system of Comparison Example 2 includes the surface-emission light source 11, the collimator lenses 513 and 613, the condenser lenses 114 and 214 and the integrator rod 8. In this regard, the surface-emission light sources 11r, 11g and 11b are expressed by mark 11. The light emitting surfaces 12r, 12g and 12b are expressed by mark 12. The first collimator lenses 513r, 513g and 513b are expressed by mark 513. The second collimator lenses 613r, 613g and 613b are expressed by mark 613.

In Comparison Example 2, each size of the light emitting surfaces 12r, 12g and 12b is 2.7 mm×2.0 mm. The size of the incident surface 81 is 6.39 mm×2.86 mm. The acceptance angle θs of the light emitted from the surface-emission light sources 11r, 11g and 11b is 80 degrees. The allowable incident angle α on the incident surface 81 of the integrator rod 8 is 30 degrees. The F-number is 1 (F=1). This is equivalent to a case where an area of 15.97 mm×7.16 mm on the display surface 23 is illuminated by F2.5. The illumination angle θl is approximately 11.5 degrees. The refractive index of glass material used for each lens is 1.52. That is, the size of the light emitting surface 12, the size of the incident surface 81, the acceptance angle θs, the allowable incident angle α, the illumination angle θl, the wavelength of light and the refractive index of the glass material are the same as those of Numerical Example 2.

TABLE 12

| LENS | Si (SURFACE NUMBER) | SHAPE OF LENS SURFACE | RADIUS OF CURVATURE (mm) | THICKNESS (mm) |
|---|---|---|---|---|
| 12r 12g 12b | OBJ | — | INFINITY | — |
| CG | S1 | SPHERICAL | INFINITY | 0.90 |
|  | S2 | SPHERICAL | INFINITY |  |
| 513r 513g 513b | S3 | SPHERICAL | INFINITY | 12.00 |
|  | S4 | SPHERICAL | −14.72 |  |
| 613r 613g 613b | S5 | SPHERICAL | 89.29 | 21.00 |
|  | S6 | ASPHERICAL | −16.33 |  |
| 114 | S7 | ASPHERICAL | 44.51 | 18.00 |
|  | S8 | SPHERICAL | INFINITY |  |
| 214 | S9 | ASPHERICAL | 8.21 | 12.90 |
|  | S10 | SPHERICAL | 5.05 |  |
| 81 | IMA | — | INFINITY | — |

Notations of Table 12 are the same as those of Table 9. Table 13 shows aspherical surface data.

TABLE 13

| | SURFACE NUMBER | | |
|---|---|---|---|
| | S6 | S7 | S8 |
| k | −8.640797E−01 | −1.045821E+0 | 2.723633E+0 |
| A1 | 0 | 0 | 0 |
| A2 | 0 | 0 | 0 |
| A3 | 0 | 0 | 0 |
| A4 | −3.939562E−06 | −4.731498E−06 | −1.052019E−03 |
| A5 | 0 | 0 | 0 |
| A6 | −8.955316E−09 | 3.404733E−06 | −7.764107E−05 |
| A7 | 0 | 0 | 0 |
| A8 | 4.683632E−11 | −4.518802E−08 | 2.025371E−06 |
| A9 | 0 | 0 | 0 |
| A10 | 5.222783E−14 | 5.342016E−10 | 1.165955E−07 |

Table 14 shows the F-numbers in the x direction and the y direction when the light rays emitted from points P1 through P9 on the surface-emission light sources 11r, 11g and 11b defined in FIG. 32 are converged on the incident surface 81 of the integrator rod 8 as in Table 11. Comparison Example 2 is designed so that the converging angle θi on the center of the incident surface 81 is approximately the same as the converging angle θi on the peripheral portion of the incident surface 81. Therefore, the F-number is approximately 1 irrespective of the emission positions P1 through P9 of the light rays.

TABLE 14

| EMISSION POSITION OF LIGHT RAY | CONVERGING F-NUMBER in Y DIRECTION | CONVERGING F-NUMBER in X DIRECTION |
|---|---|---|
| P1 | 0.978 | 0.983 |
| P2 | 1.038 | 1.038 |
| P3 | 0.978 | 0.983 |
| P4 | 0.972 | 0.976 |
| P5 | 1.031 | 1.030 |
| P6 | 0.972 | 0.976 |
| P7 | 0.953 | 0.954 |
| P8 | 1.008 | 1.006 |
| P9 | 0.953 | 0.954 |

Figure 34:
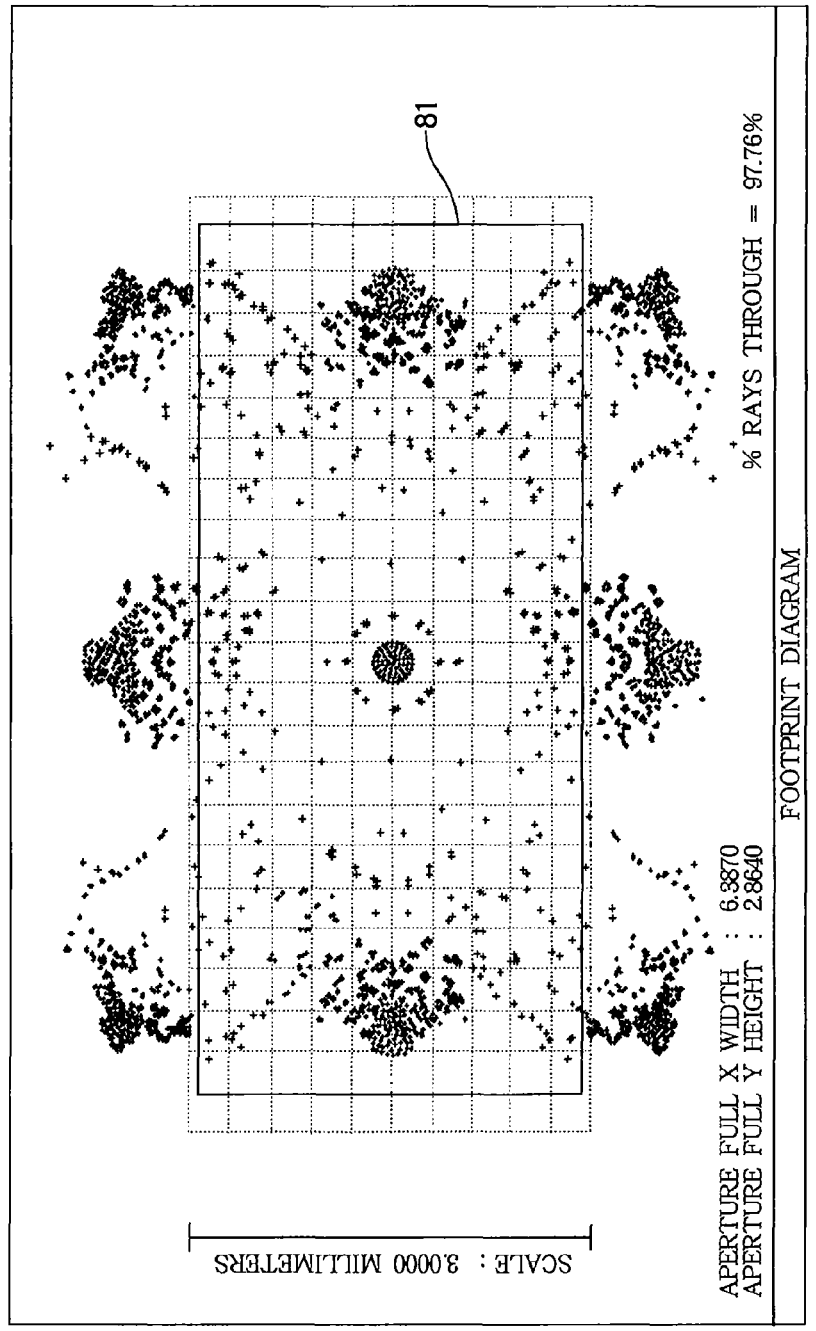
FIG. 34 is a view showing light spots on an incident surface of an integrator rod of the light converging optical system corresponding to Comparison Example 2.

FIG. 34 is a view showing a simulation result of light converging spots on the incident surface 81 as in FIG. 31. A rectangular frame in FIG. 34 shows a range of the incident surface 81. A horizontal axis is an x axis. A right direction along the horizontal axis is +x direction. A vertical axis is a y axis. An upward direction along the vertical direction is +y direction. In this regard, light converging spots of light having the wavelength of 550 nm are shown in FIG. 34, as a representative example of light of three wavelengths (i.e., the red light, the green light and the blue light) emitted from the surface-emission light sources 11r, 11g and 11b.

Since the aspect ratio of the light emitting surfaces 12r, 12g and 12b is different from the aspect ratio of the incident surface 81, and therefore the angle-based loss of light quantity will not occur if the converging angle θi on the incident surface 81 is the same as the allowable incident angle α. However, since the image magnification is large, the light emitted from the peripheral portion of the light emitting surfaces 12r, 12g and 12b in the y direction is incident outside the peripheral portion of the incident surface 81 in the y direction. That is, the area-based loss of light quantity occurs.

Table 15 is a table showing a converging efficiency on the incident surface 81 by comparison of Comparison Example 2 and Numerical Example 2. In Table 15, the allowable incident angle α is 30 degrees. The converging efficiency of Comparison Example 2 is 70.19%. In contrast, the converging efficiency of Numerical Example 2 is 80.01%. The converging efficiency of Numerical Example 2 is enhanced by 13.99% as compared with Comparison Example 2. A relative efficiency is a converging efficiency (i.e., a light use efficiency) when the converging efficiency of Comparison Example 2 is expressed as 100%.

TABLE 15

| ITEM | COMPARISON EXAMPLE 2 | NUMERICAL EXAMPLE 2 |
|---|---|---|
| CONVERGING EFFICIENCY ON INCIDENT SURFACE (ALLOWABLE INCIDNET ANGLE: 30 DEGREES) | 70.19% | 80.01% |
| RELATIVE EFFICIENCY (COMPARISON EXAMPLE: 100%) | 100% | 113.99% |

In this regard, the size of the integrator rod 8 is suitably determined based on the size of the light emitting surfaces 12r, 12g and 12b and the illumination F-number. For this reason, it is conceived that, in principle, the light incident on the integrator rod 8 reaches the screen 25 without loss of light except for an illumination margin, transmission loss at lenses or the like, and loss at the image display element 22.

As described above, in the light converging optical system 1C and the projection-type image display apparatus 2C according to Embodiment 3, the converging angle θi at the center portion of the incident surface 81 is smaller than the converging angle θi at the peripheral portion of the incident surface 81. In particular, the converging angle of the light converged on the center portion of the incident surface 81 in the direction in which the aspect ratio is compressed (i.e., the y direction in the above described example) is smaller than the converging angle of the light converged on the peripheral portion of the incident surface 81 in the same direction. Therefore, even when the aspect ratio of the light emitting surfaces 12r, 12g and 12b is different from the aspect ratio of the incident surface 81, the loss of light quantity at the integrator rod 8 can be reduced, and the light use efficiency at the integrator rod 8 can be enhanced.

Embodiment 4.

Figure 35:
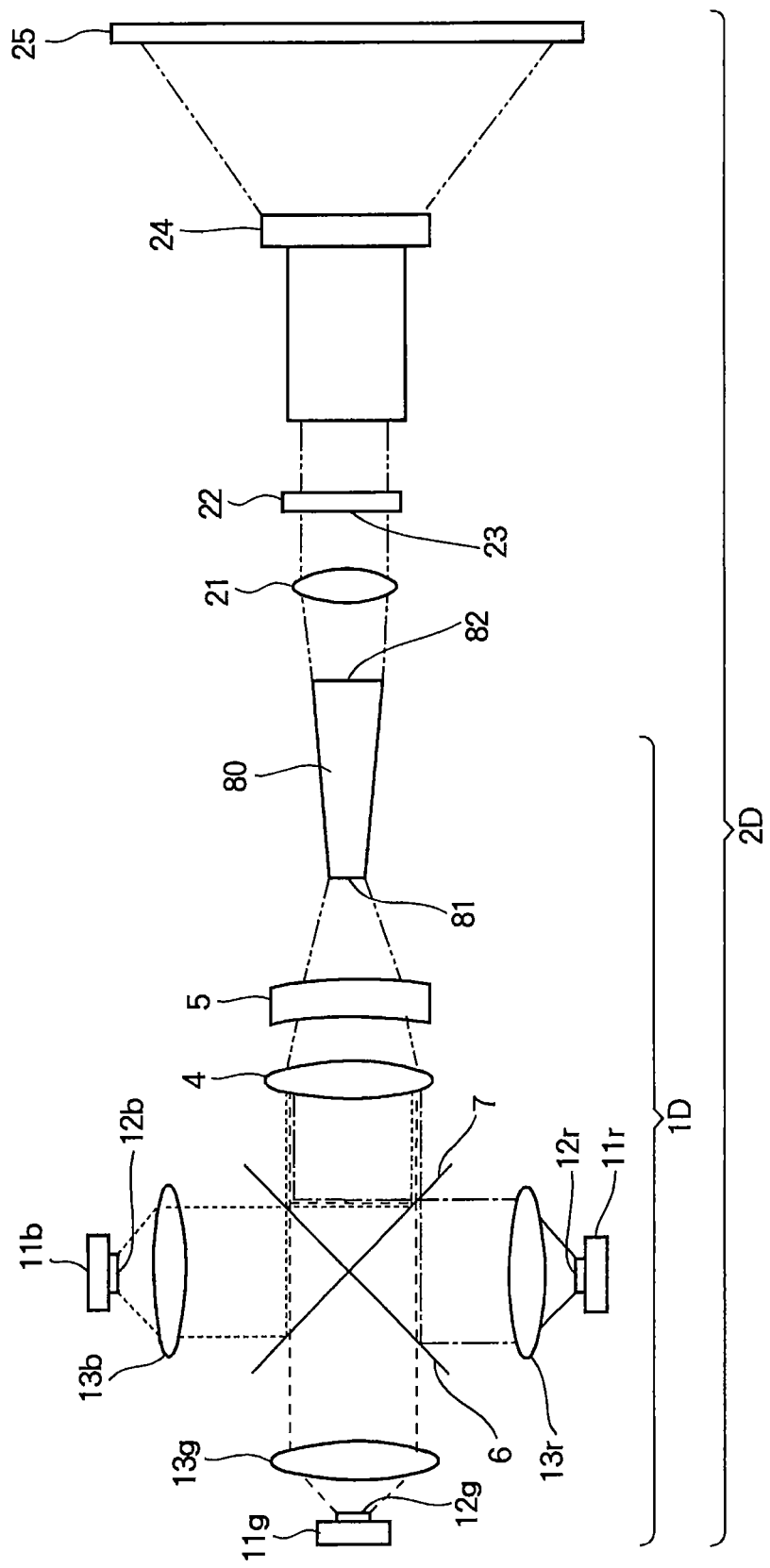
FIG. 35 is a view showing a configuration of a light converging optical system and a projection-type image display apparatus according to Embodiment 4 of the present invention.

FIG. 35 is a block diagram schematically showing a configuration of a light converging optical system 1D and a projection-type image display apparatus 2D according to Embodiment 4 of the present invention. As shown in FIG. 35, the integrator rod 80 is different from that of Embodiment 3 in that the integrator rod 80 has a tapered shape. The integrator rod 80 corresponds to a light-intensity-distribution equalizing element.

In FIG. 35, components which are the same as those of the light converging optical system 1C and the projection-type image display apparatus 2C are assigned with the same reference numerals, and explanations thereof will be omitted. The projection-type image display apparatus 2D of Embodiment 4 includes the surface-emission light sources 11r, 11g and 11b, the collimator lenses 13r, 13g and 13b, the dichroic mirrors 6 and 7, the condenser lens 4, the converging F-number control lens 5, the illumination optical system 21, the image display element 22, the projection optical system 24 and the screen 25 which are the same as those of Embodiment 3. In FIG. 35, red light (R) is shown by dashed lines, green light (G) is shown by long broken lines, and blue light (B) is shown by short broken lines.

In the light converging optical system 1C of the above described Embodiment 3, the light from the surface-emission light sources 11r, 11g and 11b is converged on the incident surface 81 of the integrator rod 8, and is equalized. Then, as was described with reference to FIG. 31, in the x direction, almost all of the light converging spots are within the range of the incident surface 81. That is, there was almost no area-based loss of light quantity in the x direction.

In contrast, in the y direction, the light converging spots of the light emitted from the peripheral portion of the light emitting surfaces 12r, 12g and 12b in the y direction protrude outside the peripheral portion of the incident surface 81 in the y direction. That is, the area-based loss of light quantity occurs. This is because it is difficult to converge all the light rays emitted from the surface-emission light sources 11r, 11g and 11b (at the acceptance angle θs of 80 degrees in the y direction) within a range of the incident surface 81. The light converging optical system 1D of Embodiment 4 further reduces the area-based loss in the y direction.

FIG. 36(A) shows a configuration of a general integrator rod 8 having a quadrangular prism shape. FIG. 36(B) shows a configuration of the integrator rod 80 having a tapered shape. FIG. 36(A) and FIG. 36(B) are figures as seen from +y direction.

As shown in FIG. 36(A), in the general integrator rod 8, when an incident angle θin on the incident surface 81 is φ1, an output angle θout from the emission surface 82 is φ1. That is, the incident angle θin of light rays incident on the incident surface 81 of the general integrator rod 8, and the output angle θout of light rays emitted from the emission surface 82 are the same. Here, the incident angle θin is the converging angle θi.

In contrast, the integrator rod 80 shown in FIG. 36(B) has the tapered shape such that an area of an incident surface 810 is smaller than an area of an emission surface 820. In this case, when the incident angle θin on the incident surface 810 is φ1, the output angle θout is φ2 (<θ1). That is, the output angle θout of light rays becomes smaller than the incident angle θin. In this case, the output angle θout of light rays is given by a following formula (12) based on the incident angle θin of light rays, a taper angle β, and the number of times m of reflection inside the integrator rod 80:

$$\theta out = \theta in - 2 \times m \times \beta \quad (12)$$

Figure 37A:
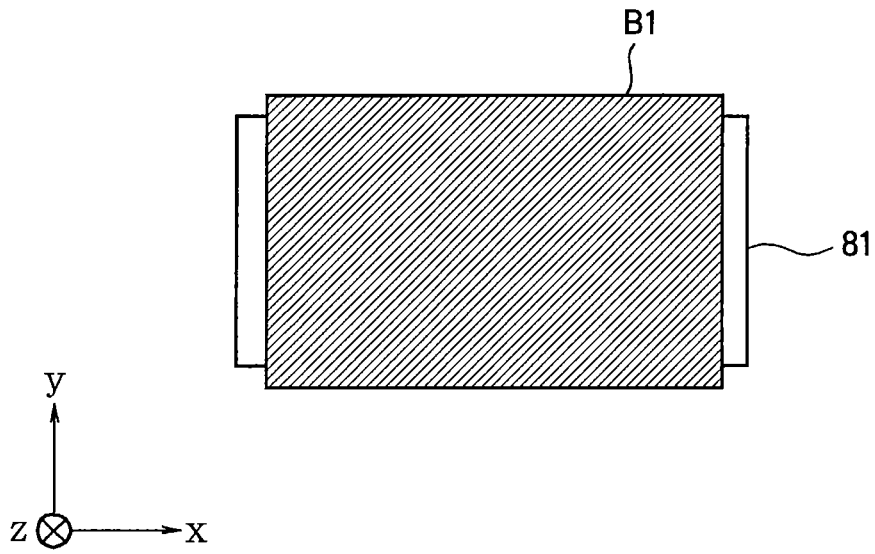
FIGS. 37(A) and 37(B) are views for illustrating a converging area on an incident surface of the integrator rod of the light converging optical system according to Embodiment 4.
Figure 37B:
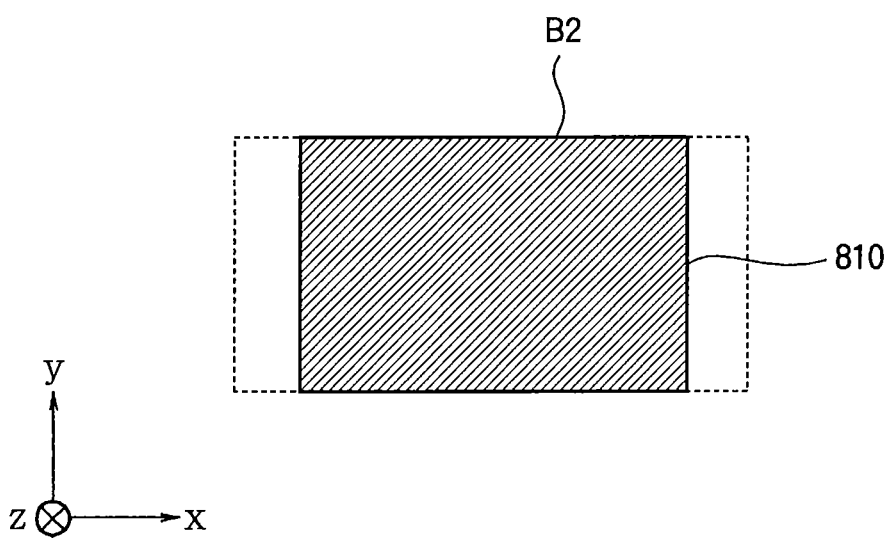

In the light converging optical system 1D of Embodiment 4, the relationship of the formula (12) is used. FIG. 37 is a view showing converging areas B1 and B2 with respect to the incident surfaces 81 and 810 of the general integrator rod 8 and the integrator rod 80 having the tapered shape. In FIG. 37(A), the converging area B1 with respect to the incident surface 81 of Embodiment 3 is shown. In FIG. 37(B), the converging area B2 of Embodiment 4 with respect to the incident surface 810 is shown. In FIG. 37(B), the converging area B2 coincides with the incident surface 810. In this regard, a dashed line in FIG. 37(B) shows the incident surface 81 of FIG. 37(A) for comparison.

In the above described Numerical Example 2 of Embodiment 3, light can be converged within a range of the incident surface 81 at a desired converging angle θi in the x direction, but the angle-based loss of light quantity and the area-based loss of light quantity occur in the y direction as shown in FIG. 37 (A). Therefore, in the light converging optical system 1D of Embodiment 4, the converging area B2 of the incident surface 810 in the x direction is made smaller than the converging area B1 of Embodiment 3 as shown in FIG. 37(B). With such a configuration, the converging area B2 of the incident surface 810 in the y direction can be made smaller. As a result, the area-based loss of light quantity in the y direction can be reduced.

Here, when the output angle θout of FIG. 36(A) is the angle φ2 which is the same as the output angle θout of FIG. 36(B), the incident angle θin (=θout) of FIG. 36(A) becomes the angle φ2. In this case, since the incident angle θin is the converging angle θi, the angle φ1 which is the converging angle θi of the light rays in the x direction in Embodiment 4 becomes larger as compared with the angle φ2 which is the converging angle θi of the light rays in the x direction in Embodiment 3.

Figure 38A:
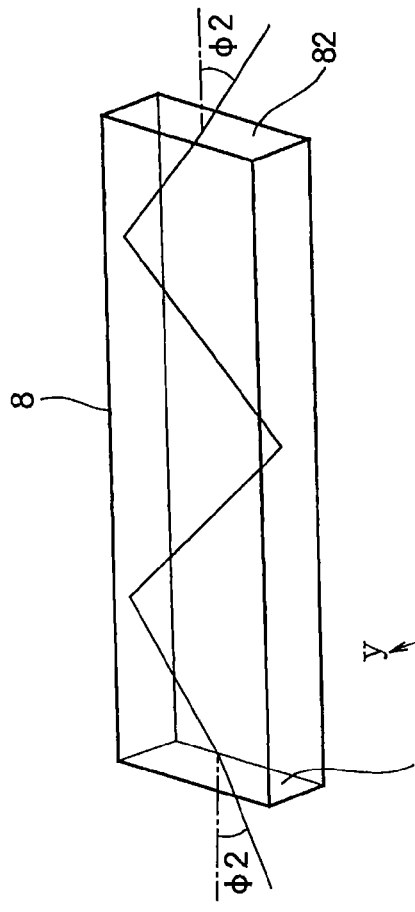
FIGS. 38(A) and 38(B) are perspective views showing a configuration of the integrator rod according to Embodiment 4 as contrasted with a general integrator rod.
Figure 38B:
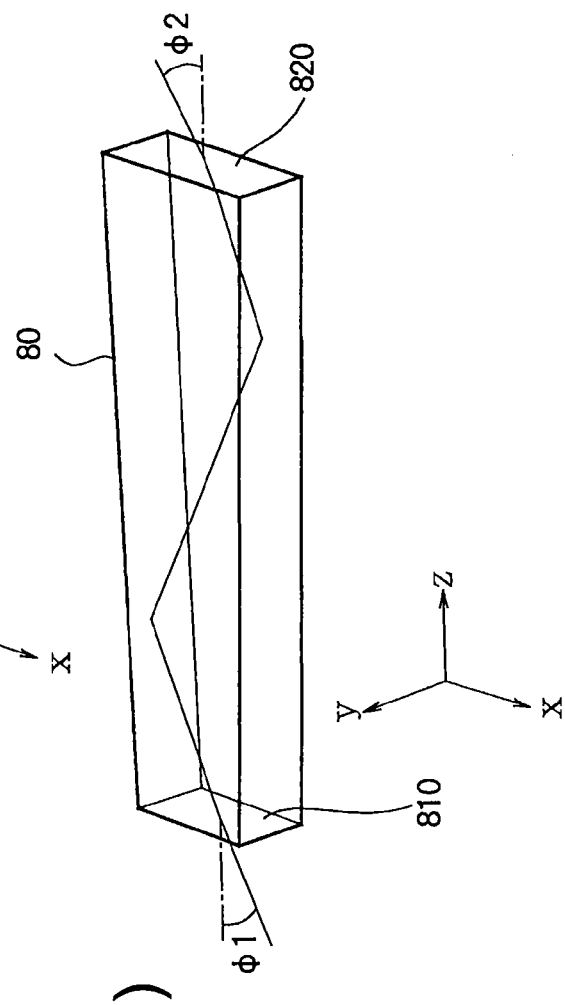

FIGS. 38(A) and 38(B) are perspective views showing configurations of the general integrator rod 8 and the integrator rod 80 having the tapered shape, respectively. In FIG. 38 (A), the incident angle θin on the incident surface 81 of the integrator rod 8 is the angle φ2, and the output angle θout from the emission surface 82 is also φ2. In contrast, in FIG. 38 (B), the incident angle θin on the incident surface 810 of the integrator rod 80 is the angle φ1 (>φ2), and the output angle θout from the emission surface 820 is the angle φ2.

Since the incident angle θin is the converging angle θi as described above, the angle φ1 of the converging angle θi of the light rays in the x direction in Embodiment 4 is larger as compared with the angle φ2 of the converging angle θi of the light rays in the x direction in Embodiment 3.

Therefore, in Embodiment 4, as shown in FIG. 36(B) and FIG. 38(B), the integrator rod 80 has the tapered shape so as to perform angular transformation of light rays in the x direction. In the incident surface 810, the converging angle θi in the x direction is the angle φ1. The light rays in the x direction are repeatedly totally reflected inside the taper-shaped integrator rod 80. At the emission surface 820, the output angle θout in the x direction becomes the angle φ2. The output angle θout in Embodiment 4 becomes the same as the converging angle θi (FIG. 38(A)) in Embodiment 3. The integrator rod 80 converts the light whose converging angle θi is φ1 into the light whose converging angle θout is φ2.

Therefore, at the emission surface 820 of the integrator rod 80 having the tapered shape, the angle-based loss of light quantity in the x direction can be recovered. In Embodiment 4, the loss of light quantity in the x direction is not different from Embodiment 3.

<Numerical Example 3>

Hereinafter, Numerical Example 3 of the light converging optical system 1D of Embodiment 4 will be described. Optical data of the light converging optical system 1D is shown in Table 16. FIG. 39 is a view showing a configuration of a light converging optical system 1D corresponding to the optical data shown in Table 16. FIG. 39(A) is a view of the light converging optical system 1D as seen from the x direction. FIG. 39(B) is a view of the light converging optical system 1D as seen from the y direction.

The light converging optical system 1D shown in FIG. 39 includes the surface-emission light source 11, collimator lenses 713 and 813, a condenser lens 117, a converging F-number control lens 118 and the integrator rod 8. In this regard, the surface-emission light sources 11r, 11g and 11b are collectively expressed by mark 11. The light emitting surfaces 12r, 12g and 12b are collectively expressed by mark 12. The first collimator lenses 713r, 713g and 713b are collectively expressed by mark 713. The second collimator lens 813r, 813g and 813b are collectively expressed by mark 813.

In this example, each size of the light emitting surfaces 12r, 12g and 12b is 2.7 mm×2.0 mm. The size of the incident surface 810 of the integrator rod 80 having the tapered shape is 5.64 mm×2.86 mm. The size of the emission surface 820 is 6.39 mm×2.86 mm.

The converging angle θi of the light rays on the incident surface 810 in the x direction is 33 degrees. The taper angle β is set to 1.5 degrees so that the maximum emission angle of the light from the emission surface 820 in the x direction becomes 30 degrees. The acceptance angle θs of the light from the surface-emission light sources 11r, 11g and 11b is 80 degrees. An allowable emission angle α is 30 degrees. In this case, the F-number is 1 (F=1). This is equivalent to a case where an area of 15.97 mm×7.16 mm on the display surface 23 of the image display element 22 is illuminated by F2.5. The illumination angle θl is approximately 11.5 degrees. The refractive index of glass material used for optical components is 1.52. The optical components are the collimator lenses 713 and 813, the condenser lens 117, the converging F-number control lens 118, and the integrator rod 80. These specifications are the same as those of Numerical Example 2 and Comparison Example 2 described in Embodiment 3 except for the size and the taper of the incident surface 810 of the integrator rod 80.

TABLE 16

| LENS | Si (Surface Number) | SHAPE OF LENS SURFACE | RADIUS OF CURVATURE (mm) (x-z plane) | RADIUS OF CURVATURE (mm) (y-z plane) | THICKNESS (mm) |
|---|---|---|---|---|---|
| 12r | OBJ | — | INFINIFY | INFINIFY | — |
| 12g | | | | | |
| 12b | | | | | |
| CG | S1 | SPHERICAL | INFINIFY | INFINIFY | 0.90 |
| | S2 | SPHERICAL | INFINIFY | INFINIFY | |
| 713r | S3 | SPHERICAL | INFINIFY | INFINIFY | 12.00 |
| 713g | S4 | SPHERICAL | −20.49 | −20.49 | |
| 713b | | | | | |

TABLE 16-continued

| LENS | Si (Surface Number) | SHAPE OF LENS SURFACE | RADIUS OF CURVATURE (mm) (x-z plane) | RADIUS OF CURVATURE (mm) (y-z plane) | THICKNESS (mm) |
|---|---|---|---|---|---|
| 813r | S5 | SPHERICAL | 688.94 | 688.94 | 21.00 |
| 813g 813b | S6 | ASPHERICAL | −18.23 | −18.23 | |
| 117 | S7 | ASPHERICAL | 21.39 | 21.39 | 19.24 |
| | S8 | ASPHERICAL | −203.54 | −203.54 | |
| 118 | S9 | TOROIDAL | INFINIFY | −152.05 | 27.97 |
| | S10 | TOROIDAL | INFINIFY | −32.50 | |
| 810 | IMA | — | INFINIFY | INFINIFY | — |

Notations of Table 16 are the same as those of Table 9. In Table 16, the surface numbers S6, S7 and S8 are aspherical surfaces. Table 17 shows aspherical surface data.

TABLE 17

| | SURFACE NUMBER | | |
|---|---|---|---|
| | S6 | S7 | S8 |
| k | −6.35283E−01 | −4.77735E−01 | 8.7996262E+01 |
| A1 | 0 | 0 | 0 |
| A2 | 0 | 0 | 0 |
| A3 | 0 | 0 | 0 |
| A4 | −1.456217E−05 | −2.095716E−05 | −1.836535E−05 |
| A5 | 0 | 0 | 0 |
| A6 | −2.039454E−08 | −9.307053E−09 | −1.836535E−05 |
| A7 | 0 | 0 | 0 |
| A8 | 4.992894E−11 | −8.546372E−12 | 1.464997E−11 |
| A9 | 0 | 0 | 0 |
| A10 | 5.807781E−14 | 7.003542E−15 | −1.243467E−14 |

Further, in Table 16, the surface numbers S9 and S10 are toroidal surfaces as aspherical surfaces. Table 18 shows aspherical surface data.

TABLE 18

| | SURFACE NUMBER | |
|---|---|---|
| | S9 | S10 |
| k | 4.7093293E+01 | 2.88027E−01 |
| A1 | 0 | 0 |
| A2 | 0 | 0 |
| A3 | 0 | 0 |
| A4 | −5.643138E−07 | 1.027712E−06 |
| A5 | 0 | 0 |
| A6 | −1.046705E−08 | 7.358924E−08 |
| A7 | 0 | 0 |
| A8 | 2.767020E−11 | −2.622489E−11 |
| A9 | 0 | 0 |
| A10 | 4.351870E−15 | −4.912893E−13 |

Figure 40:
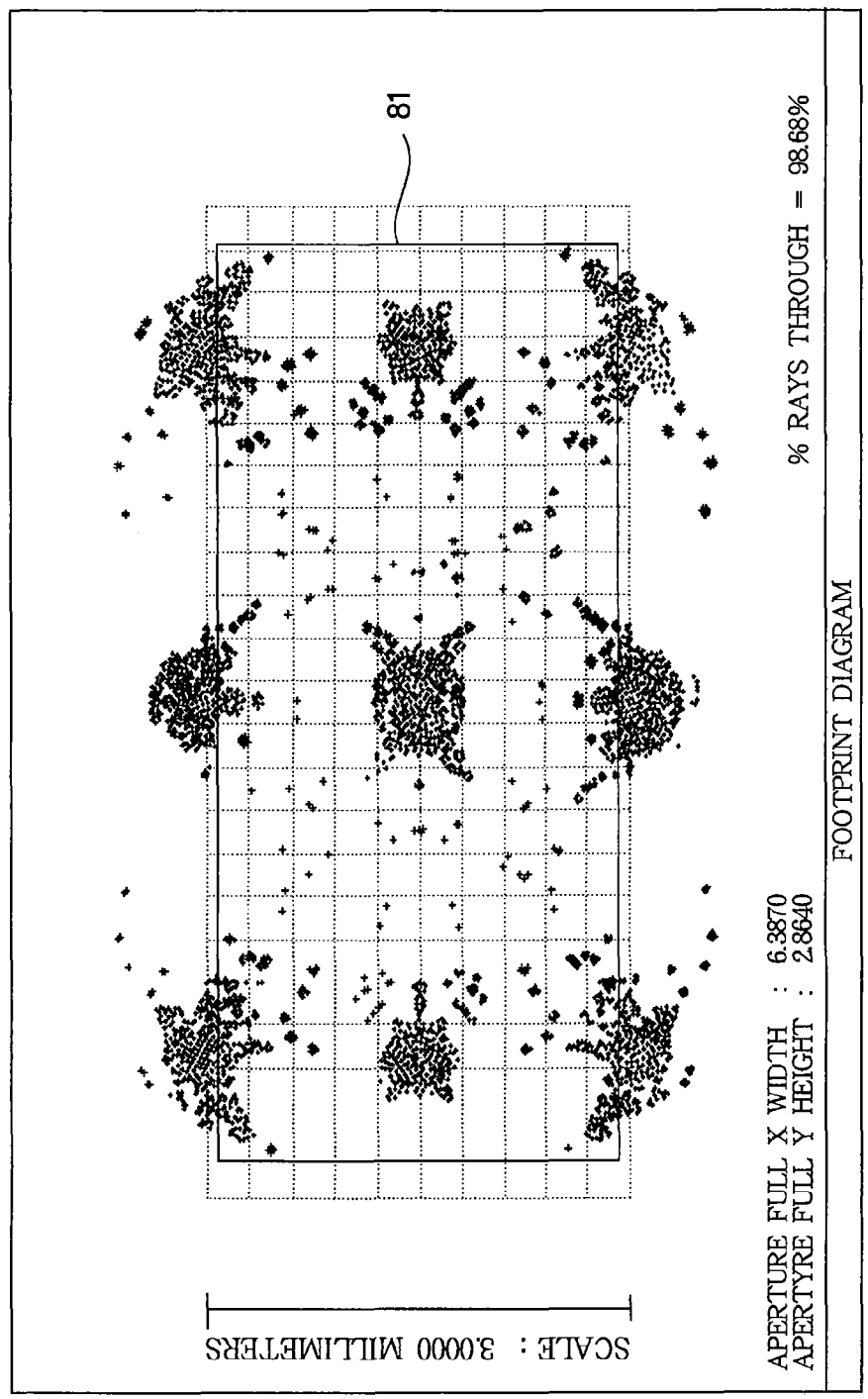
FIG. 40 is a view showing light spots on an incident surface of an integrator rod of a light converging optical system according to Numerical example 3.

FIG. 40 is a view showing a simulation result of light converging spots on the incident surface 810. A rectangular frame in FIG. 40 indicates a range of the incident surface 810. A horizontal axis is an x axis. A right direction along the horizontal axis is +x direction. A vertical axis is a y axis. An upward direction along the vertical axis is +y direction. In this regard, light converging spots of light having the wavelength of 550 nm are shown in FIG. 40, as a representative example of light of three wavelengths (i.e., the red light, the green light and the blue light) emitted from the surface-emission light sources 11r, 11g and 11b.

Light converging spots are formed by the light emitted from four corners of the light emitting surfaces 12r, 12g and 12b, the light emitted from the centers of the light emitting surfaces 12r, 12g and 12b, and the light emitted from the middle points of respective sides of the light emitting surfaces 12r, 12g and 12b. Converging areas of the light converging spots shown in FIG. 40 are narrower than those of Numerical Example 2 shown in FIG. 31.

Table 19 shows the F-numbers in the x direction and the y direction when light is converged on the incident surface 810 of the integrator rod 80. Emission positions of light rays are positions P1 through P9 defined in FIG. 32. In the y direction, the converging angle θi becomes smaller as a position becomes closer to the center of the incident surface 810. Therefore, in Table 19, there is a tendency that the F-number becomes larger as a position becomes closer to the center of the light emitting surfaces 12r, 12g and 12b in the y direction. Further, there is a tendency that the F-number becomes smaller as a position becomes closer to the peripheral portion of the light emitting surfaces 12r, 12g and 12b in the Y direction. Further, the converging angle θi is made larger than 30 degrees in the x direction, and therefore the F-number is smaller than 1.

TABLE 19

| EMISSION POSITION OF LIGHT RAY | CONVERGING F-NUMBER in Y DIRECTION | CONVERGING F-NUMBER in X DIRECTION |
|---|---|---|
| P1 | 0.810 | 0.921 |
| P2 | 0.812 | 0.927 |
| P3 | 0.810 | 0.921 |
| P4 | 0.810 | 0.920 |
| P5 | 0.812 | 0.926 |
| P6 | 0.810 | 0.920 |
| P7 | 0.751 | 0.918 |
| P8 | 0.748 | 0.924 |
| P9 | 0.751 | 0.918 |

Figure 41:
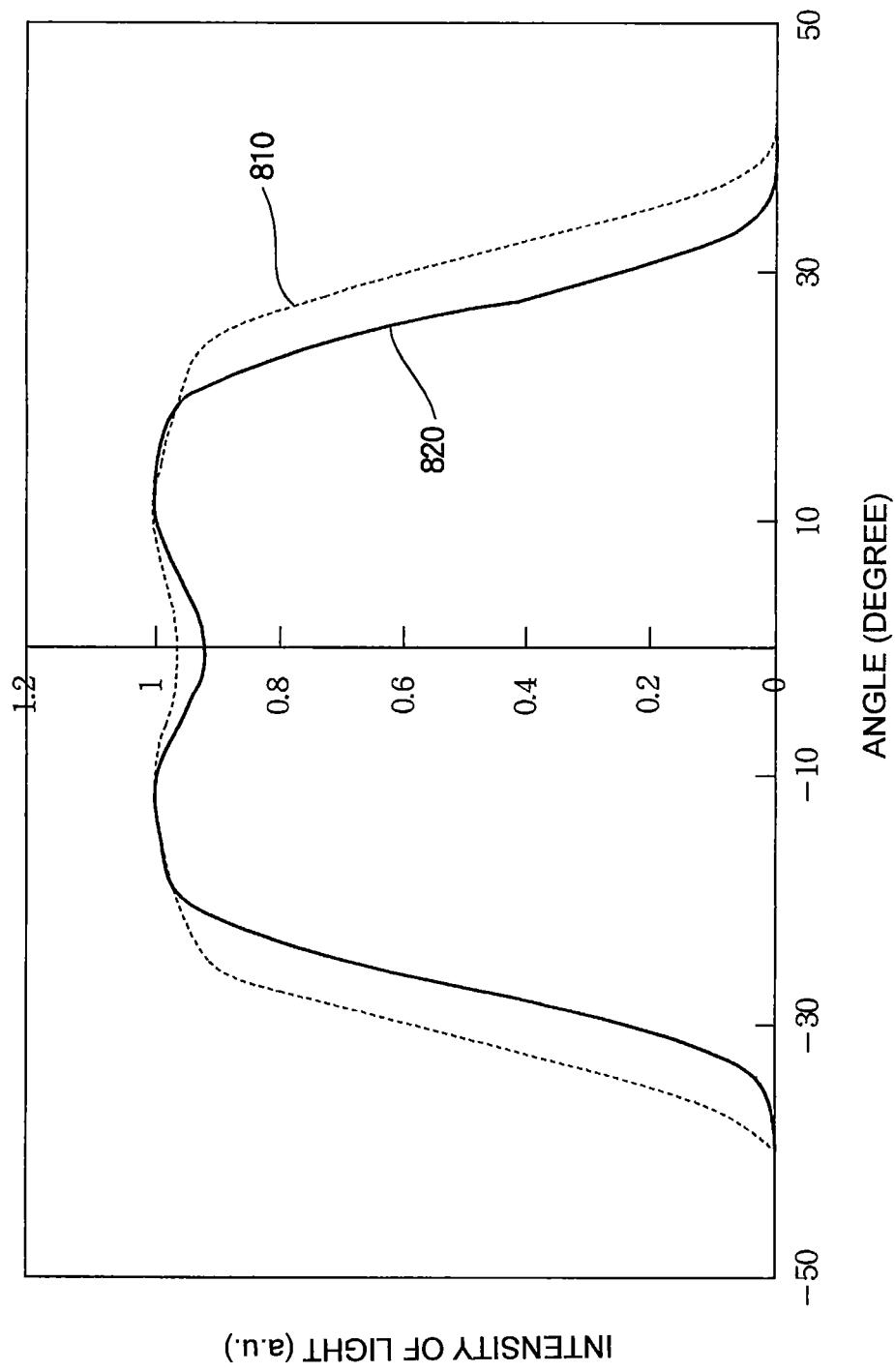
FIG. 41 is a view showing angle dependence of light rays at the incident surface of the integrator rod of the light converging optical system according to Embodiment 4.

FIG. 41 is a view showing an angle dependence of light rays in the x direction on the incident surface 810, and an angle dependence of light rays in the x direction on the emission surface 820. A horizontal axis indicates an angle (degree) of light rays. A vertical axis indicates a light intensity (a. u.). A broken line indicates distribution of the incident angle θin of light on the incident surface 810. A solid line indicates distribution of the output angle θout of light from the emission surface 820. On the incident surface 810, the incident light includes light whose incident angle θin is larger than 30 degrees. However, on the emission surface 820, almost all light has angular distribution of less than or equal to 30 degrees. An effectiveness of angular transformation of light by the integrator rod 80 having the tapered shape is confirmed.

Table 20 is a table showing a converging efficiency on the incident surface 820 by comparison of Comparison Example 3 and Numerical Example 3. In Table 20, the allowable incident angle α is 30 degrees. In this regard, the integrator rod of Comparison Example 3 has the same length as the integrator rod 80 having the tapered shape of Numerical Example 3, and does not have a taper. The converging efficiency in Comparison Example 3 is 69.94%. In contrast, the converging efficiency of Numerical Example 3 is 80.20%. As compared with Comparison Example 3, the converging efficiency of Numerical Example 3 is enhanced by 14.67%. A relative efficiency is a converging efficiency (i.e., a light use efficiency) when the converging efficiency of Comparison Example is expressed as 100%.

In this regard, the size of the integrator rod 80 is suitably determined based on the size of the light emitting surfaces 12r, 12g and 12b and the illumination F-number. For this reason, it is conceived that, in principle, the light incident on the integrator rod 80 reaches the screen 25 with no optical loss except for an illumination margin, transmission loss at lenses or the like, and loss at the image display element 22.

TABLE 20

| ITEM | COMPARISON EXAMPLE 3 | NUMERICAL EXAMPLE 3 |
|---|---|---|
| CONVERGING EFFICIENCY ON INCIDENT SURFACE (ALLOWABLE INCIDNET ANGLE: 30 DEGREES) | 69.94% | 80.20% |
| RELATIVE EFFICIENCY (COMPARISON EXAMPLE: 100%) | 100% | 114.67% |

As described above, in the light converging optical system 1D according to Embodiment 4, in the direction in which the aspect ratio is compressed, the converging angle θi at the center portion of the incident surface 810 is smaller than the converging angle θi at the peripheral portion of the incident surface 810. Therefore, even when the aspect ratio of the light emitting surfaces 12r, 12g and 12b is different from the aspect ratio of the image display element 22, the light converging optical system 1D can reduce loss of light quantity. As a result, the projection-type image display apparatus 2D employing the light converging optical system 1D can reduce loss of light quantity.

In addition, the integrator rod 80 makes large the converging angle θi in the direction perpendicular to the direction in which the aspect ratio is compressed. Therefore, the image magnification of a whole image can be made small. Further, the area-based loss of light quantity in the direction in which the aspect ratio is compressed can further be reduced.

In this regard, when the converging angle θi in the direction in which the aspect ratio is compressed is made large, the angle-based loss of light quantity occurs in the direction perpendicular to the direction in which the aspect ratio is compressed on the incident surface 810. The angle-based aspect ratio is recovered because the light rays pass through the integrator rod 80 having the tapered shape. The light loss can be reduced as a whole at the emission surface 820 of the integrator rod 80 having the tapered shape. Thus, the light converging optical system 1D can achieve high light use efficiency.

As described above, although Embodiments 1 through 4 of the present invention have been described, the respective embodiments can be suitably modified. For example, in the above described respective embodiments, the green surface-emission light source 11g is disposed facing the condenser lens 4. Further, the red surface-emission light source 11r is oriented in the direction perpendicular to the green surface-emission light source 11g. Further, the blue surface-emission light source 11b is oriented in the direction perpendicular to the green surface-emission light source 11g. However, the present invention is not limited to such a configuration.

For example, the blue surface-emission light source 11b may be disposed facing the condenser lens 4. In this case, the red surface-emission light source 11r may be oriented in the direction perpendicular to the blue surface-emission light source 11b. Further, the green surface-emission light source 11g may be oriented in the direction perpendicular to the blue surface-emission light source 11b.

Alternatively, the red surface-emission light source 11r may be disposed facing the condenser lens 4. In this case, the green surface-emission light source 11g may be oriented in the direction perpendicular to the red surface-emission light source 11r. Further, the blue surface-emission light source 11b may be oriented in the direction perpendicular to the red surface-emission light source 11r.

Further, in the above described respective embodiments, the collimator lenses 13r, 13g and 13b are respectively constituted by single lenses. Further, the condenser lens 4 are constituted by a single lens. The collimator lenses 13r, 13g and 13b are not limited to spherical surface lenses, but aspheric surface lenses or free-surface lenses or the like may be used. Further, the condenser lens 4 is not limited to a spherical surface lens, but an aspheric surface lens, a free-surface lens or the like may be used.

In the above described Embodiments 3 and 4, the converging F-number control lens 5 has been described as a single lens. However, the converging F-number control lens 5 is not limited to such an example. For example, the converging F-number control lens 5 may be constituted by two or more lenses according to specifications of the light converging optical system 1C, for example, the acceptance angle θs, the image magnification and the like. Further, the converging F-number control lens 5 is not limited to a spherical surface lens, but may be constituted by an aspherical surface lens, a free-surface lens or the like.

Furthermore, in the above described Embodiments 1, 3 and 4, the integrator rod 8 is used as the light-intensity-distribution equalizing element. However, not only the integrator rod, but also other light-intensity-distribution equalizing elements such as a hollow light tunnel or the like may be used.

Further, in the above described embodiments, the dichroic mirrors are used as means for synthesizing the light emitted from the surface-emission light sources 11r, 11g and 11b. However, not only the dichroic mirrors, but also other synthesizing means such as a dichroic mirror, a dichroic prism or the like.

Further, in the above described embodiments, the surface-emission light sources 11r, 11g and 11b are of three colors, i.e., red, green and blue colors. However, the surface-emission light sources are not limited to such an example. Surface-emission light sources of four or more colors may be used. Further, surface-emission light sources of two colors such as cyan and red may also be used. Further, a surface-emission light source of white color may be used. When it is not necessary to display a plurality of colors, a single surface-emission light source may be used.

The present invention is applicable to a light converging optical system using a surface-emission light source, and a projection-type image display apparatus using the light converging optical system.

EXPLANATION OF MARKS 1A, 1B, 1C, 1D . . . light converging optical system, 2A, 2B 2C, 2D . . . projection-type image display apparatus, 4, 114, 117, 214 ... condenser lens (light converging element), 5, 118 converging F-number control lens (light converging element), 50, 115 ... toroidal lens, 51 ... first surface, 52 ... second surface, 6, 7 ... dichroic mirror (light synthesizing means), 8 ... integrator rod (light-intensity-distribution equalizing element), 81 ... incident surface of integrator rod, 82 ... emission surface of integrator rod, 11, 11r, 11g, 11b ... surface-emission light source, 12, 12r, 12g, 12b ... light emitting surface of surface-emission light source, 13, 13r, 13g, 13b, 113, 213, 313, 513, 613, 713, 813 ... collimator lens (collimator optical system), 20, 21 ... illumination optical system, 22 ... image display element, 23 ... display surface of image display element, 24 ... projection optical system, 25 ... screen, As ... area of light emitting surface, Ai ... incident surface, AI ... area of incident surface, θs ... acceptance angle, θi ... converging angle, θl ... illumination angle, α ... allowable incident angle, θin ... incident angle, θout ... output angle, φ1, φ2 ... angle, Es ... Etendue of surface-emission light source, Ei ... Etendue of integrator rod, El ... etendue of image display element, B, B1, B2 ... converging area, P1, P2, P3, P4, P5, P6, P7, P8, P9 ... emission position, β ... taper angle.

What is claimed is:

1. A light converging optical system comprising:
a surface-emission light source that has a light emitting surface and emits light from the light emitting surface;
a collimator optical system that has a positive power and converts the light emitted from the light emitting surface into approximately parallel light;
a light converging element that has a positive power and converges the light converted into the approximately parallel light; and
a light-intensity-distribution equalizing element that has an incident surface on which the light converged by the light converging element is incident, equalizes light intensity distribution of incident light, and emits the light from an emission surface,
wherein among the light converged on the incident surface of the light-intensity-distribution equalizing element, a converging angle of the light converged on a center portion of the incident surface is smaller than a converging angle of the light converged on a corner portion of the incident surface.

2. A light converging optical system comprising:
a surface-emission light source that has a light emitting surface and emits light from the light emitting surface;
a collimator optical system that has a positive power and converts the light emitted from the light emitting surface into approximately parallel light;
a light converging element that has a positive power and converges the light converted into the approximately parallel light; and
a light-intensity-distribution equalizing element that has an incident surface on which the light converged by the light converging element is incident, equalizes light intensity distribution of incident light, and emits the light from an emission surface,
wherein among light spots formed by the light incident on the incident surface of the light-intensity-distribution equalizing element, a light spot formed at a center portion of the incident surface is larger than a light spot formed at a corner portion of the incident surface.

3. A light converging optical system comprising:
a surface-emission light source that has a light emitting surface and emits light from the light emitting surface;
a collimator optical system that has a positive power and converts the light emitted from the light emitting surface into approximately parallel light;
a light converging element that has a positive power and converges the light converted into the approximately parallel light; and
a light-intensity-distribution equalizing element that has an incident surface on which the light converged by the light converging element is incident, equalizes light intensity distribution of incident light, and emits the light from an emission surface,
wherein among the light emitted from the light emitting surface of the surface-emission light source, the light emitted from a center portion of the light emitting surface is converged on a position farther from the light converging element as compared with the light emitted from a corner portion of the light emitting surface.

4. A light converging optical system comprising:
a surface-emission light source that has a light emitting surface and emits light from the light emitting surface;
a collimator optical system that has a positive power and converts the light emitted from the light emitting surface into approximately parallel light;
a light converging element that has a positive power and converges the light converted into the approximately parallel light; and
a light-intensity-distribution equalizing element that has an incident surface on which the light converged by the light converging element is incident, equalizes light intensity distribution of incident light, and emits the light from an emission surface,
wherein an image magnification at which an image of the light emitting surface of the surface-emission light source is formed on the incident surface of the light-intensity-distribution equalizing element is larger at a corner portion of the light emitting surface than at a center portion of the light emitting surface.

5. The light converging optical system according to claim 1, wherein at least one lens constituting the light converging optical system has an optical surface that converges light emitted from a corner portion of the light emitting surface of the surface-emission light source with a stronger power than light emitted from a center portion of the light emitting surface of the surface-emission light source.

6. The light converging optical system according to claim 5, wherein a part of the optical surface acting on the light emitted mainly from the center portion of the light emitting surface of the surface-emission light source has a smaller power than a part of the optical surface acting on the light emitted mainly from the corner portion of the light emitting surface of the surface-emission light source.

7. The light converging optical system according to claim 5, wherein a part of the optical surface acting on the light emitted mainly from the center portion of the light emitting surface of the surface-emission light source has a shape of a concave surface, and a part of the optical surface acting on the light emitted mainly from the corner portion of the light emitting surface of the surface-emission light source has a shape of a convex surface.

8. A light converging optical system comprising:
a surface-emission light source that has a light emitting surface and emits light from the light emitting surface;
a collimator optical system that has a positive power and converts the light emitted from the light emitting surface into approximately parallel light; and a light converging element that has a positive power and converges the light converted into the approximately parallel light on a display surface of an image display element, wherein among the light converged on the display surface of the image display element, a converging angle of the light converged on a center portion of the display surface is smaller than a converging angle of the light converged on a corner portion of the display surface.

9. A light converging optical system comprising:
a surface-emission light source that has a light emitting surface and emits light from the light emitting surface;
a collimator optical system that has a positive power and converts the light emitted from the light emitting surface into approximately parallel light; and
a light converging element that has a positive power and converges the light converted into the approximately parallel light on a display surface of an image display element,
wherein among light spots formed by the light incident on the display surface of the image display element, a light spot formed at a center portion of the display surface is larger than a light spot formed at a corner portion of the display surface.

10. A light converging optical system comprising:
a surface-emission light source that has a light emitting surface and emits light from the light emitting surface;
a collimator optical system that has a positive power and converts the light emitted from the light emitting surface into approximately parallel light; and
a light converging element that has a positive power and converges the light converted into the approximately parallel light on a display surface of an image display element,
wherein among the light emitted from the light emitting surface of the surface-emission light source, the light emitted from a center portion of the light emitting surface is converged on a position farther from the light converging element as compared with the light emitted from a corner portion of the light emitting surface.

11. A light converging optical system comprising:
a surface-emission light source that has a light emitting surface and emits light from the light emitting surface;
a collimator optical system that has a positive power and converts the light emitted from the light emitting surface into approximately parallel light; and
a light converging element that has a positive power and converges the light converted into the approximately parallel light on a display surface of an image display element,
wherein an image magnification at which an image of the light emitting surface of the surface-emission light source is formed on the display surface of the image display element is larger at a corner portion of the display surface than at a center portion of the display surface.

12. The light converging optical system according to claim 8, wherein at least one lens constituting the light converging optical system has an optical surface that converges light emitted from a corner portion of the light emitting surface of the surface-emission light source with a stronger power than light emitted from a center portion of the light emitting surface of the surface-emission light source.

13. The light converging optical system according to claim 12, wherein a part of the optical surface acting on the light emitted from the center portion of the light emitting surface of the surface-emission light source has a smaller power than a part of the optical surface acting on the light emitted from the corner portion of the light emitting surface of the surface-emission light source.

14. The light converging optical system according to claim 12, wherein a part of the optical surface acting on the light emitted from the center portion of the light emitting surface of the surface-emission light source has a shape of a concave surface, and a part of the optical surface acting on the light emitted from the corner portion of the light emitting surface of the surface-emission light source has a shape of a convex surface.

15. A light converging optical system comprising:
a surface-emission light source that has a light emitting surface and emits light from the light emitting surface;
a collimator optical system that has a positive power and converts the light emitted from the light emitting surface into approximately parallel light;
a light converging element that has a positive power, has two or more toroidal surfaces, and converges the light converted into the approximately parallel light; and
a light-intensity-distribution equalizing element that has an incident surface on which the light converged by the light converging element is incident, equalizes light intensity distribution of incident light, and emits the light from an emission surface,
wherein an aspect ratio of the light emitting surface is different from an aspect ratio of the incident surface,
wherein among the light converged on the incident surface, a converging angle of the light converged on a center portion of the incident surface in a direction in which the aspect ratio is compressed is smaller than a converging angle of the light converged on a peripheral portion of the incident surface in the direction in which the aspect ratio is compressed.

16. The light converging optical system according to claim 15, wherein among the light converged on the incident surface in the direction in which the aspect ratio is compressed, a light spot formed at the center portion in the direction in which the aspect ratio is compressed is larger than a light spot formed at the peripheral portion in the direction in which the aspect ratio is compressed.

17. The light converging optical system according to claim 15, wherein a converging position of the light emitted from a center portion of the light emitting surface in the direction in which the aspect ratio is compressed is farther from the light converging element as compared with the light emitted from a peripheral portion of the light emitting surface.

18. The light converging optical system according to claim 15, wherein two or more optical surfaces of the light converging element has toroidal surfaces, and converge light emitted from a corner portion of the light emitting surface in the direction in which the aspect ratio is compressed with a stronger power than light emitted from a center portion of the light emitting surface in the direction in which the aspect ratio is compressed.

19. The light converging optical system according to claim 15, wherein the light-intensity-distribution equalizing element has a tapered shape such that an area of the incident surface is smaller than an area of the emission surface, and
wherein an angle at which the light is emitted from the emission surface is smaller than an angle at which the light is incident on the incident surface.

20. A projection-type image display apparatus comprising:
the light converging optical system according to claim 1;
an image display element on which the light emitted by the light converging optical system is incident, the image display element modulating incident light and generating image light; and
a projection optical system that projects the image light generated by the image display element in an enlarged scale.

* * * * *